US012008188B2

(12) United States Patent
Lipman et al.

(10) Patent No.: US 12,008,188 B2
(45) Date of Patent: Jun. 11, 2024

(54) INTERACTIVE DEVICES

(71) Applicant: Power2b, Inc., Santa Monica, CA (US)

(72) Inventors: Sarah Michelle Lipman, Santa Monica, CA (US); Eran Kali, Jerusalem (IL); Boris Gutin, Jerusalem (IL); Mordehai Margalit, Zichron Yaaqov (IL); Robert Michael Lipman, Santa Monica, CA (US); Ken Zwiebel, Mazkeret Batya (IL)

(73) Assignee: Power2b, Inc., Santa Monica, CA (US)

( * ) Notice: Subject to any disclaimer, the term of this patent is extended or adjusted under 35 U.S.C. 154(b) by 0 days.

(21) Appl. No.: 18/111,252

(22) Filed: Feb. 17, 2023

(65) Prior Publication Data
US 2023/0205350 A1 Jun. 29, 2023

Related U.S. Application Data

(60) Continuation of application No. 16/713,909, filed on Dec. 13, 2019, now Pat. No. 11,586,317, which is a
(Continued)

(51) Int. Cl.
*G06F 3/041* (2006.01)
*G06F 3/042* (2006.01)
(Continued)

(52) U.S. Cl.
CPC .......... *G06F 3/0416* (2013.01); *G06F 3/0421* (2013.01); *G06F 3/046* (2013.01); *G06F 3/0488* (2013.01)

(58) Field of Classification Search
CPC ...... G06F 3/0416; G06F 3/0421; G06F 3/046; G06F 3/0488
See application file for complete search history.

(56) References Cited

U.S. PATENT DOCUMENTS 4,320,292 A 3/1982 Oikawa et al.
4,703,316 A 10/1987 Sherbeck
(Continued)

FOREIGN PATENT DOCUMENTS

CN 1818842 A 8/2006
EP 0509589 A2 10/1992
(Continued)

OTHER PUBLICATIONS

Communication Pursuant to Article 94(3) EPC, Examination Report for European Application No. 06780474.0, dated Oct. 2011.
(Continued)

*Primary Examiner* — Abbas I Abdulselam
(74) *Attorney, Agent, or Firm* — Locke Lord LLP; Judy Naamat

(57) ABSTRACT

An interactive assembly including at least one interactive surface element, at least a first region of the at least one interactive surface element having first user sensible functionality and at least a second region of the at least one interactive surface element having second functionality, different from the first user sensible functionality, input sensor functionality, including at least one input sensor located in propinquity to at least one of the at least one interactive surface element, operative to sense impingement of an electromagnetic radiation spot on at least one of the at least one first region and the at least one second region of the at least one interactive surface element and utilization functionality for employing outputs of the input sensor functionality in respect of impingement on either or both of the at least one first region and the at least one second region.

12 Claims, 39 Drawing Sheets

Related U.S. Application Data continuation of application No. 15/130,899, filed on Apr. 15, 2016, now Pat. No. 10,534,496, which is a continuation of application No. 14/108,242, filed on Dec. 16, 2013, now Pat. No. 9,317,170, which is a division of application No. 12/531,039, filed as application No. PCT/IL2008/000355 on Mar. 13, 2008, now Pat. No. 8,610,675, which is a continuation of application No. PCT/IL2007/000433, filed on Apr. 1, 2007, and a continuation-in-part of application No. PCT/IL2007/000332, filed on Mar. 14, 2007.

(60) Provisional application No. 60/918,303, filed on Mar. 14, 2007.

(51) Int. Cl.
  *G06F 3/046* (2006.01)
  *G06F 3/0488* (2022.01)

(56) References Cited

U.S. PATENT DOCUMENTS

| | | |
|---|---|---|
| 4,949,079 A | 8/1990 | Loebner |
| 5,122,656 A | 6/1992 | Williams et al. |
| 5,227,985 A | 7/1993 | DeMenthon |
| 5,241,167 A | 8/1993 | Suzuki et al. |
| 5,250,929 A | 10/1993 | Hoffman et al. |
| 5,270,711 A | 12/1993 | Knapp |
| 5,448,261 A | 9/1995 | Koike et al. |
| 5,506,605 A | 4/1996 | Paley |
| 5,576,727 A | 11/1996 | Rosenberg et al. |
| 5,704,836 A | 1/1998 | Norton et al. |
| 5,764,209 A | 6/1998 | Hawthorne et al. |
| 5,793,361 A | 8/1998 | Hahn et al. |
| 5,831,601 A | 11/1998 | Vogeley et al. |
| 5,880,411 A | 3/1999 | Gillespie et al. |
| 5,892,501 A | 4/1999 | Kim et al. |
| 5,905,567 A | 5/1999 | Dewan |
| 5,914,709 A | 6/1999 | Graham et al. |
| 5,926,168 A | 7/1999 | Fan |
| 5,949,052 A | 9/1999 | Longacre, Jr. et al. |
| 5,949,402 A | 9/1999 | Garwin et al. |
| 5,959,617 A | 9/1999 | Bird et al. |
| 5,990,866 A | 11/1999 | Yollin |
| 6,028,581 A | 2/2000 | Umeya |
| 6,028,595 A | 2/2000 | Shiga |
| 6,028,649 A | 2/2000 | Faris et al. |
| 6,081,255 A | 6/2000 | Narabu |
| 6,094,188 A | 7/2000 | Horton et al. |
| 6,108,031 A | 8/2000 | King et al. |
| 6,122,042 A | 9/2000 | Wunderman et al. |
| 6,144,366 A | 11/2000 | Numazaki et al. |
| 6,153,836 A | 11/2000 | Goszyk |
| 6,172,667 B1 | 1/2001 | Sayag |
| 6,184,863 B1 | 2/2001 | Sibert et al. |
| 6,232,937 B1 | 5/2001 | Jacobsen et al. |
| 6,269,565 B1 | 8/2001 | Inbar et al. |
| 6,292,179 B1 | 9/2001 | Lee |
| 6,320,599 B1 | 11/2001 | Sciammarella et al. |
| 6,337,698 B1 | 1/2002 | Keely, Jr. et al. |
| 6,377,249 B1 | 4/2002 | Mumford |
| 6,404,416 B1 | 6/2002 | Kahn et al. |
| 6,486,868 B1 | 11/2002 | Kazarian |
| 6,486,874 B1 | 11/2002 | Muthuswamy et al. |
| 6,529,189 B1 | 3/2003 | Colgan et al. |
| 6,597,443 B2 | 7/2003 | Boman |
| 6,694,228 B2 | 2/2004 | Rios |
| 6,788,295 B1 | 9/2004 | Inkster |
| 6,791,531 B1 | 9/2004 | Johnston et al. |
| 6,879,354 B1 | 4/2005 | SawajamA et al. |
| 6,891,530 B2 | 5/2005 | Umemoto et al. |
| 6,897,854 B2 | 5/2005 | Cho et al. |
| 6,924,793 B2 | 8/2005 | Sharma |
| 6,965,377 B2 | 11/2005 | Yanagisawa et al. |
| 6,972,401 B2 | 12/2005 | Akitt et al. |
| 7,006,080 B2 | 2/2006 | Gettemy |
| 7,032,003 B1 | 4/2006 | Shi et al. |
| 7,034,866 B1 | 4/2006 | Colmenarez et al. |
| 7,145,555 B2 | 12/2006 | Taylor et al. |
| 7,166,966 B2 | 1/2007 | Naugler, Jr. et al. |
| 7,203,384 B2 | 4/2007 | Carl |
| 7,236,162 B2 | 6/2007 | Morrison et al. |
| 7,298,367 B2 | 11/2007 | Geaghan et al. |
| 7,435,940 B2 | 10/2008 | Eliasson et al. |
| 7,450,105 B2 | 11/2008 | Nakamura et al. |
| 7,463,756 B2 | 12/2008 | Benkley, III |
| 7,465,914 B2 | 12/2008 | Eliasson et al. |
| 7,474,983 B2 | 1/2009 | Mazalek et al. |
| 7,479,944 B2 | 1/2009 | Casebolt et al. |
| 7,499,040 B2 | 3/2009 | Zadesky et al. |
| 7,502,011 B2 | 3/2009 | Braun et al. |
| 7,519,223 B2 | 4/2009 | Dehlin et al. |
| 7,570,249 B2 | 8/2009 | Han et al. |
| 7,598,942 B2 | 10/2009 | Underkoffler et al. |
| 7,599,561 B2 | 10/2009 | Wilson et al. |
| 7,629,967 B2 | 12/2009 | Newton |
| 7,656,393 B2 | 2/2010 | King et al. |
| 7,682,250 B2 | 3/2010 | Ikebata et al. |
| 7,755,611 B2 | 7/2010 | Barr |
| 7,760,193 B2 | 7/2010 | Yee |
| 7,800,594 B2 | 9/2010 | Nakamura et al. |
| 7,868,281 B2 | 1/2011 | Leong et al. |
| 7,911,444 B2 | 3/2011 | Yee |
| 7,924,272 B2 | 4/2011 | Boer et al. |
| 7,925,996 B2 | 4/2011 | Hofmeister et al. |
| 7,952,563 B2 | 5/2011 | Park et al. |
| 7,952,570 B2 | 5/2011 | Lipman et al. |
| 8,018,440 B2 | 9/2011 | Townsend et al. |
| 8,031,180 B2 | 10/2011 | Miyamoto et al. |
| 8,144,115 B2 | 3/2012 | Konicek |
| 8,279,180 B2 | 10/2012 | Hotelling et al. |
| 8,330,727 B2 | 12/2012 | Westerman et al. |
| 8,466,873 B2 | 6/2013 | Vertegaal et al. |
| 8,547,364 B2 | 10/2013 | Lipman et al. |
| 8,624,850 B2 | 1/2014 | Lipman et al. |
| 8,665,223 B2 | 3/2014 | Harada et al. |
| 8,681,132 B2 | 3/2014 | Schobben et al. |
| 8,736,547 B2 | 5/2014 | Goddi et al. |
| 8,816,994 B2 | 8/2014 | Lipman et al. |
| 9,019,209 B2 | 4/2015 | Geaghan |
| 9,121,669 B1 | 9/2015 | Hyslop et al. |
| 9,280,238 B2 | 3/2016 | Posamentier |
| 9,317,170 B2 * | 4/2016 | Lipman .............. F16D 65/12 |
| 9,454,178 B2 | 9/2016 | Lipman et al. |
| 9,569,093 B2 | 2/2017 | Lipman et al. |
| 2001/0031067 A1 | 10/2001 | Kennedy et al. |
| 2001/0050672 A1 | 12/2001 | Kobayashi |
| 2002/0075243 A1 | 6/2002 | Newton |
| 2002/0097222 A1 | 7/2002 | Nishino |
| 2002/0148655 A1 | 10/2002 | Cho et al. |
| 2002/0175924 A1 | 11/2002 | Yui et al. |
| 2003/0001825 A1 | 1/2003 | Omura et al. |
| 2003/0034439 A1 | 2/2003 | Reime et al. |
| 2003/0156100 A1 | 8/2003 | Gettemy |
| 2003/0210235 A1 | 11/2003 | Roberts |
| 2003/0223803 A1 | 12/2003 | De Schrijver |
| 2004/0012565 A1 | 1/2004 | Cok |
| 2004/0049235 A1 | 3/2004 | Deno et al. |
| 2004/0135773 A1 | 7/2004 | Bang et al. |
| 2004/0174324 A1 | 9/2004 | Yamazaki et al. |
| 2004/0227734 A1 | 11/2004 | Chang et al. |
| 2004/0246450 A1 | 12/2004 | Soper et al. |
| 2004/0252091 A1 | 12/2004 | Ma et al. |
| 2004/0252867 A1 | 12/2004 | Lan et al. |
| 2004/0263483 A1 | 12/2004 | Aufderheide |
| 2005/0088417 A1 | 4/2005 | Mulligan |
| 2005/0110781 A1 | 5/2005 | Geaghan et al. |
| 2005/0126838 A1 | 6/2005 | Vaughan |
| 2005/0128190 A1 | 6/2005 | Ryynanen |
| 2005/0156914 A1 | 7/2005 | Lipman et al. |
| 2005/0162398 A1 | 7/2005 | Eliasson et al. |
| 2005/0168437 A1 | 8/2005 | Carl et al. |
| 2005/0168488 A1 | 8/2005 | Montague |

(56) References Cited

U.S. PATENT DOCUMENTS

| | | |
|---|---|---|
| 2005/0193351 A1 | 9/2005 | Huoviala |
| 2005/0219229 A1 | 10/2005 | Yamaguchi |
| 2005/0248540 A1 | 11/2005 | Newton |
| 2005/0275636 A1 | 12/2005 | Dehlin et al. |
| 2006/0007222 A1 | 1/2006 | Uy |
| 2006/0026521 A1 | 2/2006 | Hotelling et al. |
| 2006/0026535 A1 | 2/2006 | Hotelling et al. |
| 2006/0044283 A1 | 3/2006 | Eri et al. |
| 2006/0066590 A1 | 3/2006 | Ozawa et al. |
| 2006/0085159 A1 | 4/2006 | Itsuji et al. |
| 2006/0114370 A1 | 6/2006 | Peterson et al. |
| 2006/0132463 A1 | 6/2006 | Lee et al. |
| 2006/0161871 A1 | 7/2006 | Kerr et al. |
| 2006/0206244 A1 | 9/2006 | Arvidsson |
| 2007/0052684 A1 | 3/2007 | Gruhlke et al. |
| 2007/0063980 A1 | 3/2007 | Eich et al. |
| 2007/0085837 A1 | 4/2007 | Ricks et al. |
| 2007/0120836 A1 | 5/2007 | Yamaguchi |
| 2007/0262966 A1 | 11/2007 | Nishimura et al. |
| 2008/0006762 A1 | 1/2008 | Fadell et al. |
| 2008/0100593 A1 | 5/2008 | Skillman et al. |
| 2008/0167834 A1 | 7/2008 | Herz et al. |
| 2008/0191864 A1 | 8/2008 | Wolfson |
| 2009/0146969 A1 | 6/2009 | Fabre et al. |
| 2014/0340327 A1 | 11/2014 | Herz et al. |

FOREIGN PATENT DOCUMENTS

| | | |
|---|---|---|
| EP | 0572182 A1 | 12/1993 |
| GB | 2289756 A | 11/1995 |
| GB | 2299856 A | 10/1996 |
| GB | 2389192 A | 12/2003 |
| JP | H0850526 A | 2/1996 |
| JP | H10307682 A | 11/1998 |
| JP | 2002140058 A | 5/2002 |
| KR | 970006406 A | 2/1997 |
| WO | WO-9502801 A1 | 1/1995 |
| WO | WO-02043045 A1 | 5/2002 |
| WO | WO-03044726 A1 | 5/2003 |
| WO | WO-03104965 A2 | 12/2003 |
| WO | WO-2005094176 A2 | 10/2005 |
| WO | WO-2005094716 A1 | 10/2005 |
| WO | WO-2007113828 A2 | 10/2007 |
| WO | WO-2008111040 A2 | 9/2008 |
| WO | WO-2008111079 A2 | 9/2008 |

OTHER PUBLICATIONS

Co-Pending U.S. Appl. No. 60/682,604, dated May 18, 2005.
Co-Pending U.S. Appl. No. 60/715,546, dated Sep. 8, 2005.
Co-Pending U.S. Appl. No. 60/734,027, dated Nov. 3, 2005.
Co-Pending U.S. Appl. No. 60/789,188, filed Apr. 3, 2006.
Examining Division, "Minutes of Oral Proceeding," from counterpart European Patent Application No. 06780474.0, dated Nov. 23, 2012.
Extended European Search Report for European Application No. 06780474.0, dated Oct. 14, 2010.
Extended European Search Report for European Application No. 07713352.8, dated Dec. 27, 2011.
International Preliminary Report on Patentability for International Application No. PCT/IL2007/000332, dated 15, 2009.
Notice of Preliminary Rejection for Korean Application No. 10-2013-7033913, Priority is based on U.S. Application No. dated Mar. 12, 2014.
Office Action for Japanese Application No. 2007-505736, dated Sep. 28, 2010.
Response to EP Official Communication Pursuant to Article 94(3) EPC, May 4, 2012 for European Application No. 06780474.0 dated Oct. 25, 2012.
Summons to Attend Oral Proceedings for European Application No. 06780474.0, dated May 4, 2012.
International Search Report and Written Opinion from the International Searching Authority, mailed Mar. 31, 2008, 9 pages, for the corresponding International Application PCT/IL07/00433.
International Search Report and Written Opinion from the International Searching Authority, mailed Mar. 20, 2008, 6 pages, for the corresponding International Application PCT/IL07/00332.
Chen, Timothy T., "A Design for Whole-Hand Flat Surface Interaction," A Thesis Submitted in Partial Fulfilment of the Requirements for the Degree of Master of Applied Science in Electrical & Computer Engineering in the Faculty of Graduate Studies, The University of British Columbia, Apr. 30, 2005.
Dietz, Paul, et al., "Multi-projectors and implicit interaction in persuasive public displays," available at httpsIAvww.researchciate.net/publication/234829162/CiownIOad, May 28, 2004.
Dominessy, Mary E., "A Literature Review and Assessment of Touch Interactive Devices," U.S. Army Human Engineering Laboratory, Oct. 31, 1989, 36 pages, Aberdeen Proving Ground, Maryland, U.S.A.
Liu, Jin, et al., "Three-dimensional PC: toward novel forms of human-computer interaction," Three-Dimensional Video and Display: Devices and Systems SPIE CR76, Nov. 5-8, 2000, Boston, MA, U.S.A.
Paradiso, J.A., et al., "Sensor systems for interactive surfaces," IBM Systems Journal, Dec. 21, 2000, pp. 892-914.
Paradiso, J.A., "Several Sensor Approaches that Retrofit Large Surfaces for Interactivy," Sep. 29, 2022, pp. 108.
Wilson, A.D., "TouchLight: An Imaging Touch Screen and Display for Gesture-Based Interaction" ICMC '04, Oct. 15, 2004, 8 pages, State College, Pennsylvania, USA.

\* cited by examiner

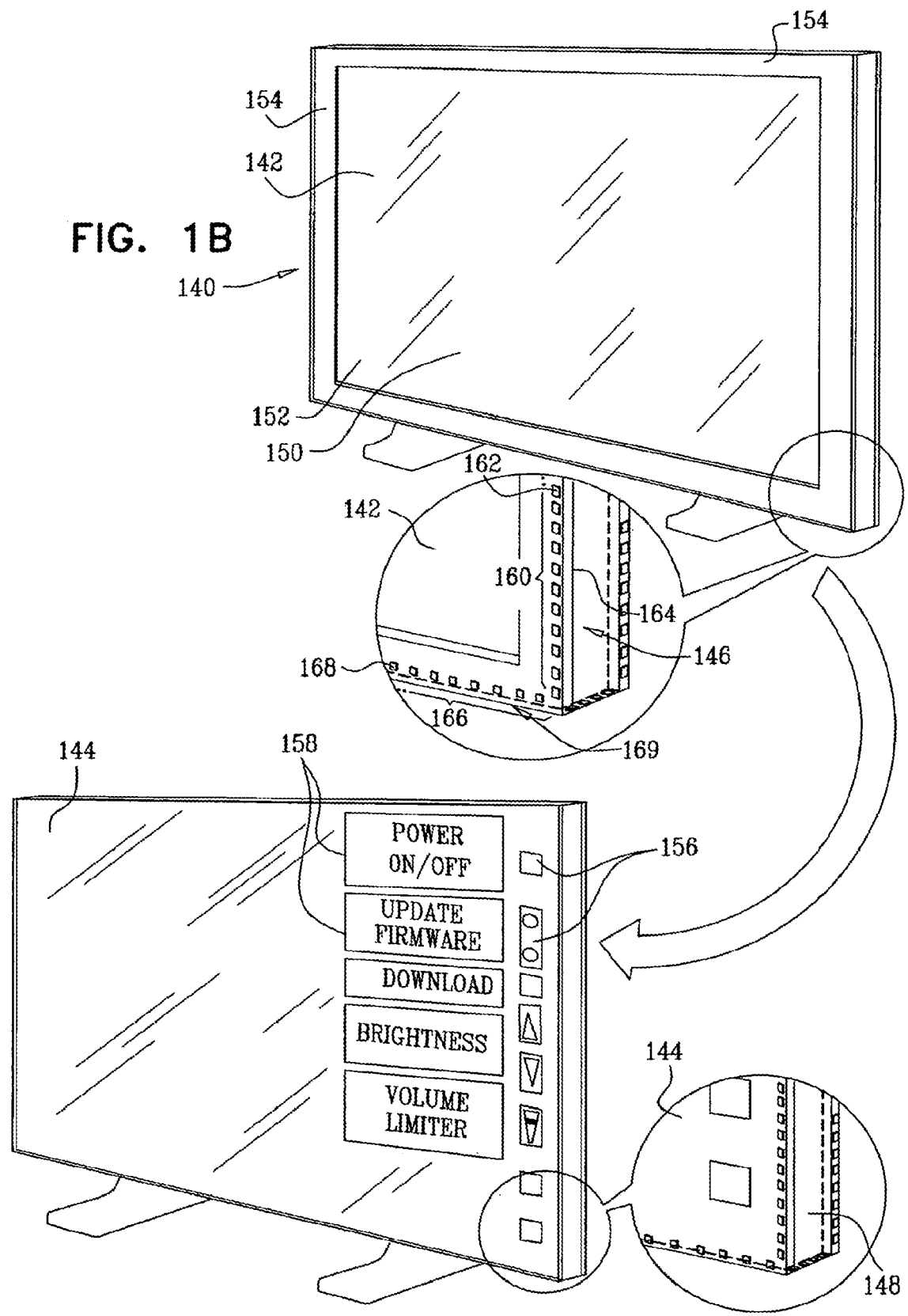

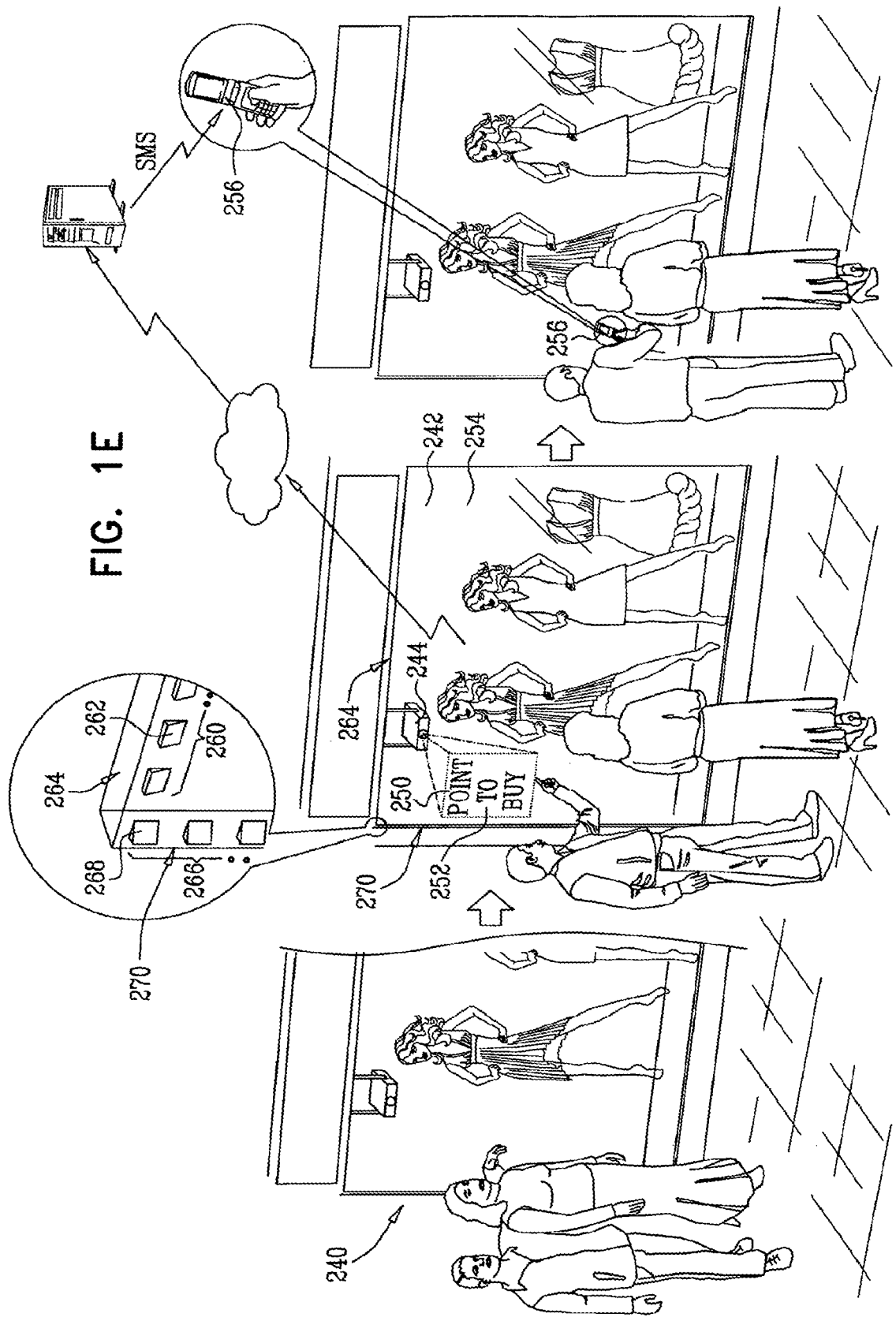

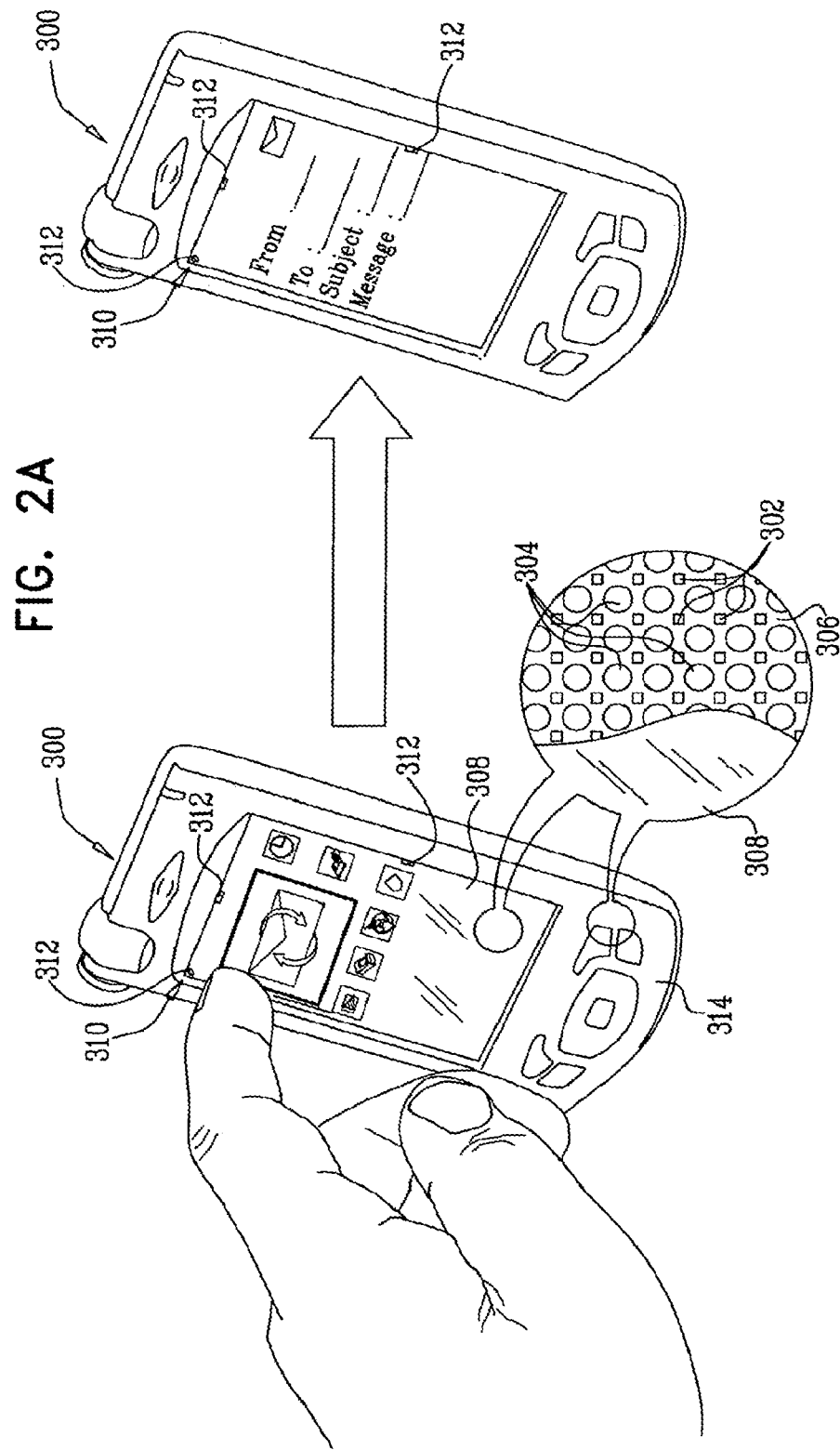

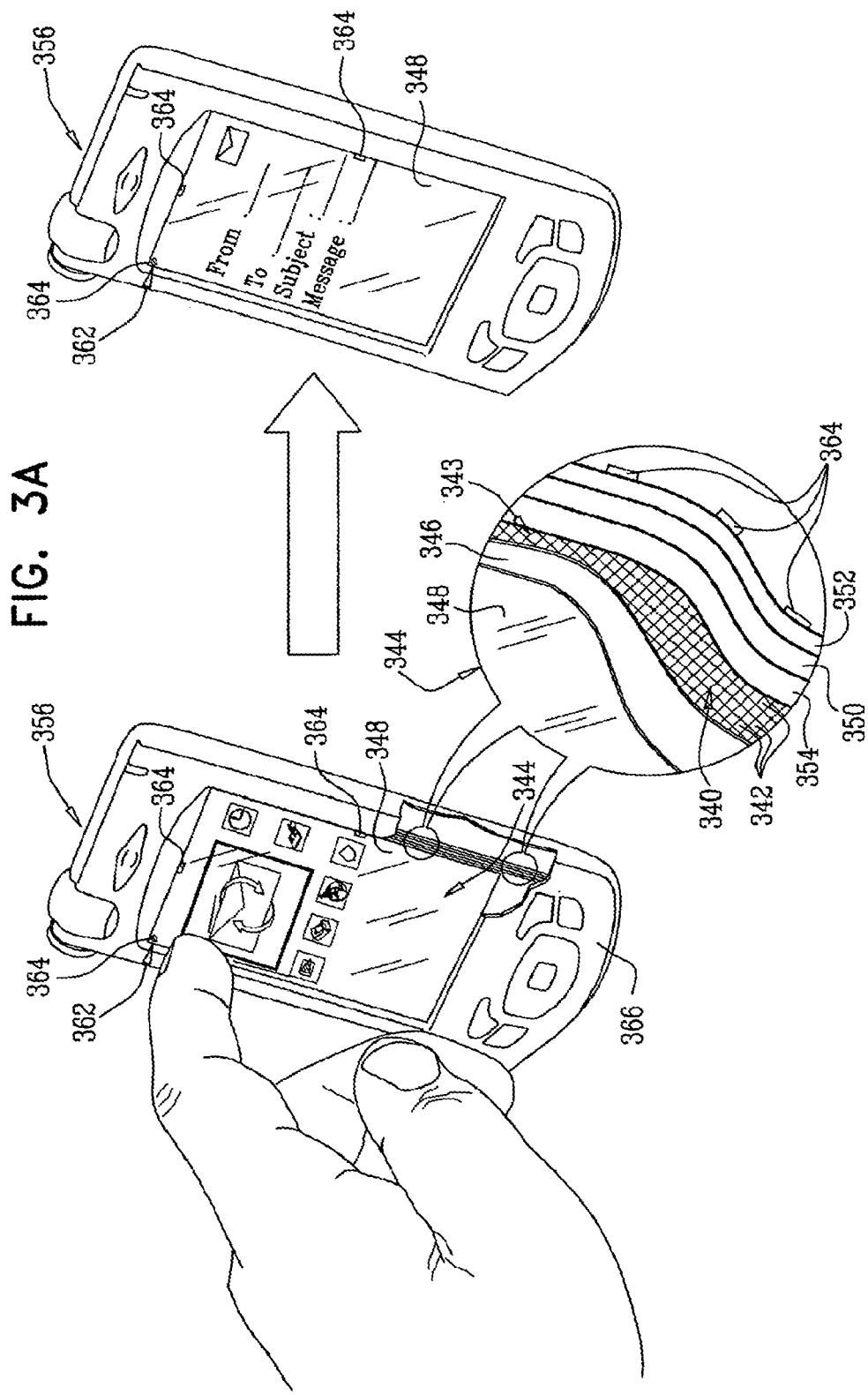

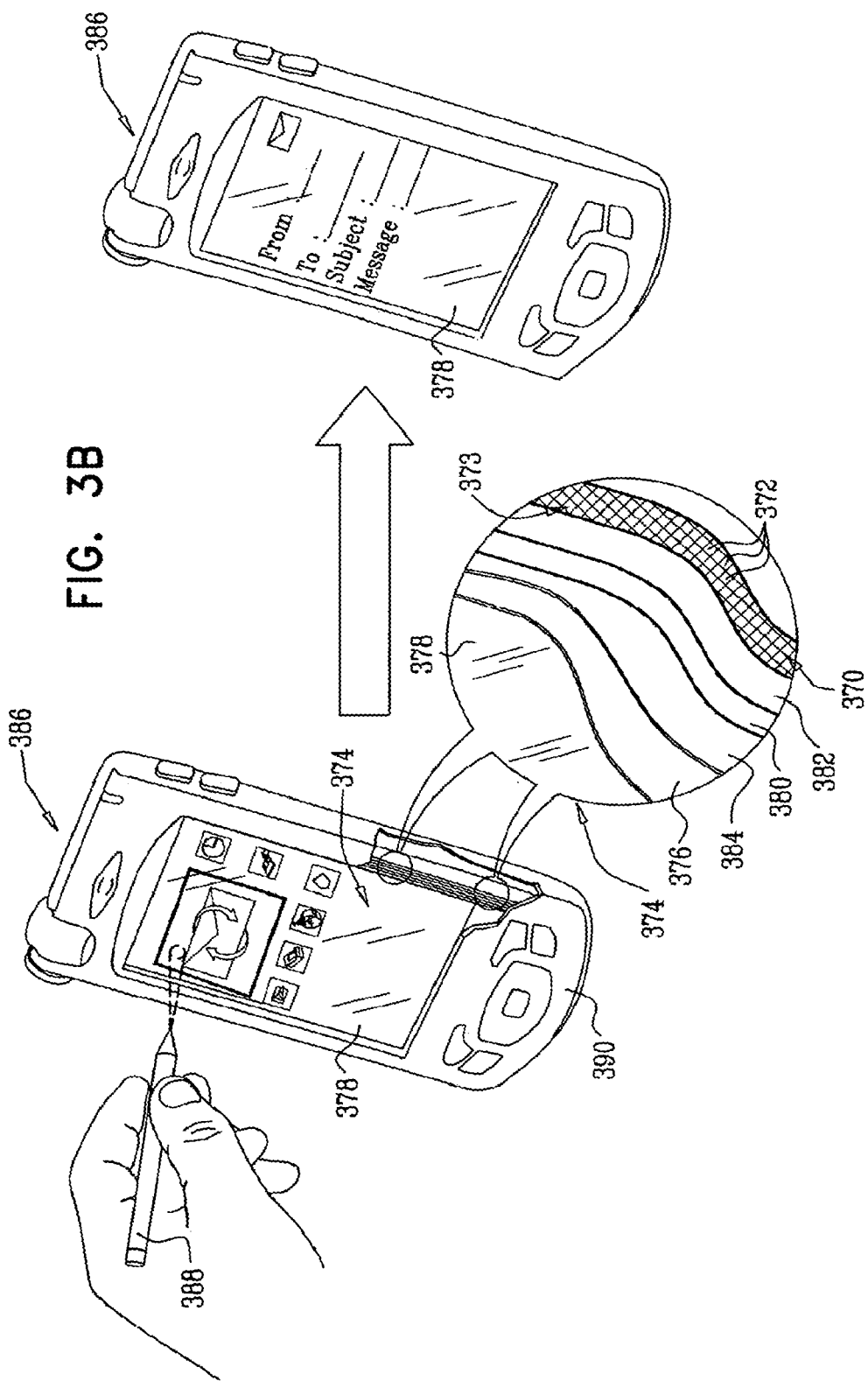

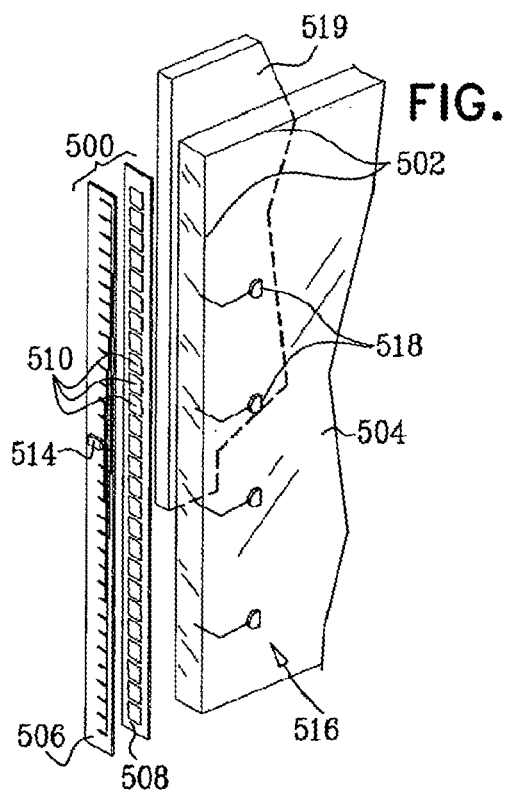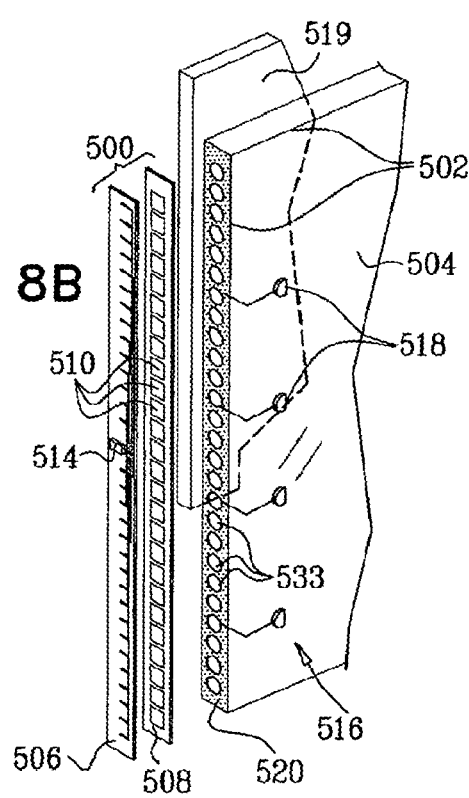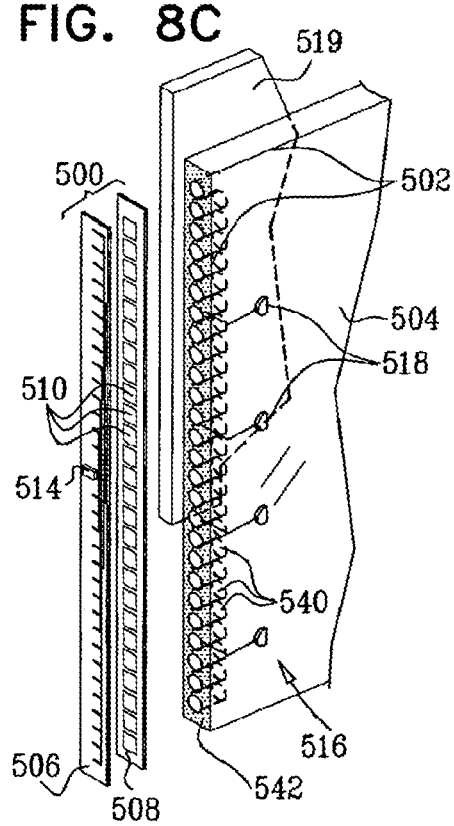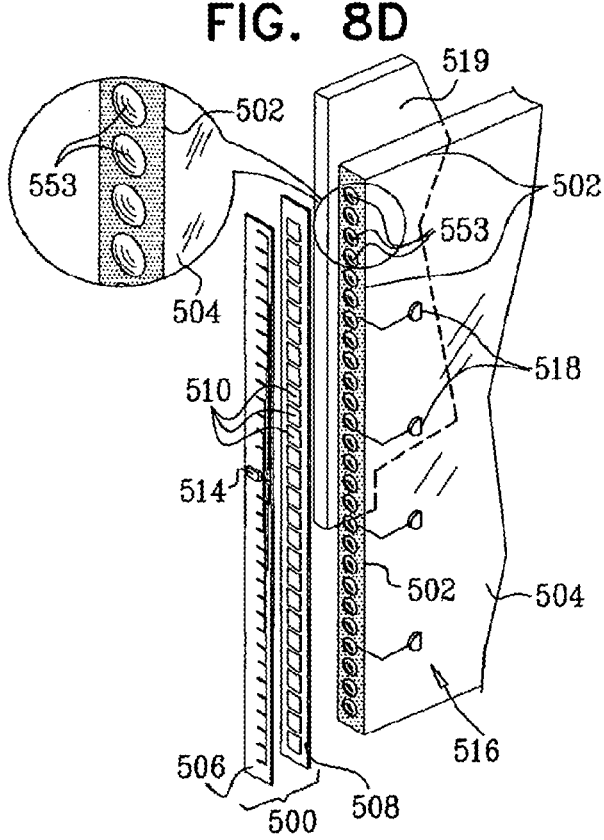

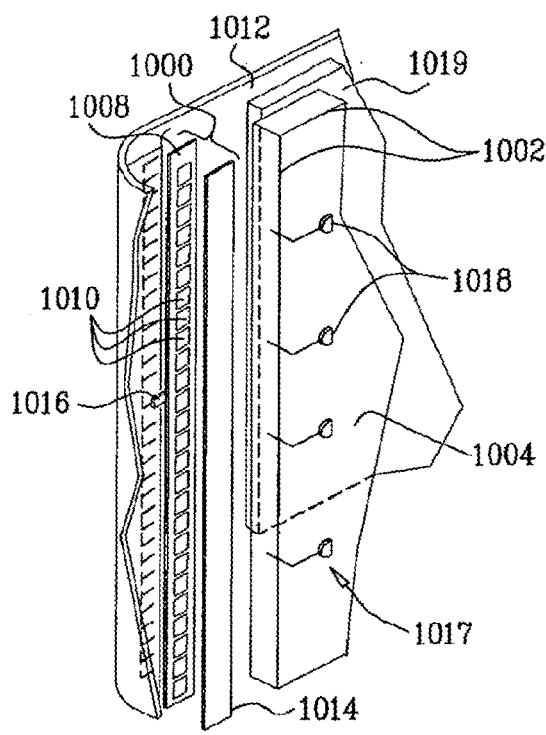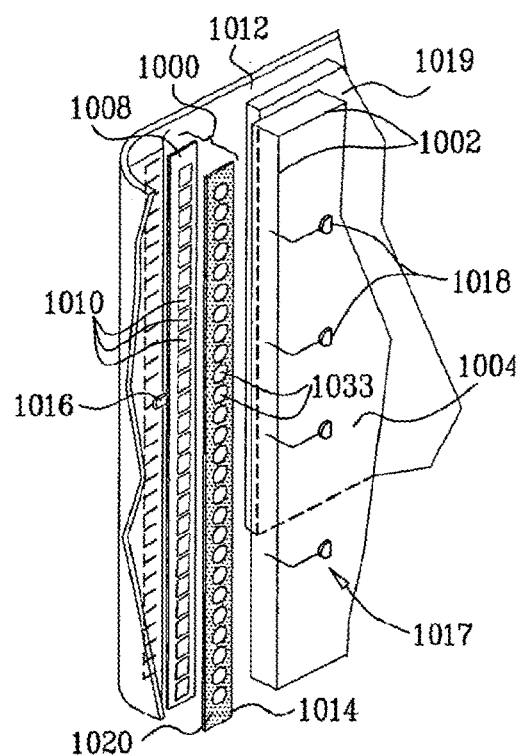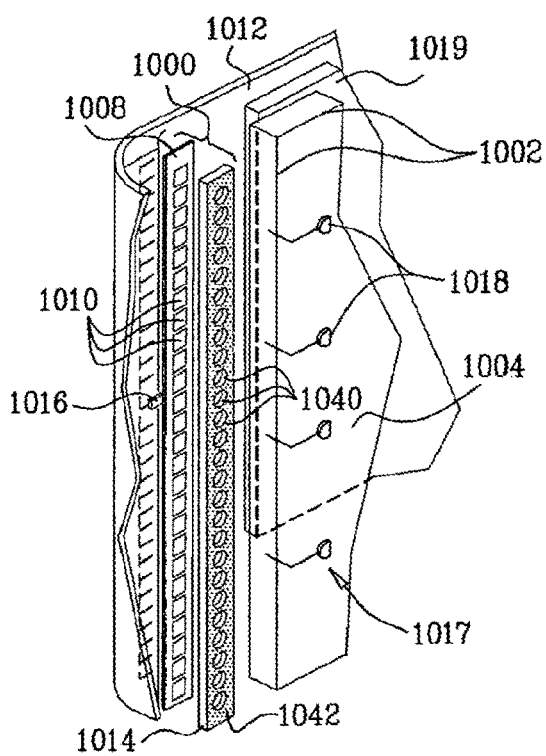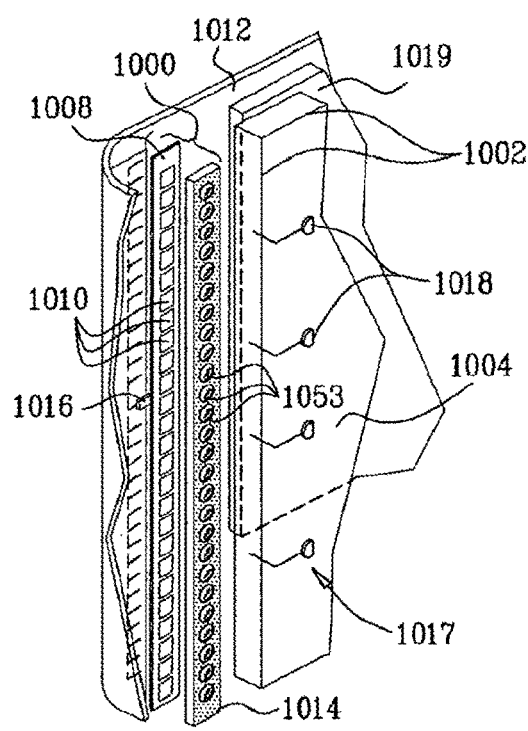

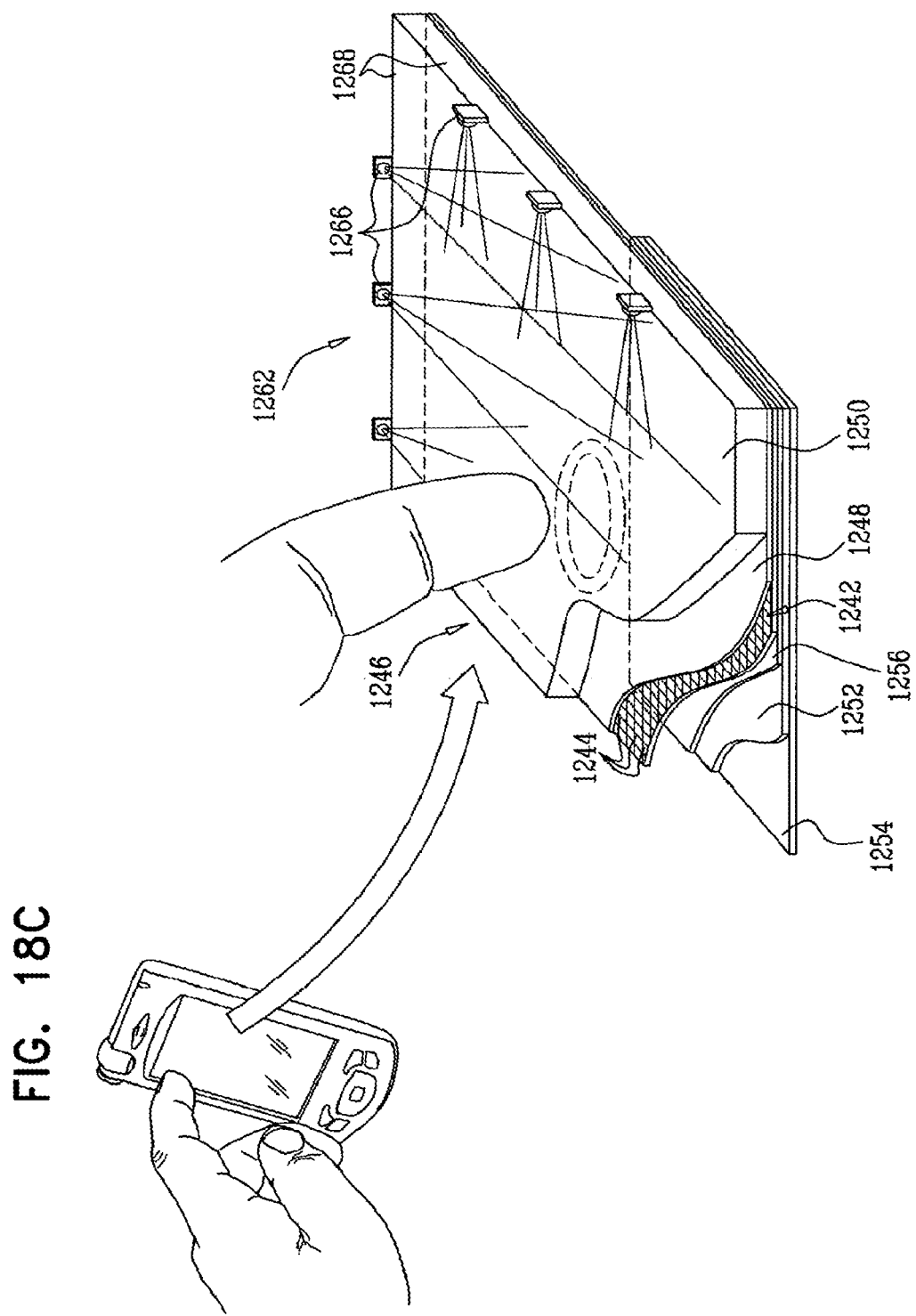

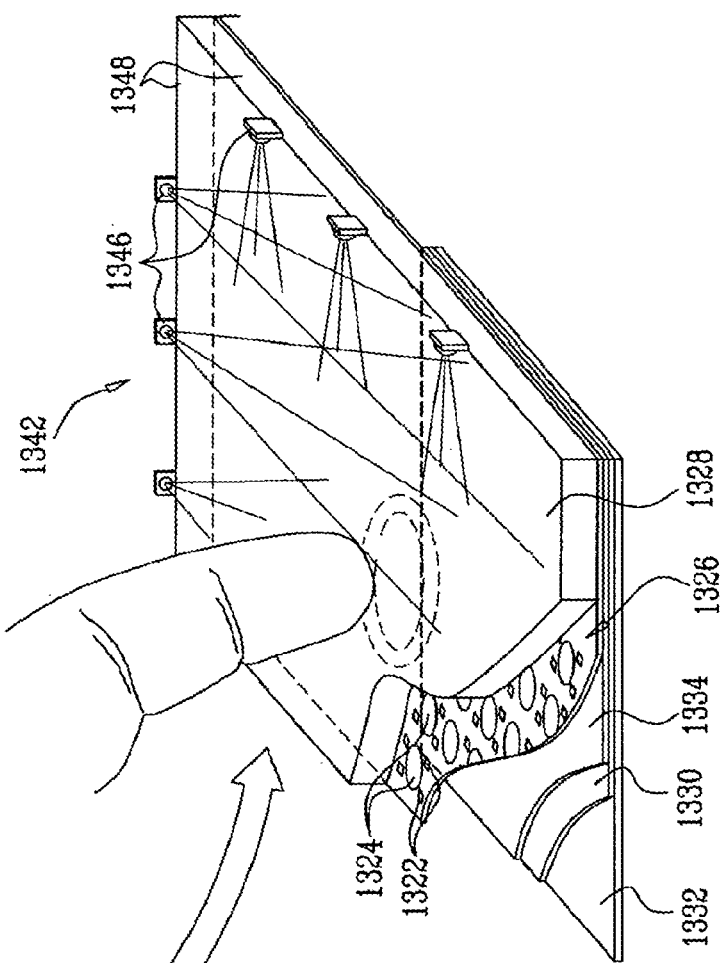
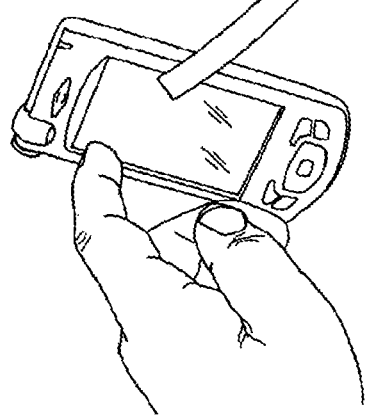
FIG. 18F

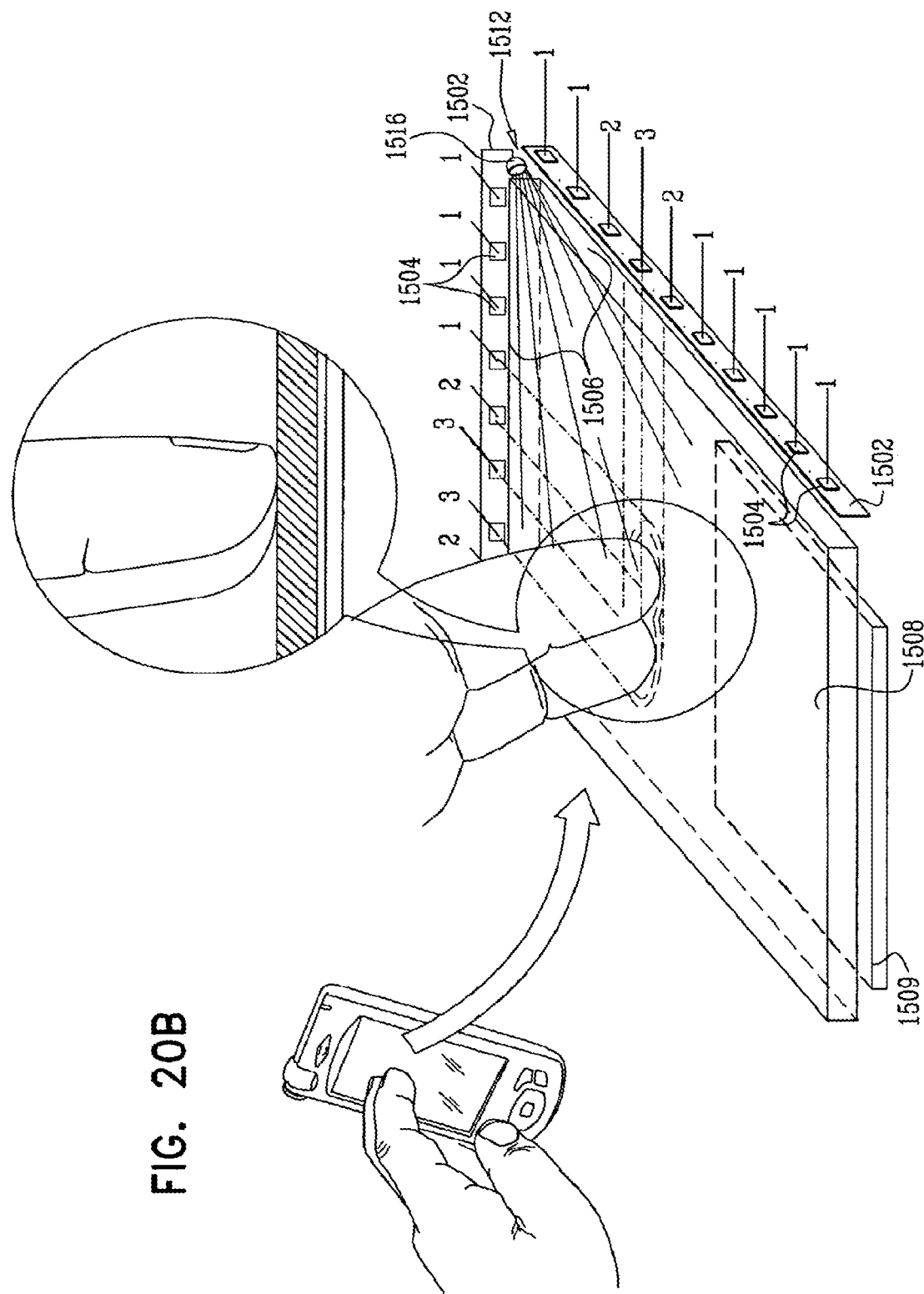

INTERACTIVE DEVICES

CROSS-REFERENCE TO RELATED APPLICATIONS

The present application is a continuation of non-provisional U.S. patent application Ser. No. 16/713,909, filed Dec. 13, 2019, which is a continuation of non-provisional U.S. patent application Ser. No. 15/130,899, filed Apr. 15, 2016, now issued U.S. Pat. No. 10,543,496, which is a continuation of non-provisional U.S. patent application Ser. No. 14/108,242, filed Dec. 16, 2013, now issued U.S. Pat. No. 9,317,170, which is a divisional application of non-provisional U.S. patent application Ser. No. 12/531,039, filed Jan. 15, 2010, now issued U.S. Pat. No. 8,610,675, which is a National Phase application under 35 U.S.C. § 371 of PCT Patent Application No. PCT/IL2008/000355, filed Mar. 13, 2008, which claims priority to U.S. Provisional Patent Application No. 60/918,303, filed Mar. 14, 2007, PCT Application No. PCT/IL2007/000332, filed Mar. 14, 2007, and PCT Application No. PCT/IL2007/000433 filed Apr. 1, 2007; the contents of the foregoing are hereby incorporated by reference.

TECHNICAL FIELD

The present disclosure relates to displays, interactive assemblies and user interface functionalities.

BACKGROUND

The following published patent documents, the disclosures of which are hereby incorporated by reference, are believed to represent the current state of the art: Great Britain Patent Numbers: GB2299856 and GB2289756; European Patent Number: EP0572182;

PCT Patent Application Publication Numbers: WO 02/043045, WO 03/104965 A2; WO 2005/094176 A3; WO 95/02801 and WO 2005/094176. U.S. Pat. Nos. 6,404,416; 6,094,188; 6,081,255; 6,028,649; 5,926,168; 5,892,501; 5,448,261; 5,227,985; 5,949,402; 5,959,617; 5,122,656; 5,506,605 and 4,320,292; and U.S. Patent Publication Nos.: US 2001/0050672, 2001/0031067 and 2005/0156914.

SUMMARY

The present disclosure seeks to provide improved assemblies including improved user interfaces and user interface functionalities, particularly useful for displays, such as those employed with computers, televisions, personal communicators and other mobile devices.

There is thus provided in accordance with a preferred embodiment of the present disclosure an interactive assembly including at least one interactive surface element, at least a first region of the at least one interactive surface element having first user sensible functionality and at least a second region of the at least one interactive surface element having second functionality, different from the first user sensible functionality, input sensor functionality, including at least one input sensor located in propinquity to at least one of the at least one interactive surface element, operative to sense impingement of an electromagnetic radiation spot on at least one of the at least one first region and the at least one second region of the at least one interactive surface element and utilization functionality for employing outputs of the input sensor functionality in respect of impingement on either or both of the at least one first region and the at least one second region. Preferably, the interactive assembly also includes at least one IR illuminator for illuminating at least one object having at least a predetermined degree of propinquity to the at least one interactive element. Additionally, the at least one illuminator also functions as at least one backlighting illuminator associated with the at least one interactive element. Preferably, the at least one illuminator is located in a plane coplanar with or parallel to the at least one sensor. Additionally or alternatively, the at least one illuminator is located generally in the same plane as at least one backlighting illuminator associated with the at least one interactive element.

Preferably, the at least one sensor senses light reflected from the at least one object. Additionally or alternatively, the at least one sensor senses ambient light reflected from the at least one object. Alternatively or additionally, the at least one sensor senses IR light reflected from the at least one object.

Preferably, the at least one object is at least one finger. Alternatively or additionally, the at least one object is at least one pointing device.

Preferably, the utilization functionality includes utilization circuitry. Additionally, the utilization circuitry provides chording functionality. Additionally or alternatively, the utilization circuitry provides functionality to distinguish at least between positions of the at least one object when touching and not touching the interactive assembly. Preferably, the utilization circuitry provides functionality to distinguish at least between directions of motion of the at least one object towards and away from the interactive assembly. Preferably, the utilization circuitry provides functionality to compute at least one characteristic of a trajectory of motion of the at least one object generally parallel to the interactive surface element. Additionally, the at least one characteristic includes at least one of location, direction, velocity and change in direction.

Preferably, the utilization circuitry provides functionality for panning and scrolling. Additionally or alternatively, the utilization circuitry provides functionality for one-handed zooming.

Preferably, the utilization circuitry provides functionality for employing a sensed distinction between instances when the at least one object touches and does not touch the device. Additionally or alternatively, the utilization circuitry provides functionality for mouse over and click. Alternatively or additionally, the utilization circuitry provides functionality for turning pages. Additionally or alternatively, the utilization circuitry provides functionality for gaming. Alternatively or additionally, the utilization circuitry provides functionality utilizing differences in sensed relative positions of a user's fingers. Preferably, the utilization circuitry provides interactive television functionality. Additionally or alternatively, the utilization circuitry provides portable computer functionality.

Preferably, the at least one sensor includes at least one detector element arranged in a plane parallel to a viewing plane. Additionally or alternatively, the at least one sensor is coplanar with the viewing plane. Alternatively, the at least one detector element includes a plurality of detector elements arranged in a plane parallel to the viewing plane.

Preferably, the at least one sensor includes a detector assembly arranged at least one edge of the interactive surface element. Additionally, the detector assembly is arranged about the at least one edge of the interactive surface element.

Alternatively, the detector assembly is arranged along the at least one edge of the interactive surface element.

Preferably, the detector assembly includes a support substrate and an arrangement of detector elements. Additionally, the detector assembly also includes a cover layer. Additionally or alternatively, the support substrate is integrated with a housing of an interactive device. Preferably, the arrangement of detector elements includes a plurality of discrete single-element detectors. Alternatively, the arrangement of detector elements includes an integrally formed multi-element detector array. In a further alternative embodiment, the arrangement of detector elements includes a plurality of discrete multi-element detectors. Preferably, the cover layer is formed of a light transmissive material.

Alternatively, the cover layer includes a mask having apertures defined therein. In another alternative embodiment, the cover layer includes a field-of-view defining mask having light-collimating tunnel-defining apertures. In a further alternative embodiment the cover layer includes lenses. Preferably, the at least one edge includes a mask having apertures defined therein. Alternatively, the at least one edge includes a field-of-view defining mask having light-collimating tunnel-defining apertures. In another alternative embodiment, the at least one edge includes lenses.

Preferably, the at least one sensor includes a plurality of generally forward-facing detectors arranged about edges of a display element.

Preferably, at least one detector in the arrangement detects electromagnetic radiation at a baseline level and senses the position of the object with respect to the interactive surface element and the circuitry provides an output according to location of at least one detector in the arrangement for which at least one of the amount of radiation detected and the change in the amount of radiation detected exceed a first predetermined threshold. Additionally, the change in the amount of radiation detected results from at least one detector in the arrangement detecting reflected light from the object in addition to detecting the radiation at the baseline level.

Preferably, the reflected light propagates within the interactive surface element coinciding with a viewing plane to at least one detector in the arrangement. Alternatively, the reflected light propagates above the interactive surface element coinciding with a viewing plane to at least one detector in the arrangement. In another alternative embodiment the reflected light is transmitted through the interactive surface element coinciding with a viewing plane directly to at least one detector in the arrangement. Preferably, the at least one detector in the arrangement detects radiation at the baseline level, senses the position of the object with respect to the interactive surface element and the circuitry provides the output according to location of at least one detector in the arrangement at which the amount of radiation detected is below a second predetermined threshold. Preferably, the interactive assembly also includes a processing subassembly including detector analyzing processing circuitry operative to receive detector outputs of individual detectors in the arrangement, to determine at least one of whether the amount of radiation detected by the individual detectors exceeds the first predetermined threshold, whether the change in the amount of radiation detected by the individual detectors exceeds the first predetermined threshold and whether the amount of radiation detected by the individual detectors is below the second predetermined threshold, and to provide detector analysis outputs for the individual detectors, array processing circuitry operative to receive the detector analysis outputs of individual detectors in the arrangement and to generate an array detection output therefrom and position ascertaining circuitry operative to receive the array detection output of the arrangement and to ascertain the position of the object therefrom.

Preferably, the array detection output includes information corresponding to the location of an impingement point of the object on the interactive surface element coinciding with a viewing plane. Alternatively, the array detection output includes information corresponding to the location of the object relative to the interactive surface element coinciding with a viewing plane.

Preferably, the radiation at the baseline level is provided by at least one source of illumination external to the interactive device. Additionally, the at least one source of illumination includes at least one of sunlight, artificial room lighting and IR radiation emitted from a human body. Alternatively or additionally, the interactive assembly also includes an illumination subassembly operative to provide illumination for augmenting the radiation at the baseline level. Alternatively or additionally, the interactive assembly also includes an illumination subassembly operative to provide the radiation at the baseline level.

Preferably, the illumination subassembly includes at least one electromagnetic radiation emitting source. Additionally, the at least one electromagnetic radiation emitting source includes at least one of at least one IR emitting LED and at least one visible light emitting LED.

Preferably, the at least one electromagnetic radiation emitting source is disposed at an intersection of two mutually perpendicular edges of the interactive surface element coinciding with a viewing plane. Alternatively, the at least one electromagnetic radiation emitting source forms part of a linear arrangement of display backlights underlying the interactive surface element coinciding with a viewing plane.

Preferably, the illumination subassembly includes at least one generally linear arrangement of a plurality of electromagnetic radiation emitting sources arranged in parallel to at least one edge of the interactive surface element coinciding with a viewing plane. Additionally, at least one of the at least one generally linear arrangement is arranged behind the at least one sensor.

There is also provided in accordance with another preferred embodiment of the present disclosure a position sensing assembly including an interactive surface element defining a surface, at least one pixel array including a plurality of detector elements detecting electromagnetic radiation at a baseline level, the at least one pixel array being operative to sense a position of an object with respect to the surface according to locations of ones of the plurality of detector elements at which at least one of the amount of radiation detected and the change in the amount of radiation detected exceed a predetermined threshold, the at least one pixel array being operative to sense at least a position of at least one object with respect to the at least one pixel array when the at least one object has at least a predetermined degree of propinquity to the at least one pixel array and circuitry receiving an output from the at least one pixel array and providing a non-imagewise input representing the position of the at least one object relative to the at least one pixel array to utilization circuitry.

Preferably, the position sensing assembly also includes at least one IR illuminator for illuminating the at least one object when it has the at least a predetermined degree of propinquity to the at least one pixel array. Additionally, the at least one illuminator also functions as at least one backlighting illuminator associated with a display associated with the at least one pixel array. Alternatively, the at least one illuminator is located in a plane coplanar with or parallel to the at least pixel array. Additionally or alternatively, the at least one illuminator is located generally in the same plane as at least one backlighting illuminator.

Preferably, the at least one pixel array senses light reflected from the at least one object. Additionally, the at least one pixel array senses ambient light reflected from the at least one object. Additionally or alternatively, the at least one pixel array senses IR light reflected from the at least one object.

Preferably, the at least one object is at least one finger. Additionally or alternatively, the at least one object is at least one positioning device.

Preferably, the position sensing assembly also includes utilization circuitry. Preferably, the utilization circuitry provides chording functionality. Additionally or alternatively, the utilization circuitry provides functionality to distinguish at least between positions of the at least one object when touching and not touching the device. Alternatively or additionally, the utilization circuitry provides functionality to distinguish at least between directions of motion of the at least one object towards and away from the device. Preferably, the utilization circuitry provides functionality to compute at least one characteristic of a trajectory of motion of the at least one object generally parallel to the at least one pixel array. Additionally, the at least one characteristic includes at least one of location, direction, velocity and change in direction.

Preferably, the utilization circuitry provides functionality for panning and scrolling. Additionally or alternatively, the utilization circuitry provides functionality for one-handed zooming. Alternatively or additionally, the utilization circuitry provides functionality for employing a sensed distinction between instances when the at least one object touches and does not touch the device. Additionally or alternatively, the utilization circuitry provides functionality for mouse over and click. Alternatively or additionally, the utilization circuitry provides functionality for turning pages. Additionally or alternatively, the utilization circuitry provides functionality for gaming. Alternatively or additionally, the utilization circuitry provides functionality utilizing differences in sensed relative positions of a user's fingers.

Preferably, the change in the amount of radiation detected results from ones of the plurality of detector elements detecting reflected light from the object in addition to detecting the radiation at the baseline level. Additionally, the reflected light propagates within the interactive surface element to ones of the plurality of detector elements. Alternatively, the reflected light propagates above the surface to ones of the plurality of detector elements. In another alternative embodiment, the reflected light is transmitted through the interactive surface element directly to at least one of the plurality of detector elements. Preferably, the position sensing assembly also includes a processing subassembly including detector analyzing processing circuitry operative to receive detector outputs of individual ones of the plurality of detector elements, to determine whether at least one of the amount of radiation and the change in the amount of radiation detected by the individual ones of the plurality detector element exceeds the predetermined threshold, and to provide detector analysis outputs for the individual ones of the plurality of detector elements, array processing circuitry operative to receive the detector analysis outputs of the plurality of detector elements of a single one of the at least one pixel array and to generate an array detection output therefrom and position ascertaining circuitry operative to receive the array detection output of the at least one pixel array and to ascertain the position of the object therefrom.

Preferably, the array detection output includes information corresponding to the location of an impingement point of the object on the surface. Alternatively, the array detection output includes information corresponding to the location of the object relative to the surface. Preferably, the position of the object includes at least one of a two-dimensional position of the object, a three-dimensional position of the object and angular orientation of the object.

Preferably, the radiation at the baseline level is provided by at least one source of radiation external to the position sensing assembly. Additionally, the at least one source of radiation includes at least one of sunlight, artificial room lighting and IR radiation emitted from a human body. Preferably, the position sensing assembly also includes an illumination subassembly operative to provide illumination for augmenting the radiation at the baseline level. Alternatively or additionally, the position sensing assembly also includes an illumination subassembly operative to provide the radiation at the baseline level to the plurality of detector elements. Preferably, the illumination subassembly includes at least one electromagnetic radiation emitting source. Additionally, the at least one electromagnetic radiation emitting source includes at least one of at least one IR emitting LED and at least one visible light emitting LED.

Preferably, the at least one pixel array includes at least two pixel arrays arranged at mutually perpendicular edges of the plate. Additionally, the illumination subassembly includes an electromagnetic radiation emitting source disposed at an intersection of two of the at least two pixel arrays. Alternatively, the illumination subassembly includes an electromagnetic radiation emitting source disposed at an intersection of two mutually perpendicular edges of the plate, and across from an intersection point of two of the at least two pixel arrays. In another alternative embodiment, the illumination subassembly includes at least one electromagnetic radiation emitting source forming part of a linear arrangement of display backlights underlying the plate. Additionally, the at least one electromagnetic radiation emitting source includes an IR emitting LED. Preferably, the illumination subassembly includes at least one generally linear arrangement of a plurality of electromagnetic radiation emitting sources arranged in parallel to at least one edge of the plate. Additionally, at least one of the at least one generally linear arrangement is arranged behind at least one of the at least two pixel arrays. Preferably, the at least one pixel array is arranged in a plane parallel to the surface. Additionally, the illumination subassembly includes at least one generally linear arrangement of a plurality of electromagnetic radiation emitting sources arranged in parallel to at least one edge of the plate. Alternatively, the illumination subassembly includes an electromagnetic radiation emitting source disposed at an intersection of two mutually perpendicular edges of the plate.

Preferably, the at least one pixel array includes a single pixel array arranged along an edge of the plate. Additionally, the illumination subassembly includes an electromagnetic radiation emitting source disposed at an intersection of edges of the plate. Alternatively, the illumination subassembly includes at least one electromagnetic radiation emitting source forming part of a linear arrangement of display backlights underlying the plate. Additionally, the at least one electromagnetic radiation emitting source includes an IR emitting LED.

Preferably, the illumination subassembly includes at least one generally linear arrangement of a plurality of electromagnetic radiation emitting sources arranged in parallel to at least one edge of the plate. Additionally, at least one of the at least one generally linear arrangement is arranged behind the single pixel array.

BRIEF DESCRIPTION OF THE DRAWINGS

The present disclosure will be more fully understood and appreciated from the following detailed description, taken in conjunction with the drawings in which:

FIGS. 1A, 1B, 1C, 1D, 1E and 1F are simplified illustrations of six types of interactive assemblies constructed and operative in accordance with a preferred embodiment of the present disclosure;

FIGS. 2A and 2B are simplified illustrations of portions of two types of integrated display and input devices constructed and operative in accordance with another preferred embodiment of the present disclosure, including detectors arranged in a plane parallel to a viewing plane;

FIGS. 3A and 3B are simplified illustrations of portions of two types of integrated display and input devices constructed and operative in accordance with yet another preferred embodiment of the present disclosure, employing elements arranged in parallel planes, parallel to a viewing plane;

FIGS. 8A, 8B, 8C and 8D are simplified illustrations of four alternative embodiments of a portion of an input device constructed and operative in accordance with another preferred embodiment of the present disclosure employing detectors arranged along edges of a display element;

FIGS. 14A, 14B, 14C and 14D are simplified illustrations of four alternative embodiments of a portion of an input device constructed and operative in accordance with an additional preferred embodiment of the present disclosure, employing forward-facing detectors arranged about edges of a display element.

FIGS. 18A, 18B, 18C, 18D, 18E and 18F are simplified illustrations of six alternative embodiments of an illumination subassembly forming part of an interactive assembly constructed and operative in accordance with a preferred embodiment of the present disclosure;

FIGS. 20A, 20B, 21A, 21B and 22 are simplified illustrations of the operation of an interactive assembly constructed and operative in accordance with another preferred embodiment of the present disclosure.

DETAILED DESCRIPTION

Figure 1A:
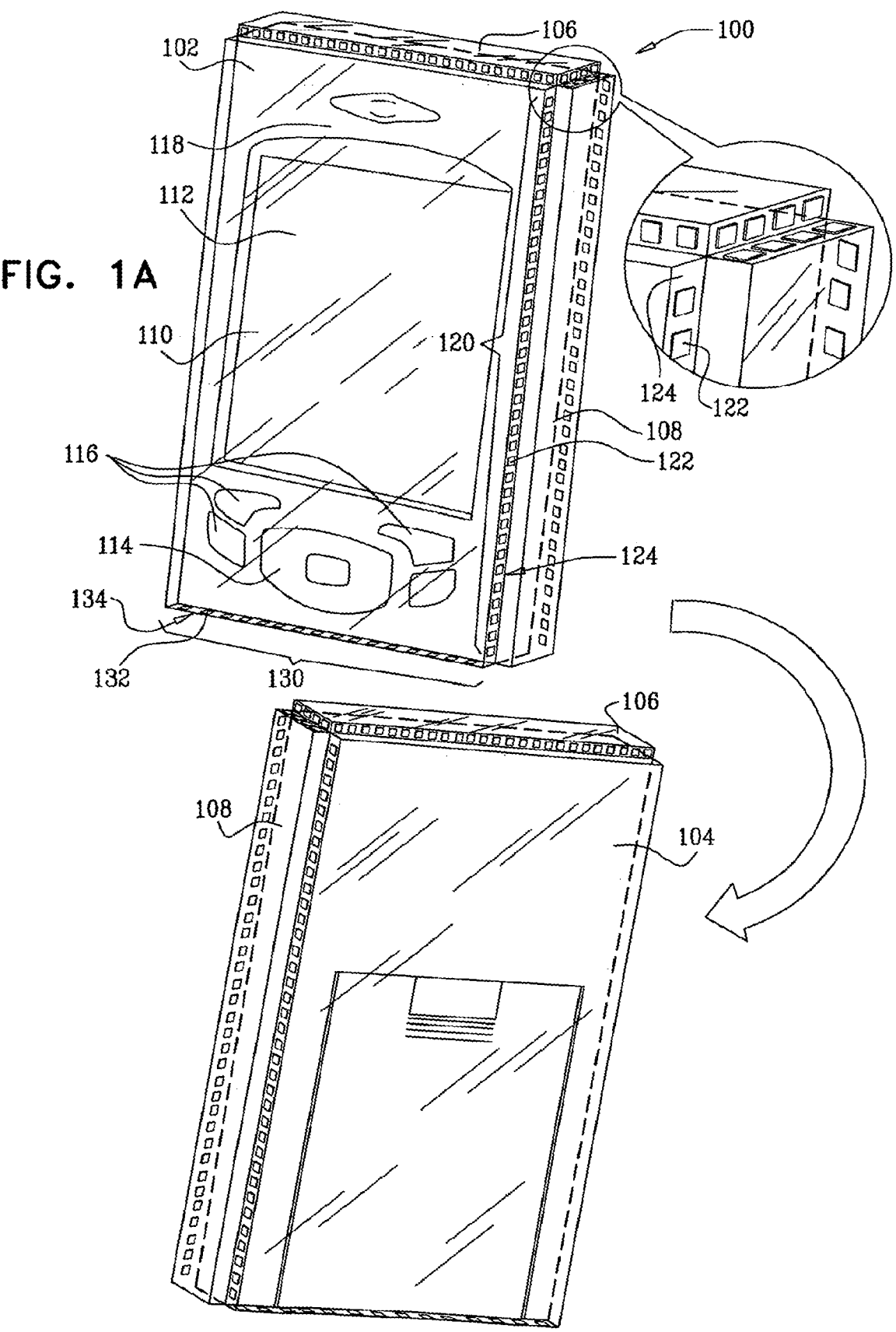

Reference is now made to FIGS. 1A, 1B, 1C, 1D, 1E and 1F, which are simplified illustrations of six types of interactive assemblies constructed and operative in accordance with a preferred embodiment of the present disclosure. These assemblies preferably include at least one interactive surface element, at least a first region of the at least one interactive surface element having first user sensible functionality and at least a second region of the at least one interactive surface element having second functionality, different from the first user sensible functionality, input sensor functionality, including at least one input sensor located in propinquity to at least one of the at least one interactive surface element, operative to sense impingement of an electromagnetic radiation spot on at least one of the at least one first region and the at least one second region of the at least one interactive surface element and utilization functionality for employing outputs of the input sensor functionality in respect of impingement on either or both of the at least one first region and the at least one second region.

The interactive assembly may also include at least one IR illuminator for illuminating at least one object when it has at least a predetermined degree of propinquity to the at least one interactive surface element. Additionally, the illuminator may also function as a backlighting or frontlighting illuminator associated with the at least one interactive surface element. Alternatively or additionally, the illuminator may be located in a plane coplanar with or parallel to the at least one input sensor. Alternatively or additionally, the illuminator may be located remotely from the at least one input sensor and/or from said at least one interactive surface element. In another preferred embodiment, the illuminator is located generally in the same plane as a backlighting illuminator associated with the at least one interactive surface element.

In one preferred embodiment, the at least one input sensor is preferably operable to sense light reflected from one or more objects having at least a predetermined degree of propinquity to the at least one interactive surface element. The light sensed by the at least one input sensor may be ambient light reflected from the at least one object. The reflected IR light may be ambient IR light or IR light provided by the illuminator.

Alternatively or additionally, the light sensed by the at least one input sensor may be IR light originating from the at least one object. The at least one object may be at least one finger or for example a stylus or remote control device or alternatively any other suitable device.

In another preferred embodiment, the interactive device utilization circuitry additionally may provide one or more or the following functionalities: chording functionality, functionality to distinguish at least between positions of the at least one object when touching and not touching the device, functionality to distinguish at least between directions of motion of the at least one object towards and away from the device, functionality to compute at least one characteristic of a trajectory of motion of the at least one object relative to the pixel array, the characteristic including at least one of location, direction, velocity and change in direction, functionality for panning and scrolling, functionality for one-handed zooming, functionality for employing a sensed distinction between instances when the at least one object touches and does not touch the device, functionality for mouse over and click, functionality for turning pages, functionality for gaming, functionality for identifying at least one three-dimensional location of the at least one object relative to the interactive surface element, functionality for identifying angle and/or orientation of the at least one object relative to the interactive surface, and functionality utilizing differences in sensed relative positions of a user's fingers.

FIG. 1A illustrates a mobile telephone 100 having multiple interactive surface elements including a front interactive surface element 102, a back interactive surface element 104, a top edge interactive surface element 106, a bottom edge interactive surface element (not shown) a first side edge interactive surface element 108 and a second side edge interactive surface element (not shown). Preferably, at least one of the interactive surface elements, at least a first region thereof, has first user sensible functionality and, at least a second region thereof, has second functionality, different from the first user sensible functionality.

Thus, for example, in the illustrated embodiment of FIG. 1A, front interactive surface element 102 includes a first region 110 overlying a display 112, a second region 114 overlying function activation areas 116 and a third region 118 defining a circumferential margin surrounding display 112.

It is appreciated that the remaining interactive surface elements, such as interactive surface elements 104, 106 and 108, may also include plural regions having differing functionalities in the illustrated embodiment of FIG. 1A, the input sensor functionality preferably includes linear arrays of sensors distributed along edges of the various interactive surface elements. As seen in FIG. 1A, a linear array 120 of sensors 122 is arranged along a side edge 124 of front interactive surface element 102 and a linear array 130 of sensors 132 is arranged along a bottom edge 134 of front interactive surface element 102. Similar arrangements of sensor arrays are shown for interactive surface elements 104, 106 and 108. Sensors 122 and 132 are seen to be located in propinquity to edge surfaces of the interactive surface elements and are operative to sense impingement of an electromagnetic radiation spot (not shown) on at least one of the at least one first region, such as region 110, and the at least one second region, such as region 114, of at least one interactive surface element.

Suitable sensors 122 and 132 are, for example, Solderable Silicon Photodiodes commercially available from Advanced Photonix Incorporated of Camarillo, CA, USA under catalog designator PDB-C601-1. Alternatively, a single array of sensors may be provided along only one edge surface of an interactive surface element.

It is appreciated that an interactive surface element may form an integral part of a display module, such as an LCD display module, may form an integral part of a housing for such a display module, may be overlaid thereupon, may be affixed thereto or may be separate therefrom.

FIG. 1B illustrates a large screen display 140, such as a television display, having interactive functionality operative in accordance with a preferred embodiment of the present disclosure. The large screen display 140 includes multiple interactive surface elements including a front interactive surface element 142, a back interactive surface element 144, a top edge interactive surface element (not shown), a bottom edge interactive surface element (not shown), a first side edge interactive surface element 146 and a second side edge interactive surface element 148. Preferably, at least one of the interactive surface elements, at least a first region thereof, has first user sensible functionality and, at least a second region thereof, has second functionality, different from the first user sensible functionality.

Thus, for example, in the illustrated embodiment of FIG. 1B, front interactive surface element 142 includes a first region 150 overlying a display area 152 and a second region 154 defining a circumferential margin surrounding display 152. Back interactive surface element 144 typically includes a first region 156 overlying various types of operational indicators, such as indicator lights, and at least one second region 158 overlying various types of controls, such as POWER ON/OFF, UPDATE FIRMWARE, DOWNLOAD, brightness controls and a volume limiter.

It is appreciated that the remaining interactive surface elements, such as interactive surface elements 146 and 148, may also include plural regions having differing functionalities.

In the illustrated embodiment of FIG. 1B, the input sensor functionality preferably includes linear arrays of sensors distributed along edges of the various interactive surface elements. As seen in FIG. 1B, a linear array 160 of forward-looking sensors 162 is arranged adjacent a side edge 164 of front interactive surface element 142 and a linear array 166 of forward-looking sensors 168 is arranged adjacent a bottom edge 169 of front interactive surface element 142. Similar arrangements of sensor arrays are shown for interactive surface elements 144, 146 and 148. Sensors 162 and 168 are seen to be located in propinquity to edge surfaces of the interactive surface elements and are operative to sense impingement of an electromagnetic radiation spot (not shown) on at least one of the at least one first region and the at least one second region of at least one interactive surface element. Alternatively, a single array of sensors may be provided along only one edge surface of an interactive surface element. Interactive surface elements may include a single layer or multiple layers and may have one or more coating layers associated therewith.

It is appreciated that an interactive surface element may form an integral part of a display module, such as an LCD display module, may form an integral part of a housing for such a display module, may be overlaid thereupon, may be affixed thereto or may be separate therefrom.

Figure 1C:
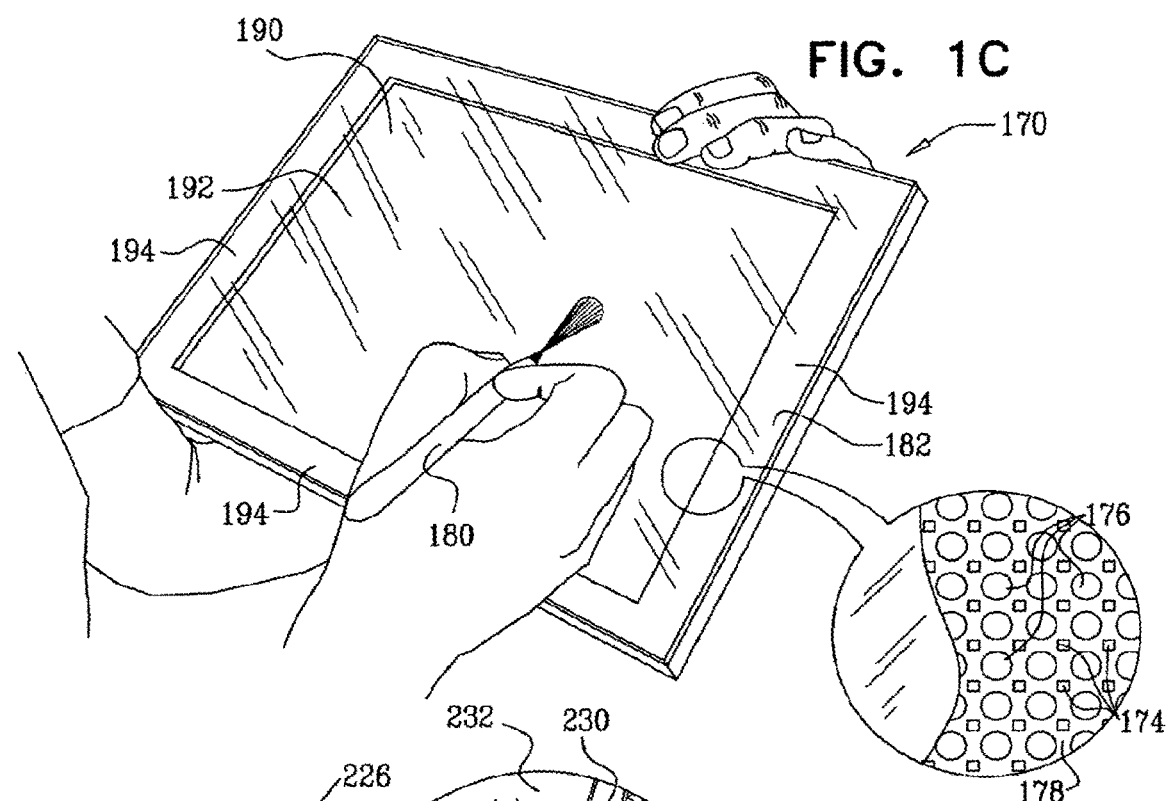

FIG. 1C illustrates a tablet computer 170 having interactive functionality operative in accordance with a preferred embodiment of the present disclosure. As seen in FIG. 1C, a multiplicity of light sensing elements 174 are interspersed among light emitting elements 176 arranged in a plane 178. Examples of such a structure are described in U.S. Pat. No. 7,034,866 and U.S. Patent Application Publication Nos. 2006/0132463A1, 2006/0007222A1 and 2004/00012565A1, the disclosures of which are hereby incorporated by reference. Light, preferably including light in the IR band, for example, emitted by a light beam emitting stylus 180, propagates through a front interactive surface element 182 and is detected by one or more of light sensing elements 174.

The tablet computer 170 may alternatively include multiple interactive surface elements. Preferably, at least one of the interactive surface elements, at least a first region thereof, has first user sensible functionality and, at least a second region thereof, has second functionality, different from the first user sensible functionality. Thus, for example in the illustrated embodiment of FIG. 1C, front interactive surface element 182 includes a first region 190 overlying a display area 192 and a second region 194 defining a circumferential margin surrounding display 192. It is appreciated that additional interactive surface elements may also include plural regions having differing functionalities. In the illustrated embodiment of FIG. 1C, similar arrangements of light detector elements may be provided for additional interactive surface elements (not shown). It is appreciated that the additional interactive surface elements may include sensors of the type described hereinabove with respect to FIGS. 1A and 1B, sensors of the type described hereinabove with respect to FIG. 1C or sensors of any of the types described herein below. Alternatively, a single array of sensors may be provided along only one edge surface of an interactive surface element. Interactive surface elements may include a single layer or multiple layers and may have one or more coating layers associated therewith.

It is appreciated that an interactive surface element may form an integral part of a display module, such as an LCD display module, may form an integral part of a housing for such a display module, may be overlaid thereupon, may be affixed thereto or may be separate therefrom.

Figure 1D:
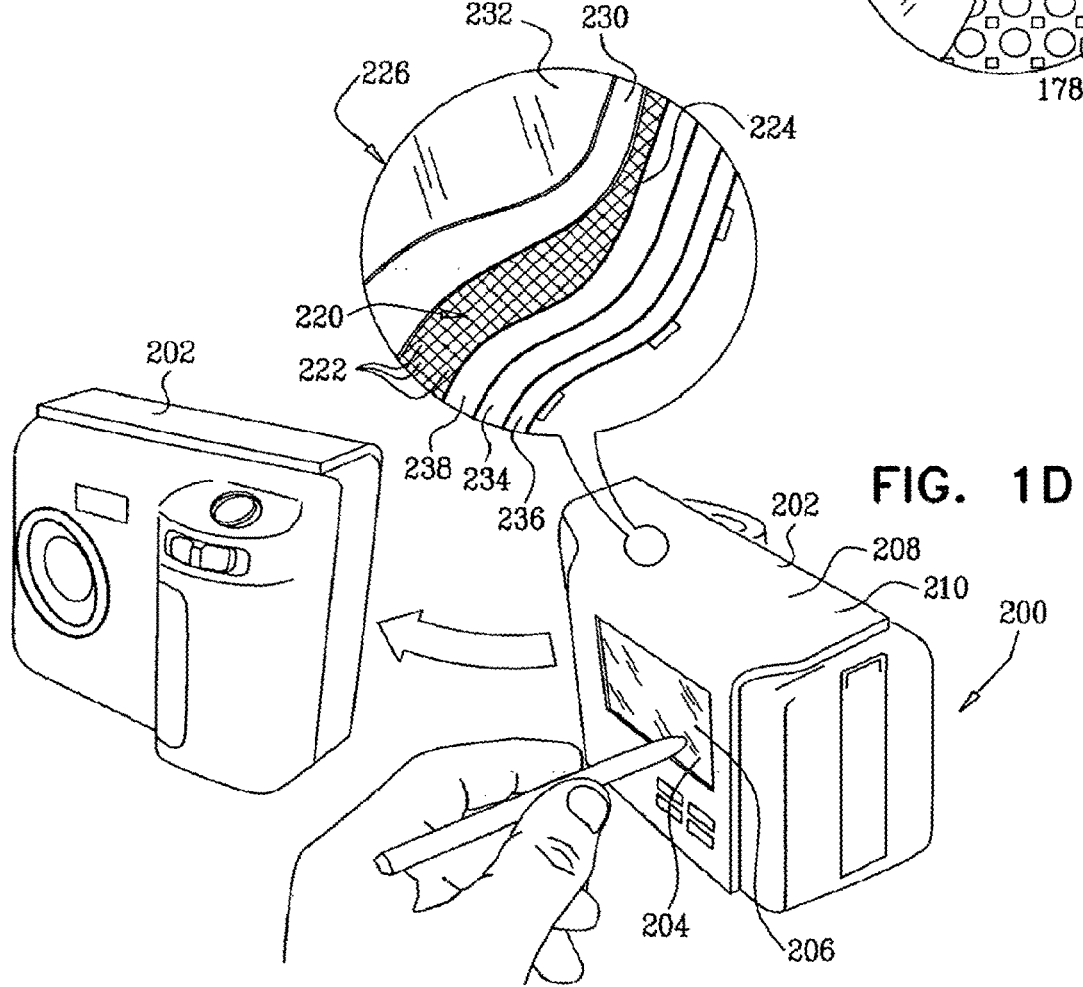

FIG. 1D illustrates a digital camera 200 having interactive functionality employing light reflection in accordance with a preferred embodiment of the present disclosure. The digital camera 200 may include a non-uniplanar interactive surface 202 which may surround one, some or all outer surfaces of the camera. Preferably, interactive surface element 202, at least a first region thereof, has first user sensible functionality and, at least a second region thereof, has second functionality, different from the first user sensible functionality.

Thus, for example, in the illustrated embodiment of FIG. 1D, interactive surface element 202 includes a first region 204 overlying a display area 206 and a second region 208 overlying a top edge 210 of the camera. It is appreciated that additional interactive surface elements may also be provided and may include plural regions having differing functionalities.

In the illustrated embodiment of FIG. 1D, the input sensor functionality preferably includes an array 220 of sensing elements 222 arranged in a plane 224, parallel to a viewing plane 226. Alternatively, the array 220 may be formed of one or more CCD or CMOS arrays or any other suitable type of array and may be created by photolithography. It is appreciated that the plane 224 may be located at any suitable position with respect to the viewing plane 226, as illustrated for example in FIGS. 3A and 3B. As seen in the illustrated embodiment of FIG. 1D, array 220 is arranged behind an IR transmissive display panel 230, such as a panel including LCD or OLED elements, underlying an interactive surface element 232 coinciding with viewing plane 226. Interactive surface element 232 may be a single or multiple layer plate and may have one or more coating layers associated therewith. In the illustrated example, there are provided one or more light diffusing layers 234 overlying a reflector 236. One or more collimating layers 238 are typically interposed between reflector 236 and IR transmissive display panel 230.

It is appreciated that an interactive surface element may form an integral part of a display module, such as an LCD display module, may form an integral part of a housing for such a display module, may be overlaid thereupon, may be affixed thereto or may be separate therefrom.

FIG. 1E illustrates an interactive shop window system 240, having an interactive functionality operative in accordance with a preferred embodiment of the present disclosure. The interactive shop window system 240 preferably employs a front interactive surface element 242, preferably cooperating with a computer-driven display projector 244 operative to project information, including images, on the interactive surface element 242, which images are sensible by passersby. Interactive surface element 242 has, at least a first region thereof, first user sensible functionality and, at least a second region thereof, second functionality, different from the first user sensible functionality. Thus, for example, in the illustrated embodiment of FIG. 1E, front interactive surface element 242 includes a first region 250 on which an image 252 is projected and a second region 254. Both regions 250 and 254 may sense a pointing finger in predetermined propinquity thereto.

In the illustrated embodiment of FIG. 1E, the input sensor functionality preferably includes linear arrays of sensors distributed along edges of the front interactive surface element 242. As seen in FIG. 1E, a linear array 260 of angled generally forward-facing sensors 262 is arranged adjacent a top edge 264 of front interactive surface element 242 and a linear array 266 of angled generally forward-facing sensors 268 is arranged along a side edge 270 of front interactive surface element 242. Sensors 262 and 268 are seen to be located in propinquity to edge surfaces of the interactive surface element and are operative to sense impingement of an electromagnetic radiation spot (not shown) on at least one of the at least one first region, such as region 250, and the at least one second region, such as region 254, of at least one interactive surface element 242. It is appreciated that the interactive surface element 242 preferably forms part of a shop window. Alternatively, the interactive surface element 242 may form an integral part of a frame for shop window, may be overlaid thereupon, may be affixed thereto or may be separate therefrom.

Alternatively, a single array of sensors may be provided along only one edge surface of the interactive surface element 242. Interactive surface elements may include a single layer or multiple layers and may have one or more coating layers associated therewith.

It is appreciated that an interactive surface element may form an integral part of a display module, such as an LCD display module, may form an integral part of a housing for such a display module, may be overlaid thereupon, may be affixed thereto or may be separate therefrom. In the illustrated embodiment, passersby are invited by the projected image 252 to point at an object appearing in the store window. A finger pointed at region 254 may choose a given item and the finger pointed at region 250 may elicit, for example, SMS transmittal of a purchase offer to a cellular telephone 256 of one or both of the passersby. It is appreciated that, as described hereinabove, the interactive functionality of interactive shop window system 240 may be operative to provide different responses to pointing at different regions, such as regions 250 and 254.

Figure 1F:
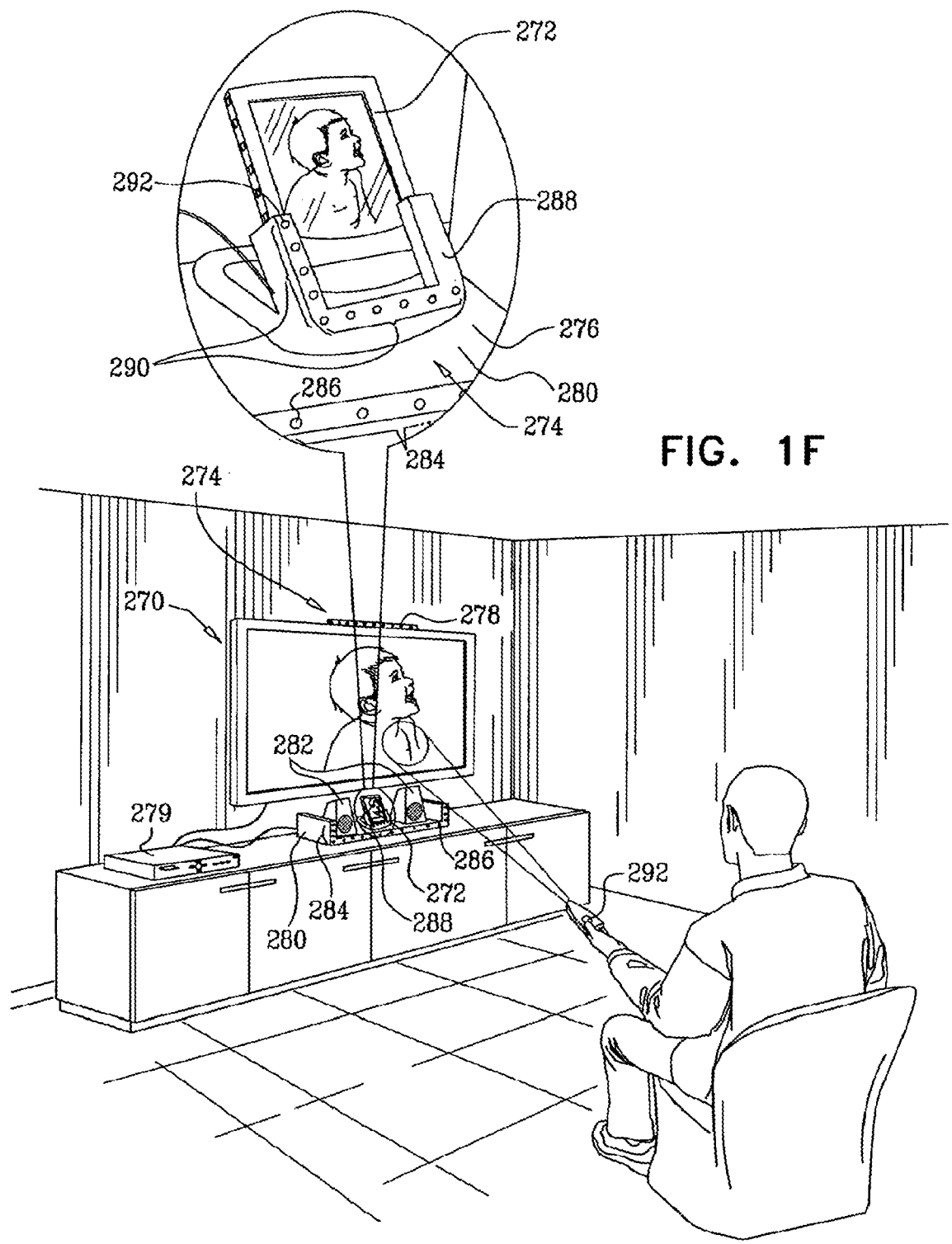

FIG. 1F illustrates an interactive assembly including a large screen display 270 having interactive functionality, such as a television display of the type shown in FIG. 1B and described hereinabove, a mobile device 272, such as a mobile device of the type shown in FIG. 1A and described hereinabove, and an interactive interface assembly 274, which may include one or more of an interactive docking station assembly 276 for the mobile device 272 and an auxiliary sensor array 278 which may be retrofittably mounted onto or adjacent to large screen display 270. Interactive, interlinked and intercommunicating circuitry 279 is preferably provided and may be embodied in a conventional set top box, or in any one or more of large screen display 270, mobile device 272 and interactive interface assembly 274 for providing interactive interlinking and intercommunication between the various elements of the interactive assembly. Alternatively, circuitry 279 may be embodied in one or more remote facilities and may communicate with the remainder of the assembly of FIG. 1F via the Internet, telephone, IPTV functionality, a cable communication link, satellite or any other suitable communications functionality. Connections between the various elements may include wired connections as shown as well as or alternatively wireless connections using suitable wireless technologies, such as BLUETOOTH® and WIFI.

The interactive docking station assembly 276 may include a support assembly 280 on which speakers 282 may be located, for example, and which may include one or more generally forward looking linear arrays 284 of sensors 286 distributed along one or more edges of the support assembly 280. Preferably supported on support assembly 280 is a docking cradle 288 which is arranged to interactively engage and support the mobile device 272. One or more generally forward looking linear arrays 290 of sensors 292 may be distributed along one or more edges of the docking cradle 288.

It is appreciated that in various embodiments one or more of linear arrays 278, 284 and 290 may be obviated.

It is appreciated that an interactive surface element may form an integral part of a display module, such as an LCD display module, may form an integral part of a housing for such a display module, may be overlaid thereupon, may be affixed thereto and may be separate therefrom.

The interactive assembly of FIG. 1F may be operated in various modes of operation. A user, holding a light beam emitting remote control device 292, may interact with one or more of the large screen display 270, mobile device 272, interactive interface assembly 274 and the docking cradle 288 by directing a beam of light in a direction which causes impingement of a spot of light on any one or more of large screen display 270, mobile device 272 and linear arrays 278, 284 and 290 of interactive interface assembly 274. It is appreciated that preferably, at least one, some or all of large screen display 270, mobile device 272, interactive interface assembly 274 and the docking cradle 288, at least a first region thereof, have first user sensible functionality and, at least a second region thereof, have second functionality, different from the first user sensible functionality. Examples of such regions appear in FIGS. 1A and 1B and are described hereinabove.

Figure 2B:
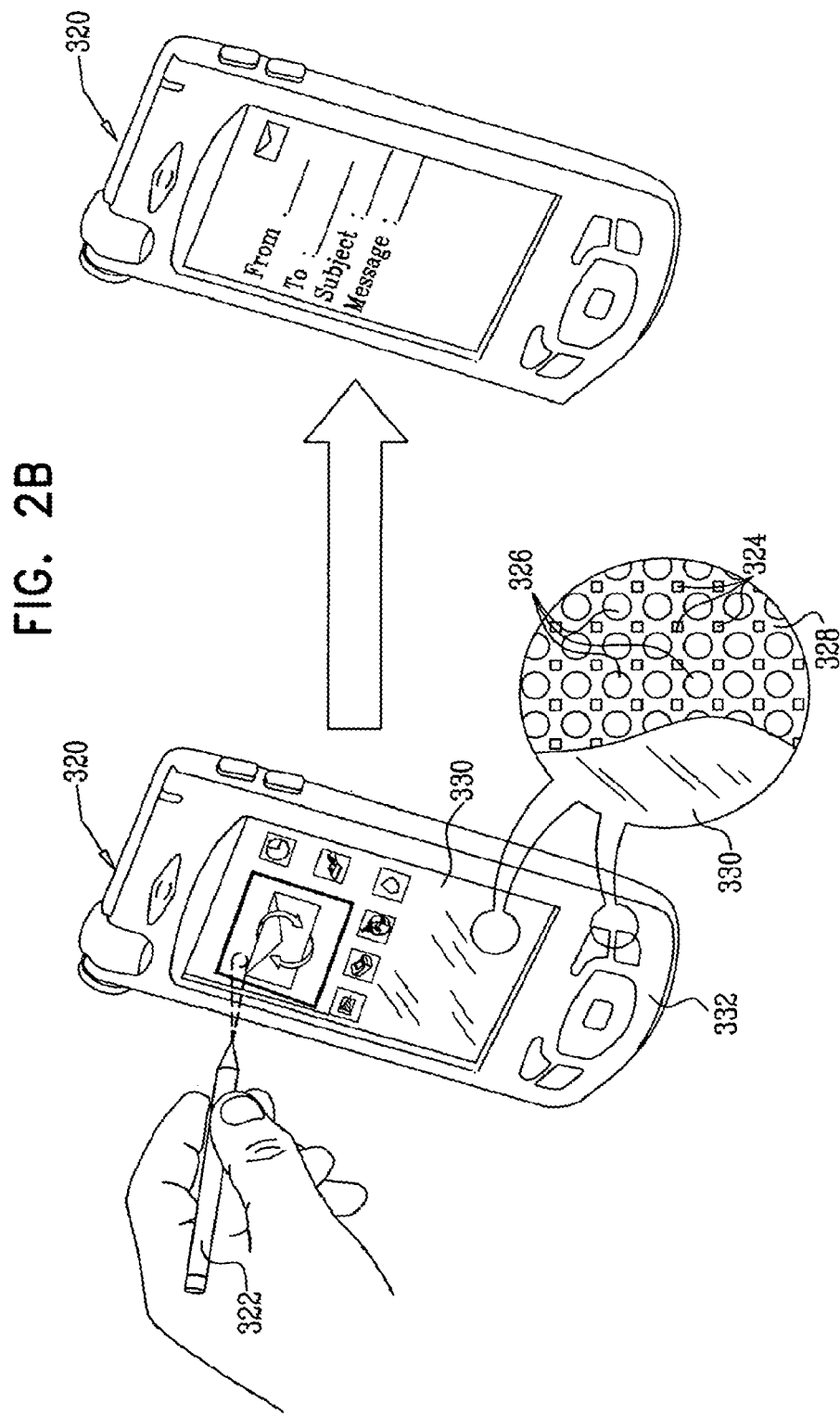

It is appreciated that an interactive surface element may form an integral part of a display module, such as an LCD display module, may form an integral part of a housing for such a display module, may be overlaid thereupon, may be affixed thereto or may be separate therefrom. Reference is now made to FIGS. 2A and 2B, which are simplified illustrations of portions of two types of interactive assemblies constructed and operative in accordance with another preferred embodiment of the present disclosure. FIG. 2A shows an interactive assembly having touch responsive input functionality and/or propinquity responsive input functionality, which is useful for application selection and operation, such as email communication and Internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

FIG. 2A illustrates launching an application, such as an e-mail application, on a mobile telephone 300, by employing object detection functionality of the type described herein below with reference to FIGS. 18A-26D. As shown, a position of a user's finger is detected by means of a touch responsive and/or propinquity responsive input functionality operative in accordance with a preferred embodiment of the present disclosure.

As seen in FIG. 2A, a multiplicity of light detector elements 302 are interspersed among light emitters 304 arranged in a plane 306. Examples of such a structure are described in U.S. Pat. No. 7,034,866 and U.S. Patent Application Publication Nos. 2006/0132463A1, 2006/0007222 A1 and 2004/00012565A1, the disclosures of which are hereby incorporated by reference. Light, preferably including light in the IR band, reflected by the user's finger, propagates through at least one cover layer 308 and is detected by one or more of detector elements 302. The outputs of detector elements 302 are processed to indicate one or more of the X, Y, or Z positions, elevation and/or angular orientation of the user's finger. This detected position is utilized, as described herein below and as taught, inter alia, in the aforesaid U.S. Provisional Patent Application No. 60/789,188, and International Application Nos. PCT/IL2007/000332 and PCT/IL2007/000433, to launch an application or control any of the other functionalities described therein.

It is appreciated that output circuitry in the interactive assembly shown in FIG. 2A may preferably utilize the calculated X, Y coordinate data to determine which region of which interactive element is being selected and thus actuate the user-desired function accordingly.

Figure 18A:
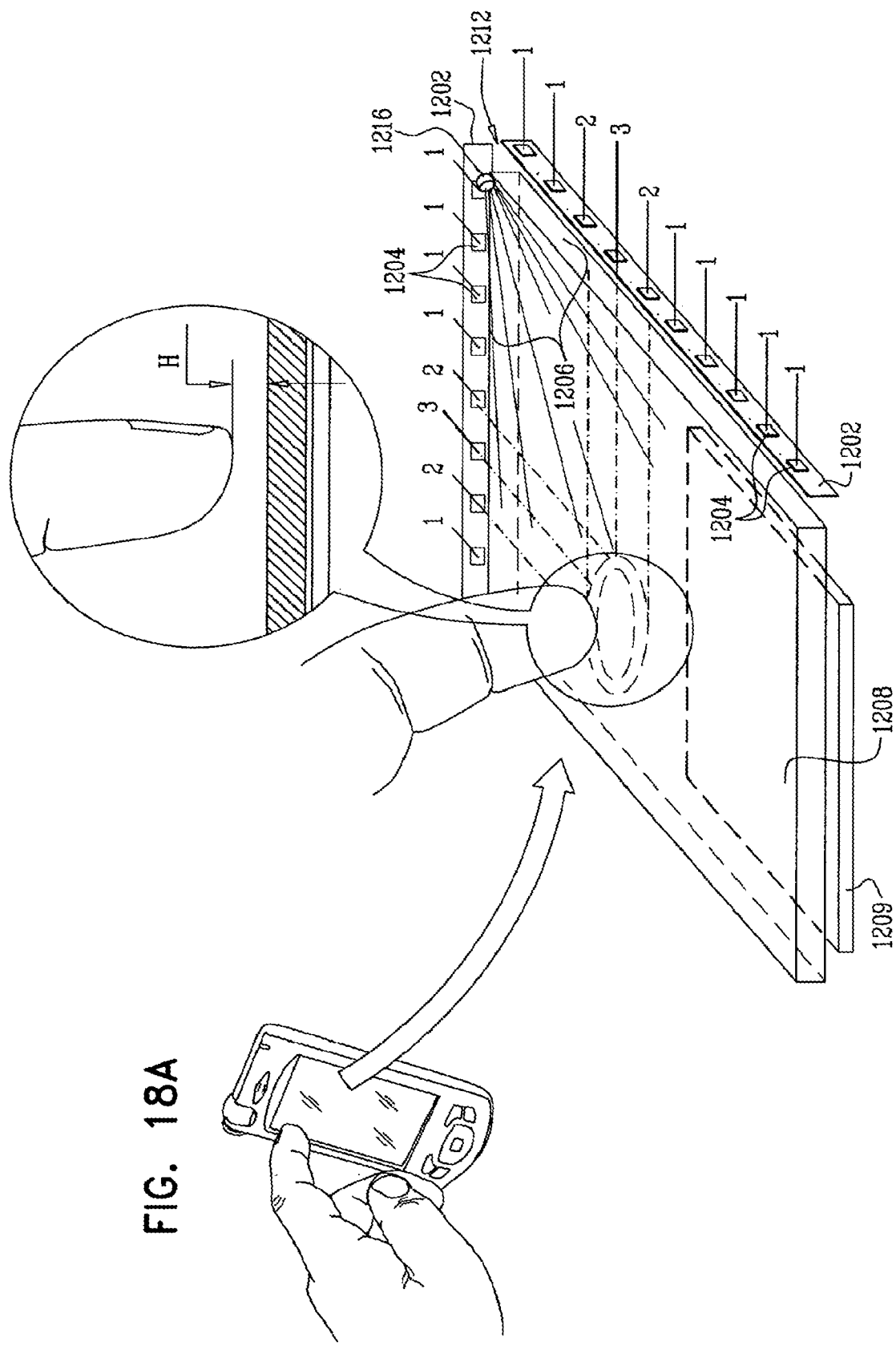
Figure 18B:
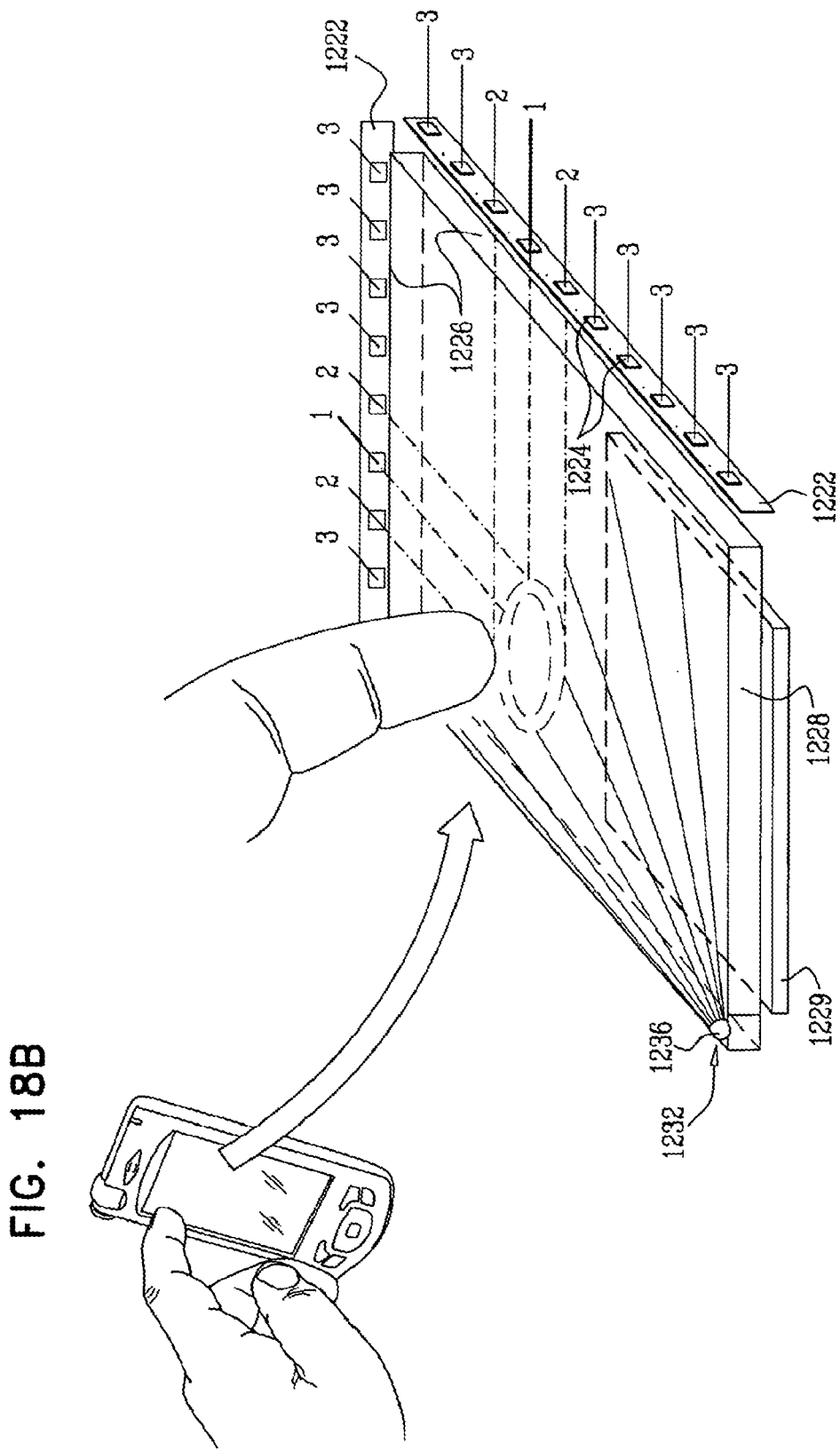
Figure 18D:
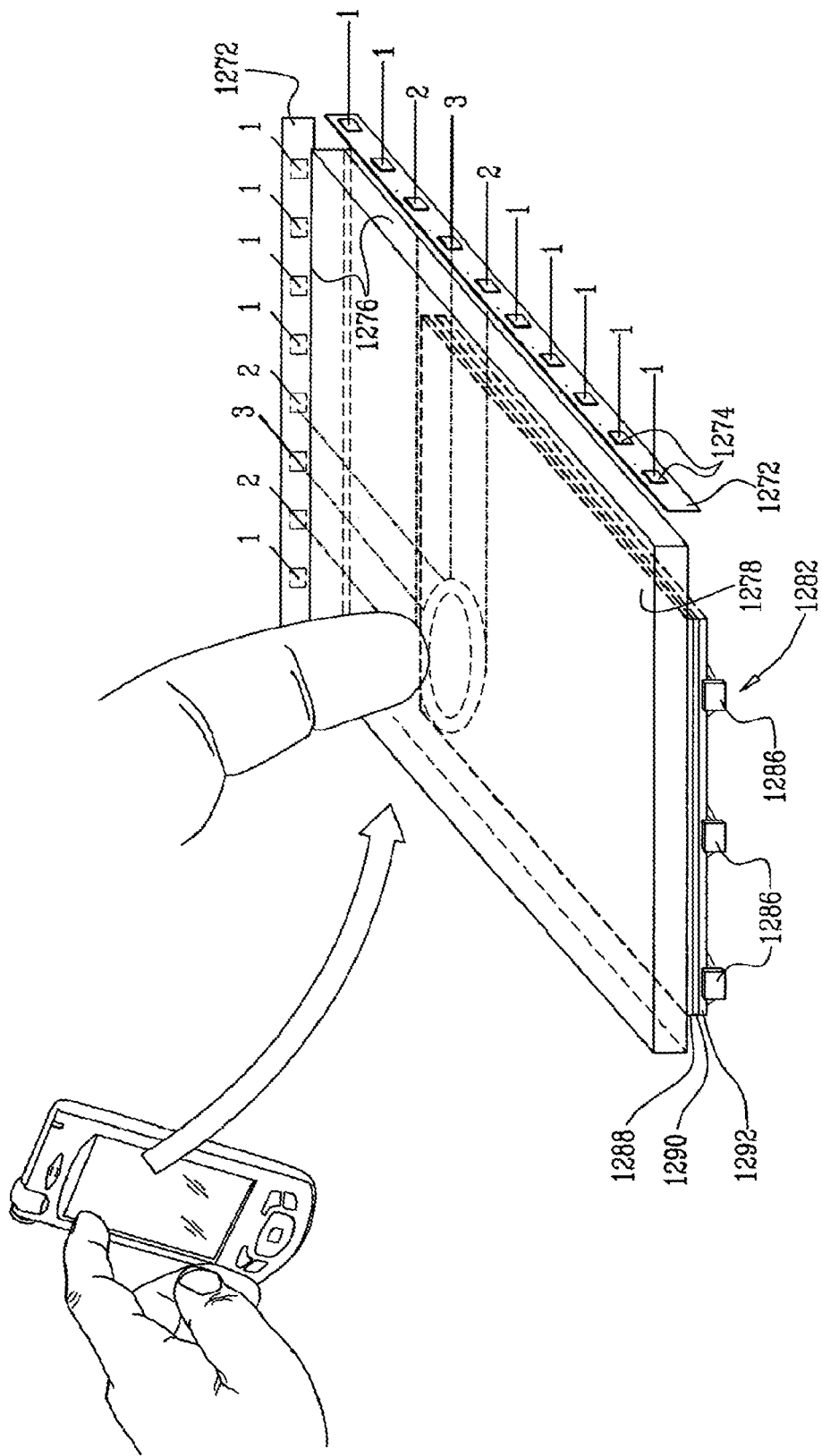
Figure 18E:
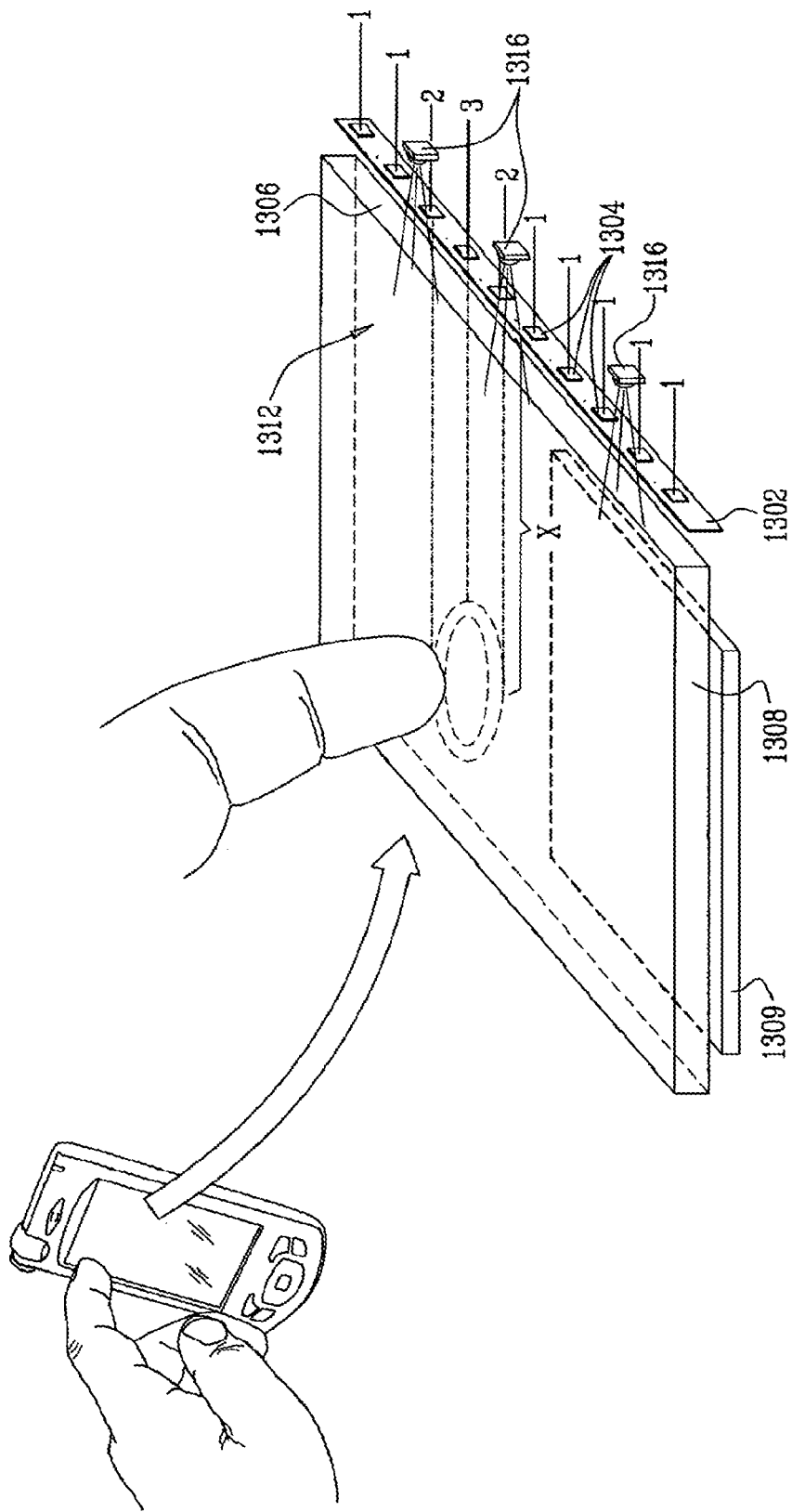
Figure 19:
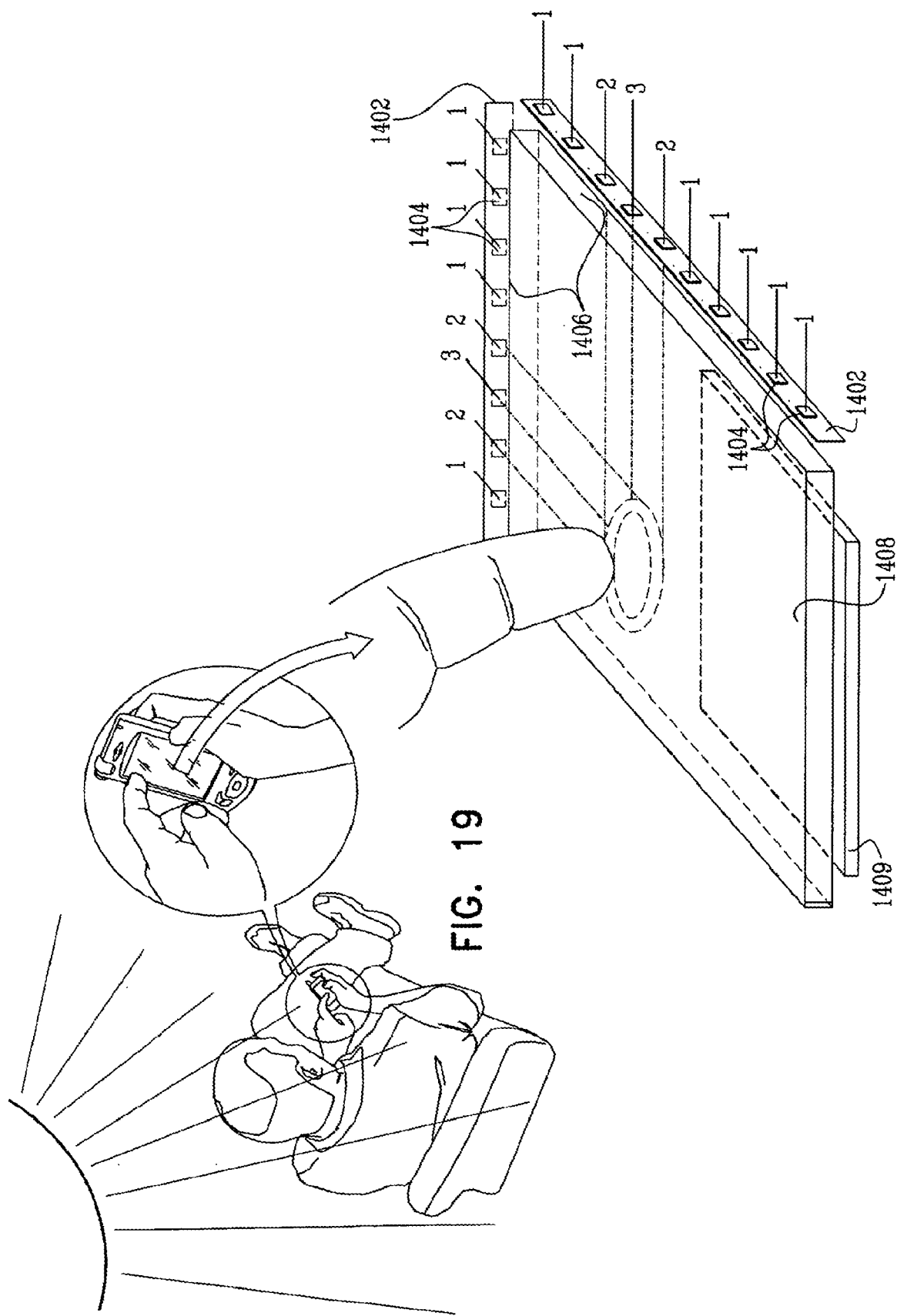
FIG. 19 is a simplified illustration of an interactive assembly constructed and operative in accordance with a preferred embodiment of the present disclosure, utilizing electromagnetic radiation from a source external to the interactive device.

The source of the reflected light may be external to the mobile telephone 300, for example, as shown in FIG. 19. Suitable external light sources include sunlight, artificial room lighting, IR radiation emitted from a human body or other heat source, or an external light source specifically implemented for the purpose of illuminating the area adjacent mobile telephone 300. In a preferred embodiment, the source of the reflected light may comprise an illumination subassembly 310 associated with mobile telephone 300, which typically includes one or more electromagnetic radiation emitting sources, here shown as multiple IR emitting LEDs 312. The illumination subassembly 310 preferably forms part of the interactive device. Examples of various suitable configurations of illumination subassembly 310 are described herein below in FIGS. 18A-18F. Optionally, the light emitted by LEDs 312 may be modulated by modulating circuitry (not shown).

It is a particular feature of the embodiment of FIG. 2A that light detector elements 302 are present on plane 306 in regions where there are no light emitters 304 or where such light emitters are covered by a housing 314, preferably generally opaque to visible light at the periphery of at least one cover layer 308. Accordingly, mobile telephone 300 has a first region, defined by cover layer 308, having first user sensible functionality and a second region, at the periphery of cover layer 308 which is covered by housing 314, having second functionality, different from the first user sensible functionality.

FIG. 2B shows an interactive assembly having light beam impingement responsive input functionality, which is useful for application selection and operation, such as email communication and Internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

FIG. 2B illustrates launching an application, such as an e-mail application, on a mobile telephone 320, by employing object detection functionality of the type described herein below with reference to 18A-26D. A position of a stylus 322 is detected by means of a light beam responsive input functionality operative in accordance with a preferred embodiment of the present disclosure. As seen in FIG. 2B, a multiplicity of light detector elements 324 are interspersed among light emitters 326 arranged in a plane 328. Examples of such a structure are described in U.S. Pat. No. 7,034,866 and U.S. Patent Application Publication Nos. 2006/0132463A1, 2006/0007222A1 and 2004/00012565 A1, the disclosures of which are hereby incorporated by reference. Light, preferably including light in the IR band, emitted by stylus 322, propagates through at least one cover layer 330 and is detected by one or more of detector elements 324. The outputs of detector elements 324 are processed to indicate one or more of the X, Y or Z positions, elevation of the stylus 322 and/or angular orientation of the stylus 322. This detected position is utilized, as taught inter alia in the aforesaid U.S. Provisional Patent Application No. 60/789,188, and International Application Nos. PCT/IL2007/000332 and PCT/IL2007/000433, to launch an application or control any of the other functionalities described in U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176.

It is appreciated that output circuitry in the interactive assembly shown in FIG. 2B may preferably utilize the calculated X, Y coordinate data to determine which region of which interactive element is being selected and thus actuate the user-desired function accordingly.

It is a particular feature of the embodiment of FIG. 2B that light detector elements 324 are present on plane 328 in regions where there are no light emitters 326 or where such light emitters are covered by a housing 332, preferably generally opaque to visible light but mostly transparent to IR light, at the periphery of at least one cover layer 330. Accordingly mobile telephone 320 has a first region, defined by cover layer 330, having first user sensible functionality and a second region, at the periphery of cover layer 330 which is covered by housing 332, having second functionality, different from the first user sensible functionality.

Reference is now made to FIGS. 3A and 3B, which are simplified illustrations of portions of two types of interactive assemblies constructed and operative in accordance with yet another preferred embodiment of the present disclosure, employing elements arranged in parallel planes, parallel to a viewing plane. FIG. 3A shows an integrated display and input system having touch responsive input functionality and/or propinquity responsive input functionality, which is useful for application selection and operation, such as email communication and Internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

The touch responsive functionality and/or propinquity responsive input functionality preferably employs an integrated display and input system including an array 340 of detector elements 342 arranged in a plane 343, parallel to a viewing plane 344. In accordance with a preferred embodiment of the present disclosure, the array 340 is formed of a plurality of discrete detector elements 342 placed on plane 343 integrally formed therewith. Alternatively, the array 340 may be formed of one or more CCD or CMOS arrays, or may be created by photolithography.

As seen in FIG. 3A, in one example of a display and input system structure, array 340 is arranged behind an IR transmissive display panel 346, such as a panel including LCD or OLED elements, underlying an interactive surface element 348 coinciding with viewing plane 344. Interactive surface element 348 may be a single or multiple layer plate and may have one or more coating layers associated therewith. In one example of an integrated display and input system employing an LCD, there are provided one or more light diffusing layers 350 overlying a reflector 352. One or more collimating layers 354 are typically interposed between reflector 352 and ER transmissive display panel 346.

FIG. 3A illustrates launching an application, such as an e-mail application, on a mobile telephone 356, by employing object detection functionality of the type described herein below with reference to FIG. 18A-26D. As shown, a position of a user's finger is detected by means of a touch responsive and/or propinquity responsive input functionality operative in accordance with a preferred embodiment of the present disclosure. Light, preferably including light in the IR band, reflected by the user's finger, propagates through plane 344 and panel 346 and is detected by detector elements 342. The outputs of detector elements 342 are processed to indicate one or more of the X, Y or Z positions and/or angular orientation of the user's finger. This detected position is utilized, as taught inter alia in the aforesaid U.S. Provisional Patent Application No. 60/789,188 and International Application Nos. PCT/IL2007/000332 and PCT/IL2007/000433, to launch an application or control any of the other functionalities described in U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176. It is appreciated that output circuitry in the interactive assembly shown in FIG. 3A may preferably utilize the calculated X, Y coordinate data to determine which region of which interactive element is being selected and thus actuate the user-desired function accordingly.

The source of the reflected light may be external to the mobile telephone 356, for example, as shown in FIG. 19. Suitable external light sources include sunlight, artificial room lighting and IR radiation emitted from a human body or other heat source. In a preferred embodiment, the source of the reflected light may comprise an illumination subassembly 362 which typically includes one or more electromagnetic radiation emitting sources, here shown as multiple IR emitting LEDs 364. The illumination subassembly 362 preferably forms part of the interactive device. Examples of various suitable configurations of illumination subassembly 362 are described herein below in FIGS. 18A-18F. Optionally, the light emitted by LEDs 364 may be modulated by modulating circuitry (not shown).

It is a particular feature of the embodiment of FIG. 3A that light detector elements 342 are present on plane 343 in regions where there are no light emitters 364 or where such light emitters are covered by a housing 366, preferably opaque to visible light, at the periphery of interactive surface element 348. Accordingly, mobile telephone 356 has a first region, defined by interactive surface element 348, having first user sensible functionality and a second region, overlying a circumferential margin and/or button zone at the periphery of interactive surface element 348, which is covered by housing 366, having second functionality, different from the first user sensible functionality.

FIG. 3B shows an interactive assembly having light beam impingement responsive input functionality, which is useful for application selection and operation, such as email communication and Internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

The light beam impingement responsive functionality preferably employs an integrated display and input system including an array 370 of detector elements 372 arranged in a plane 373, parallel to a viewing plane 374. In accordance with a preferred embodiment of the present disclosure the array 370 is formed of a plurality of discrete detector elements 372 placed on plane 373 integrally formed therewith. Alternatively, the array 370 may be formed of one or more CCD or CMOS arrays, or may be created by photolithography. As seen in FIG. 3B, array 370 is arranged behind an IR transmissive display panel 376, such as a panel including LCD or OLED elements, underlying an interactive surface element 378 coinciding with viewing plane 374. Interactive surface element 378 may be a single or multiple layer plate and may have one or more coating layers associated therewith. In another example of an integrated display and input device employing an LCD, interposed between array 370 and IR transmissive display panel 376, there are provided one or more light diffusing layers 380 overlying an IR transmissive reflector 382. One or more collimating layers 384 are typically interposed between IR transmissive reflector 382 and IR transmissive display panel 376.

FIG. 3B illustrates launching an application, such as an e-mail application, on a mobile telephone 386, by employing object detection functionality of the type described hereinabove with reference to FIG. 1D. A position of a stylus 388 is detected by means of a light beam responsive input functionality operative in accordance with a preferred embodiment of the present disclosure. Light, preferably including light in the IR band, emitted by stylus 388, propagates through plane 374, panel 376, one or more of layers 384 and layers 380 and through IR transmissive reflector 382, and is detected by one or more of detector elements 372. The outputs of detector elements 372 are processed to indicate one or more of the X, Y or Z positions, angle of elevation and/or angular orientation of the stylus 388. This detected position is utilized, as taught inter alia in the aforesaid U.S. Provisional Patent Application No. 60/789,188, and International Application Nos. PCT/IL2007/000332 and PCT/IL2007/000433, to launch an application or control any of the other functionalities described in U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176.

It is appreciated that output circuitry in the interactive assembly shown in FIG. 3B may preferably utilize the calculated X, Y coordinate data to determine which region of which interactive element is being selected and thus actuate the user-desired function accordingly.

It is a particular feature of the embodiment of FIG. 3B that mobile telephone 386 has a first region, defined by interactive surface element 378 coinciding with IR transmissive display panel 376, having first user sensible functionality and a second region, at the periphery of interactive surface element 378 coinciding with a plane of a button actuation zone, which is covered by housing 390, preferably opaque to visible light, having second functionality, different from the first user sensible functionality.

Figure 4:
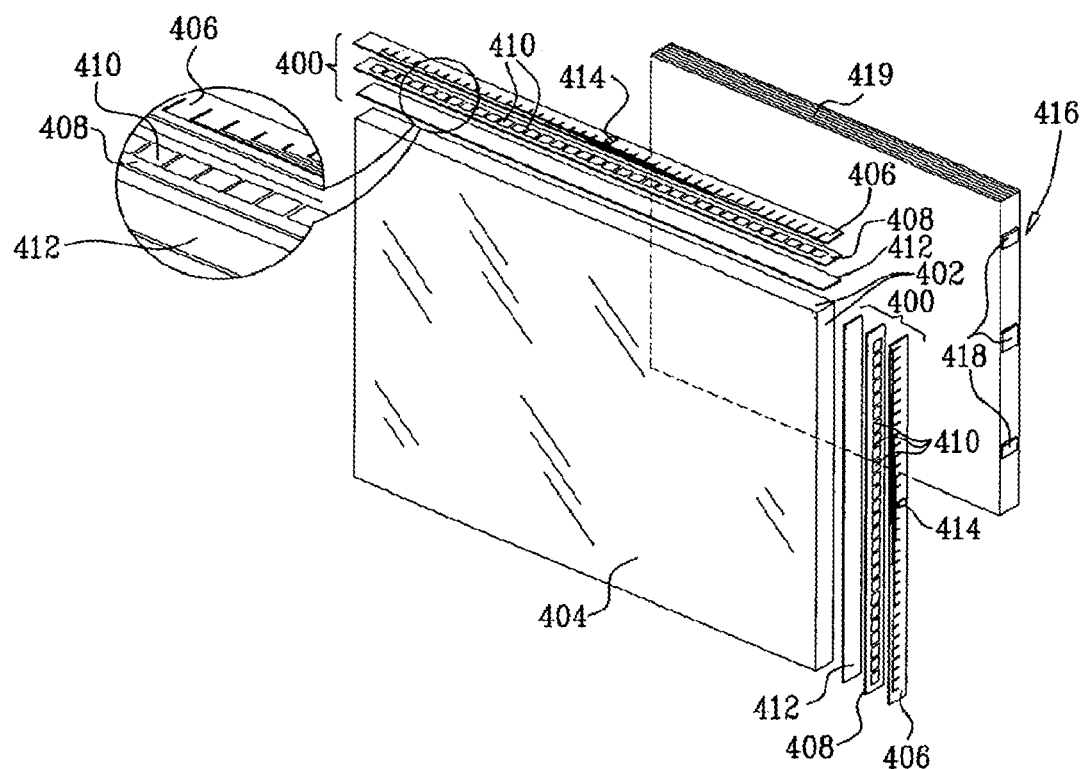
FIG. 4 is a simplified illustration of a portion of an input device constructed and operative in accordance with still another preferred embodiment of the present disclosure, employing detectors arranged along edges of a display element.

Reference is now made to FIG. 4, which is a simplified illustration of a portion of an input device constructed and operative in accordance with still another preferred embodiment of the present disclosure, employing detector elements arranged along edges of an interactive surface element. In the structure of FIG. 4, at least one detector assembly 400 is arranged along at least one edge 402 of an interactive surface element 404, to sense light impinging thereon and propagating therein to the edges 402 thereof. Interactive surface element 404 may be a single or multiple layer plate and may have one or more coating layers associated therewith. Interactive surface element 404 may be associated with a display panel, such as an LCD, whose viewing plane may optionally coincide with a portion of the interactive surface element 404. Preferably, detector assemblies 400 are provided along at least two mutually perpendicular edges 402, as shown, though detector assemblies 400 may be provided along all or most of edges 402. Alternatively, a single detector assembly 400 may be provided along only one edge 402 of interactive surface element 404.

In accordance with a preferred embodiment of the present disclosure, the detector assembly 400 comprises a support substrate 406 onto which is mounted a linear arrangement 408 of detector elements 410. Interposed between linear arrangement 408 and edge 402 is a cover layer 412. Cover layer 412 may have multiple functions including physical protection, light intensity limitation, and field-of-view limitation and may have optical power. Cover layer 412 may be formed of glass or any other suitable light transparent material, or of a suitably apertured opaque material, such as metal. Alternatively, cover layer 412 may be obviated.

The support substrate 406 may be mounted onto a display housing (not shown) or may be integrally formed therewith. The support substrate 406 may alternatively be mounted onto an edge 402 of interactive surface element 404. The support substrate 406 may be formed of a ceramic material, a material such as FR-4 which is commonly used for PCBs, glass, plastic or a metal such as aluminum. The support substrate 406 may also provide mounting for and electrical connections to the detector elements 410. A processor 414 for processing the outputs of the detector elements 410 may also be mounted on the support substrate 406.

It is a particular feature of this embodiment of the present disclosure that the detector assembly 400 is extremely thin, preferably under 1 mm overall. Accordingly, the support substrate 406 is preferably 50-200 microns in thickness, the linear arrangement 408 of detector elements 410 is preferably 100-400 microns in thickness and the cover layer 412 is preferably 100-500 microns in thickness.

The input device, of which a portion is shown in FIG. 4, may also include a source of light which is external to the input device, for example, as shown in FIG. 19. Suitable external light sources include sunlight, artificial room lighting and IR radiation emitted from a human body or other heat source. In a preferred embodiment of the present disclosure, the external light source is an external IR light emitting stylus, such as stylus 322 of FIG. 2B. In another preferred embodiment, the source of light may comprise an illumination subassembly 416 which typically includes one or more electromagnetic radiation emitting sources, here shown as multiple IR emitting LEDs 418 mounted about a display element 419, such as an LCD display. Display element 419 is preferably smaller in area than the interactive surface element 404.

The illumination subassembly 416 may be associated with the display element 419, as described above, or may be associated with another part of the interactive device. Examples of various suitable configurations of illumination subassembly 416 associated with an interactive surface are described herein below in FIGS. 18A-18F, it being appreciated that such configurations may alternatively or additionally be associated with a display surface or any other suitable part of the device.

Optionally, the light emitted by LEDs 418 may be modulated by modulating circuitry (not shown).

It is a particular feature of the embodiment of FIG. 4 that interactive surface element 404 has a first region, overlying display element 419 and having first user sensible functionality and a second region, extending beyond display element 419, having second functionality, different from the first user sensible functionality.

It is a further particular feature of the embodiment of FIG. 4 that both the first and second functionalities employ a common detector assembly, such as detector assembly 400, and may employ a common source of light, such as illumination subassembly 416.

It is appreciated that an interactive device, such as the devices described hereinabove with reference to FIGS. 1A-3B, may include one or more multi-region interactive surface elements, one example of which is illustrated in FIG. 4, and other examples of which are described herein below with reference to any one or more of FIGS. 5-17C.

Figure 5:
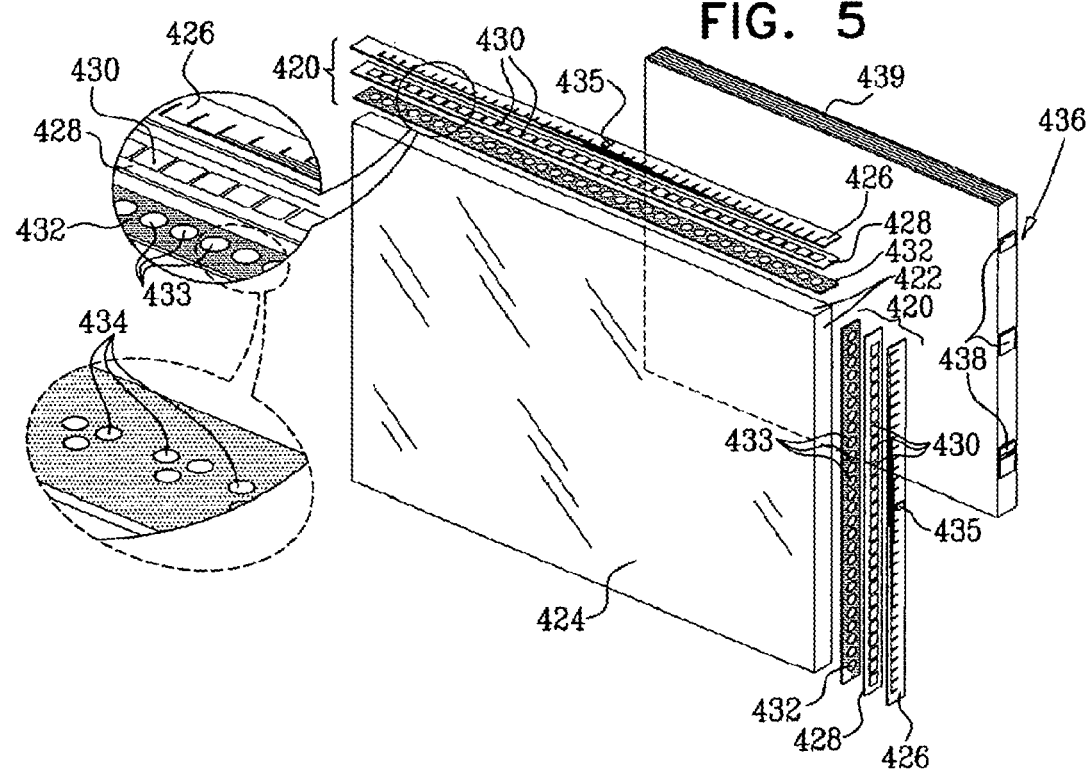
FIG. 5 is a simplified illustration of a portion of an input device constructed and operative in accordance with a further preferred embodiment of the present disclosure, employing detectors arranged along edges of a display element.

It is appreciated that output circuitry in the input device shown in FIG. 4 may preferably utilize the calculated X, Y coordinate data to determine which region of which interactive element is being selected and thus actuate the user-desired function accordingly. Reference is now made to FIG. 5, which is a simplified illustration of a portion of an input device constructed and operative in accordance with a further preferred embodiment of the present disclosure, employing detector elements arranged along edges of a display element. In the structure of FIG. 5, at least one detector assembly 420 is arranged along at least one edge 422 of an interactive surface element 424, coinciding with a viewing plane, to sense light impinging on interactive surface element 424 and propagating within the interactive surface element 424 to the edges 422 thereof. Interactive surface element 424 may be a single or multiple layer plate and may have one or more coating layers associated therewith. Preferably, detector assemblies 420 are provided along at least two mutually perpendicular edges 422, as shown, though detector assemblies 420 may be provided along all or most of edges 422. Alternatively, a single detector assembly 420 may be provided along only one edge 422 of interactive surface element 424.

In accordance with a preferred embodiment of the present disclosure, the detector assembly 420 comprises a support substrate 426 onto which is mounted a linear arrangement 428 of detector elements 430. Interposed between linear arrangement 428 and edge 422 is a cover layer 432. Li the illustrated embodiment, cover layer 432 is a field-of-view defining mask having apertures 433 formed therein, in sizes and arrangements which provide desired fields-of-view for the various corresponding detector elements 430. Depending on the thickness of layer 432, each detector element 430 may have associated therewith a single aperture 433 or a plurality of smaller apertures, here designated by reference numeral 434. The selection of aperture size and distribution is determined in part by the mechanical strength of layer 432. Layer 432 may have multiple functions including physical protection, field-of-view limitation and light intensity limitation, and may have optical power.

Field-of-view limiting functionality may be desirable in this context because it enhances position discrimination by limiting overlap between the fields-of-view of adjacent detector elements 430. Extent of field-of-view limiting may be controlled by the size, pitch and arrangement of apertures 433 and their locations with respect to and distances from detector elements 430. In accordance with a preferred embodiment, the field-of-view limiting functionality limits the field-of-view of at least one of detector elements 430 to a solid angle of less than or equal to 15 degrees. In accordance with another preferred embodiment, the field-of-view limiting functionality limits the field-of-view of at least one of detector elements 430 to a solid angle of less than or equal to 7 degrees.

The support substrate 426 may be mounted onto a display housing (not shown) or may be integrally formed therewith. The support substrate 426 may alternatively be mounted onto an edge 422 of interactive surface element 424. The support substrate 426 may be formed of a ceramic material, a material such as FR-4 which is commonly used for PCBs, glass, plastic or a metal such as aluminum. The support substrate 426 may also provide mounting for and electrical connections to the detector elements 430. A processor 435 for processing the outputs of the detector elements 430 may also be mounted on the support substrate 426.

The input device shown in FIG. 5 may also include a source of light which is preferably external to the input device, for example, as shown in FIG. 19.

Suitable external light sources include sunlight, artificial room lighting and IR radiation emitted from a human body or other heat source. In a preferred embodiment of the present disclosure, the external light source is an external IR light emitting stylus, such as stylus 322 of FIG. 2B. In an alternate preferred embodiment, the source of light may comprise an illumination subassembly 436 which typically includes one or more electromagnetic radiation emitting sources, here shown as multiple IR emitting LEDs 438 mounted about a display element 439, such as an LCD display. Display element 439 is preferably smaller in area than the interactive surface element 424.

The illumination subassembly 436 may be associated with the display element 439, as described above, or may be associated with another part of the interactive device. Examples of various suitable configurations of illumination subassembly 436 associated with an interactive surface are described herein below in FIGS. 18A-18F, it being appreciated that such configurations may alternatively or additionally be associated with a display surface or any other suitable part of the device. Optionally, the light emitted by LEDs 438 may be modulated by modulating circuitry (not shown).

It is a particular feature of the embodiment of FIG. 5 that interactive surface element 424 has a first region, overlying display element 439, having first user sensible functionality and a second region, extending beyond display element 439, having second functionality, different from the first user sensible functionality.

It is a further particular feature of the embodiment of FIG. 5 that both the first and second functionalities employ a common detector assembly, such as detector assembly 420 and may employ a common source of light, such as illumination subassembly 436. It is appreciated that an interactive device, such as the devices described hereinabove with reference to FIGS. 1A-3B, may include one or more multi-region interactive surface elements, one example of which is illustrated in FIG. 5, and other examples of which are described hereinabove and herein below with reference to any one or more of FIGS. 4 and 6-17C. It is appreciated that output circuitry in the input device shown in FIG. 5 may preferably utilize the calculated X, Y coordinate data to determine which region of which interactive element is being selected and thus actuate the user-desired function accordingly.

Figure 6:
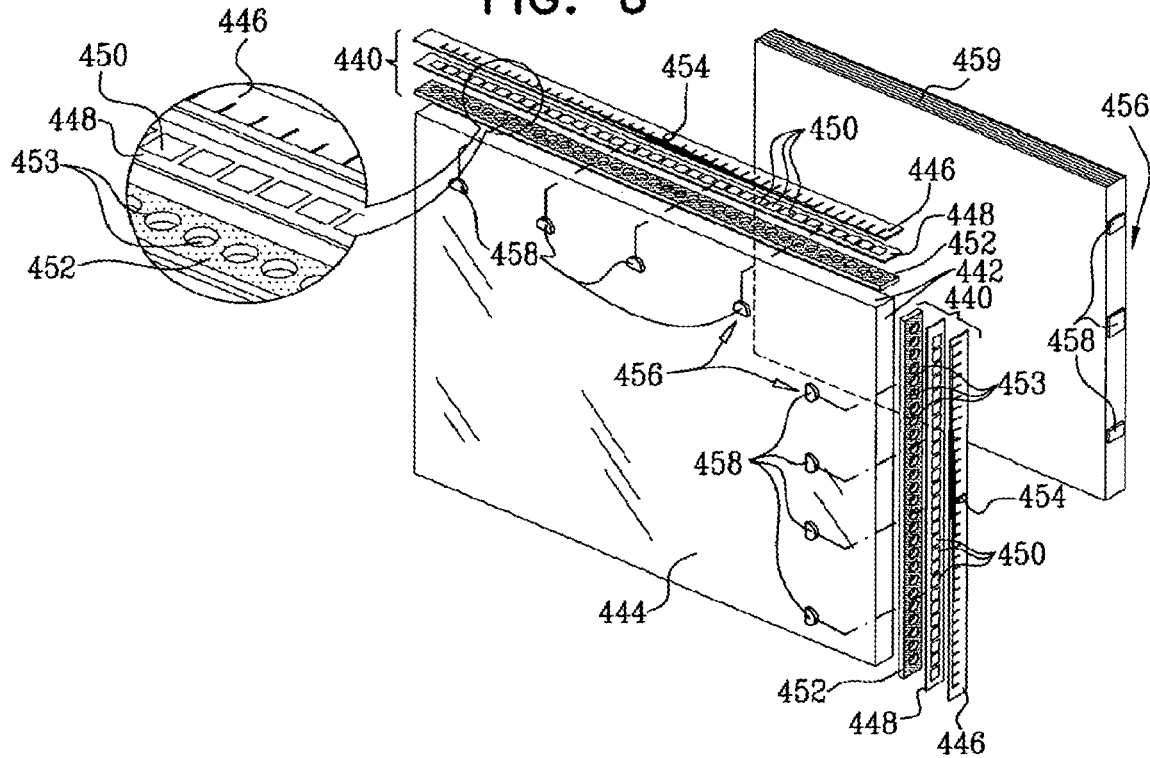
FIG. 6 is a simplified illustration of a portion of an input device constructed and operative in accordance with a yet further preferred embodiment of the present disclosure, employing detectors arranged along edges of a display element.

Reference is now made to FIG. 6, which is a simplified illustration of a portion of an input device constructed and operative in accordance with a yet further preferred embodiment of the present disclosure, employing detector elements arranged along edges of a display element. In the structure of FIG. 6, at least one detector assembly 440 is arranged along at least one edge 442 of an interactive surface element 444, coinciding with a viewing plane, to sense light impinging on interactive surface element 444 and propagating within the interactive surface element 444 to the edges 442 thereof. Interactive surface element 444 may be a single or multiple layer plate and may have one or more coating layers associated therewith. Preferably, detector assemblies 440 are provided along at least two mutually perpendicular edges 442, as shown, though detector assemblies 440 may be provided along all or most of edges 442. Alternatively, a single detector assembly 440 may be provided along only one edge 442 of interactive surface element 444.

In accordance with a preferred embodiment of the present disclosure, the detector assembly 440 comprises a support substrate 446 onto which is mounted a linear arrangement 448 of detector elements 450. Interposed between linear arrangement 448 and edge 442 is a cover layer 452. The embodiment of FIG. 6 differs from that of FIG. 5 in that the cover layer 452 is substantially thicker than cover layer 432 and is preferably at least 200 microns in thickness. Layer 452 has apertures 453 formed therein, which apertures 453 define light collimating tunnels. Apertures 453 are formed in layer 452, in sizes and arrangements which provide desired fields-of-view for the various corresponding detector elements 450. Depending on the thickness of layer 452, each detector element 450 may have associated therewith a single tunnel-defining aperture 453, as shown, or a plurality of smaller tunnel-defining apertures. The selection of aperture size and distribution is determined in part by the mechanical strength of layer 452. Layer 452 may have multiple functions including physical protection, field-of-view limitation and light intensity limitation, and may have optical power.

Field-of-view limiting functionality may be desirable in this context because it enhances position discrimination by limiting overlap between the fields-of-view of adjacent detector elements 450. Extent of field-of-view limiting may be controlled by the size, pitch and arrangement of apertures 453 and their locations with respect to and distances from detector elements 450. In accordance with a preferred embodiment, the field-of-view limiting functionality limits the field-of-view of at least one of detector elements 450 to a solid angle of less than or equal to 15 degrees. In accordance with another preferred embodiment, the field-of-view limiting functionality limits the field-of-view of at least one of detector elements 450 to a solid angle of less than or equal to 7 degrees.

The support substrate 446 may be mounted onto a display housing (not shown) or may be integrally formed therewith. The support substrate 446 may alternatively be mounted onto an edge 442 of interactive surface element 444. The support substrate 446 may be formed of a ceramic material, a material such as FR-4 which is commonly used for PCBs, glass, plastic or a metal such as aluminum. The support substrate 446 may also provide mounting for and electrical connections to the detector elements 450. A processor 454 for processing the outputs of the detector elements 450 may also be mounted on the support substrate 446.

The input device shown in FIG. 6 may also include a source of light which is preferably external to the input device, for example, as shown in FIG. 19 in a preferred embodiment of the present disclosure, the external light source is an external IR light emitting stylus, such as stylus 322 of FIG. 2B. Suitable external light sources include sunlight, artificial room lighting and IR radiation emitted from a human body or other heat source.

In an alternate preferred embodiment, the source of light may comprise one or more illumination subassemblies 456 which typically include one or more electromagnetic radiation emitting sources, here shown as multiple IR emitting LEDs 458, mounted on interactive surface element 444 and/or about a display element 459, such as an LCD display. Display element 459 is preferably smaller in area than the interactive surface element 444.

It is appreciated that different illumination subassemblies 456 may emit radiation in the same wavelength or in different wavelengths.

The illumination subassemblies 456 may be associated with the display element 459, as described above, or may be associated with another part of the interactive device. Examples of various suitable configurations of illumination subassemblies 456 associated with an interactive surface are described herein below in FIGS. 18A-18F, it being appreciated that such configurations may alternatively or additionally be associated with a display surface or any other suitable part of the device. Optionally, the light emitted by LEDs 458 may be modulated by modulating circuitry (not shown).

It is a particular feature of the embodiment of FIG. 6 that interactive surface element 444 has a first region, overlying display element 459, having first user sensible functionality and a second region, extending beyond display element 459, having second functionality, different from the first user sensible functionality.

It is a further particular feature of the embodiment of FIG. 6 that both the first and second functionalities employ a common detector assembly, such as detector assembly 440 and may employ a common source of light, such as illumination subassemblies 456. It is appreciated that output circuitry in the input device shown in FIG. 6 may preferably utilize the calculated X, Y coordinate data to determine which region of which interactive element is being selected and thus actuate the user-desired function accordingly.

It is appreciated that an interactive device, such as the devices described hereinabove with reference to FIGS. 1A-3B, may include one or more multi-region interactive surface elements, one example of which is illustrated in FIG. 6, and other examples of which are described hereinabove and herein below with reference to any one or more of FIGS. 4-5 and 7-17C.

Figure 7:
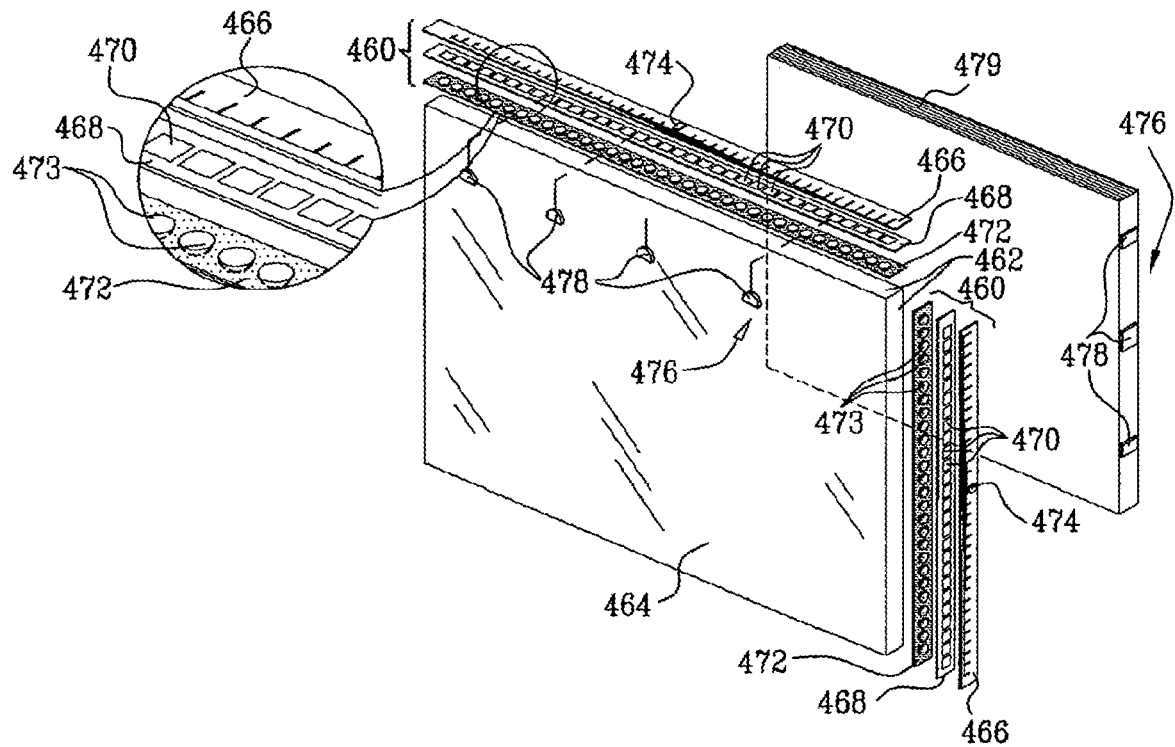
FIG. 7 is a simplified illustration of a portion of an input device constructed and operative in accordance with an additional preferred embodiment of the present disclosure, employing detectors arranged along edges of a display element.

Reference is now made to FIG. 7, which is a simplified illustration of a portion of an input device constructed and operative in accordance with an additional preferred embodiment of the present disclosure, employing detector elements arranged along edges of a display element. In the structure of FIG. 7, at least one detector assembly 460 is arranged along at least one edge 462 of an interactive surface element 464, coinciding with a viewing plane, to sense light impinging on interactive surface element 464 and propagating within the interactive surface element 464 to the edges 462 thereof. Interactive surface element 464 may be a single or multiple layer plate and may have one or more coating layers associated therewith. Preferably, detector assemblies 460 are provided along at least two mutually perpendicular edges 462, as shown, though detector assemblies 460 may be provided along all or most of edges 462. Alternatively, a single detector assembly 460 may be provided along only one edge 462 of interactive surface element 464. In accordance with a preferred embodiment of the present disclosure, the detector assembly 460 comprises a support substrate 466 onto which is mounted a linear arrangement 468 of detector elements 470. Interposed between linear arrangement 468 and edge 462 is a cover layer 472.

The embodiment of FIG. 7 differs from that of FIGS. 5 and 6 in that apertures in the cover layer in FIGS. 5 and 6 are replaced by lenses 473 formed in cover layer 472. Lenses 473 may be integrally formed with layer 472 or may be discrete elements fitted within suitably sized and positioned apertures in an opaque substrate. Lenses 473 may be associated with tunnel-defining apertures or may comprise an array of microlenses aligned with one or more of detector elements 470. Layer 472 may have multiple functions including physical protection, field-of-view limitation and light intensity limitation, and may have optical power. Field-of-view limiting functionality may be desirable in this context because it enhances position discrimination by limiting overlap between the fields-of-view of adjacent detector elements 470. The support substrate 466 may be mounted onto a display housing (not shown) or may be integrally formed therewith. The support substrate 466 may alternatively be mounted onto an edge 462 of interactive surface element 464. The support substrate 466 may be formed of a ceramic material, a material such as FR-4 which is commonly used for PCBs, glass, plastic or a metal such as aluminum. The support substrate may also provide mounting for and electrical connections to the detector elements 470. A processor 474 for processing the outputs of the detector elements 470 may also be mounted on the support substrate 466.

The input device shown in FIG. 7 may also include a source of light which is preferably external to the input device, for example, as shown in FIG. 19. In a preferred embodiment of the present disclosure, the external light source is an external IR light emitting stylus, such as stylus 322 of FIG. 2B. Suitable external light sources include sunlight, artificial room lighting and ER radiation emitted from a human body or other heat source. In an alternate preferred embodiment, the source of light may comprise one or more illumination subassemblies 476 which typically include one or more electromagnetic radiation emitting sources, here shown as multiple IR emitting LEDs 478 mounted on interactive surface element 464 and/or about a display element 479, such as an LCD display. Display element 479 is preferably smaller in area than the interactive surface element 464.

It is appreciated that different illumination subassemblies 476 may emit radiation in the same wavelength or in different wavelengths.

The illumination subassemblies 476 may be associated with the display element 479, as described above, or may be associated with another part of the interactive device. Examples of various suitable configurations of illumination subassemblies 476 associated with an interactive surface are described herein below in FIGS. 18A-18F, it being appreciated that such configurations may alternatively or additionally be associated with a display surface or any other suitable part of the device. Optionally, the light emitted by LEDs 478 may be modulated by modulating circuitry (not shown).

It is a particular feature of the embodiment of FIG. 7 that interactive surface element 464 has a first region, overlying display element 479, having first user sensible functionality and a second region, extending beyond display element 479, having second functionality, different from the first user sensible functionality.

It is a further particular feature of the embodiment of FIG. 7 that both the first and second functionalities employ a common detector assembly, such as detector assembly 460 and may employ a common source of light, such as illumination subassemblies 476. It is appreciated that output circuitry in the input device shown in FIG. 7 may preferably utilize the calculated X, Y coordinate data to determine which region of which interactive element is being selected and thus actuate the user-desired function accordingly.

It is appreciated that an interactive device, such as the devices described hereinabove with reference to FIGS. 1A-3B, may include one or more multi-region interactive surface elements, one example of which is illustrated in FIG. 7, and other examples of which are described herein below with reference to any one or more of FIGS. 4-6 and 8A-17C.

Reference is now made to FIGS. 8A-8D, which are simplified illustrations of four alternative embodiments of a portion of an input device constructed and operative in accordance with another preferred embodiment of the present disclosure, employing detector elements arranged along edges of a display element in the structure of FIGS. 8A-8D, at least one detector assembly 500 is arranged along at least one edge 502 of an interactive surface element 504, coinciding with a viewing plane, to sense light impinging on interactive surface element 504 and propagating within interactive surface element 504 to the edges 502 thereof. Interactive surface element 504 may be a single or multiple layer interactive surface element and may have one or more coating layers associated therewith. Preferably, detector assemblies 500 are provided along at least two mutually perpendicular edges 502, though detector assemblies 500 may be provided along all or most of edges 502. Alternatively, a single detector assembly 500 may be provided along only one edge 502 of interactive surface element 504 in accordance with a preferred embodiment of the present disclosure, the detector assembly 500 comprises a support substrate 506 onto which is mounted a linear arrangement 508 of detector elements 510. As distinct from the embodiments of FIGS. 4-7, in the embodiments of FIGS. 8A-8D, the cover layer is obviated and its functionality is provided by suitable conditioning of edge 502 of interactive surface element 504. This functionality may provide some, all or none of the following multiple functions: physical protection, light intensity limitation, field-of-view limitation, and optical power. The support substrate 506 may be mounted onto a display housing (not shown) or may be integrally formed therewith. The support substrate 506 may alternatively be mounted onto an edge 502 of interactive surface element 504. The support substrate 506 may be formed of a ceramic material, a material such as FR-4 which is commonly used for PCBs, glass, plastic or a metal such as aluminum. The support substrate may also provide mounting for and electrical connections to the detector elements 510. A processor 514 for processing the outputs of the detector elements 510 may also be mounted on the support substrate 506.

It is a particular feature of the embodiments of FIGS. 8A-8D of the present disclosure that the detector assembly 500 is extremely thin, preferably under 1 mm overall. Accordingly, the support substrate 506 is preferably 50-200 microns in thickness and the linear arrangement 508 of detector elements 510 is preferably 100-400 microns in thickness.

The input devices shown in FIG. 8A-8D may also include a source of light which is preferably external to the input device, for example, as shown in FIG. 19. In a preferred embodiment of the present disclosure, the external light source is an external IR light emitting stylus, such as stylus 322 of FIG. 2B. Suitable external light sources include sunlight, artificial room lighting and IR radiation emitted from a human body or other heat source.

In alternative preferred embodiments, the source of light may comprise an illumination subassembly 516 which typically includes one or more electromagnetic radiation emitting sources, here shown as multiple IR emitting LEDs 518 mounted about interactive surface element 504. As shown in FIGS. 8A-8D, interactive surface element 504 is preferably associated with a display element 519, such as an LCD display. Display element 519 is preferably smaller in area than the interactive surface element 504.

The illumination subassembly 516 may be associated with interactive surface element 504, as described above, or may be associated with another part of the interactive device, such as display element 519. Examples of various suitable configurations of illumination subassembly 516 associated with an interactive surface are described herein below in FIGS. 18A-18F, it being appreciated that such configurations may alternatively or additionally be associated with a display surface or any other suitable part of the device. Optionally, the light emitted by LEDs 518 may be modulated by modulating circuitry (not shown).

It is a particular feature of the embodiments of FIGS. 8A-8D that interactive surface element 504 has a first region, overlying display element 519, having first user sensible functionality and a second region, extending beyond display element 519, having second functionality, different from the first user sensible functionality.

It is a further particular feature of the embodiments of FIGS. 8A-8D that both the first and second functionalities employ a common detector assembly, such as detector assembly 500 and may employ a common source of light, such as illumination subassembly 516.

It is appreciated that output circuitry in the input devices shown in FIGS. 8A-8D may preferably utilize the calculated X, Y coordinate data to determine which region of which interactive element is being selected and thus actuate the user-desired function accordingly.

It is appreciated that an interactive device, such as the devices described hereinabove with reference to FIGS. 1A-3B, may include one or more multi-region interactive surface elements, examples of which are illustrated in FIGS. 8A-8D, and other examples of which are described hereinabove and herein below with reference to any one or more of FIGS. 4-7 and 9A-17C.

In the embodiment of FIG. 8A, edge 502 is uniformly polished for unimpeded light transmission therethrough to linear arrangement 508 of detector elements 510. Alternatively, edge 502 may be untreated or unconditioned. Reference is now made to FIG. 8B, in which it is seen that edge 502 is conditioned to define a field-of-view defining mask 520 having apertures 533 formed therein in sizes and arrangements which provide desired fields-of-view for the various corresponding detector elements 510. Each detector element 510 may have associated therewith a single aperture 533, as shown, or a plurality of smaller apertures. Field-of-view limiting functionality may be desirable in this context because it enhances resolution by limiting overlap between the fields-of-view of adjacent detector elements 510. Extent of field-of-view limiting may be controlled by the size, pitch and arrangement of apertures 533 and their locations with respect to and distances from detector elements 510. In accordance with a preferred embodiment, the field-of-view limiting functionality limits the field-of-view of at least one of detector elements 510 to a solid angle of less than or equal to 15 degrees. In accordance with another preferred embodiment, the field-of-view limiting functionality limits the field-of-view of at least one of detector elements 510 to a solid angle of less than or equal to 7 degrees.

Reference is now made to FIG. 8C, which differs from that of FIG. 8B in that apertures 533 in mask 520 are replaced by light collimating tunnel-defining apertures 540 in a mask 542.

Each detector element 510 may have associated therewith a single tunnel-defining aperture 540, as shown, or a plurality of smaller tunnel-defining apertures.

Field-of-view limiting functionality may be desirable in this context because it enhances resolution by limiting overlap between the fields-of-view of adjacent detector elements 510. Extent of field-of-view limiting may be controlled by the size, pitch and arrangement of apertures 540 and their locations with respect to and distances from detector elements 510 in accordance with a preferred embodiment, the field-of-view limiting functionality limits the field-of-view of at least one of detector elements 510 to a solid angle of less than or equal to 15 degrees. In accordance with another preferred embodiment, the field-of-view limiting functionality limits the field-of-view of at least one of detector elements 510 to a solid angle of less than or equal to 7 degrees.

Reference is now made to FIG. 8D, which differs from that of FIGS. 8B and 8C in that the apertures in FIGS. 8B and 8C are replaced by lenses 553. Lenses 553 may be integrally formed at edges 502 or may be discrete elements fitted within suitably sized and positioned apertures in interactive surface element 504. Lenses 553 may be associated with tunnel-defining apertures or may comprise an array of microlenses aligned with one or more of detector elements 510.

Field-of-view limiting functionality may be desirable in this context because it enhances resolution by limiting overlap between the fields-of-view of adjacent detector elements 510. Extent of field-of-view limiting may be controlled by the size, pitch and arrangement of lenses 553 and their locations with respect to and distances from detector elements 510. In accordance with a preferred embodiment, the field-of-view limiting functionality limits the field-of-view of at least one of detector elements 510 to a solid angle of less than or equal to 15 degrees, in accordance with another preferred embodiment, the field-of-view limiting functionality limits the field-of-view of at least one of detector elements 510 to a solid angle of less than or equal to 7 degrees.

Reference is now made to FIGS. 9A, 9B, 9C and 9D, which are simplified illustrations of four alternative embodiments of a portion of an input device constructed and operative in accordance with yet another preferred embodiment of the present disclosure, employing forward-facing detector elements arranged about edges of a display element.

In the structure of FIGS. 9A-9D, at least one detector assembly 600 is arranged about at least one edge 602 of an interactive surface element 604, coinciding with a viewing plane, to sense light impinging directly onto detector assembly 600. Interactive surface element 604 may be a single or multiple layer plate and may have one or more coating layers associated therewith. Light, preferably including light in the IR band, is emitted by a light beam emitter, such as light beam emitting stylus 180 in the embodiment of FIG. 1C or the light beam emitting remote control device 292 of FIG. 1F, or a light reflecting object, as in the embodiment of FIG. 1D. Preferably, detector assemblies 600 are provided along at least two mutually perpendicular edges 602, though detector assemblies 600 may be provided along all or most of edges 602. Alternatively, a single detector assembly 600 may be provided along only one edge 602 of interactive surface element 604. In accordance with a preferred embodiment of the present disclosure, the detector assembly 600 comprises a support substrate 606 onto which is mounted a linear arrangement 608 of detector elements 610. As distinct from the embodiments of FIGS. 8A-8D, there is provided a cover layer 612 and as distinct from the embodiments of FIGS. 4-7, the detector assembly 600 and the detector elements 610 are generally forward facing, in the sense illustrated generally in FIG. 1B and described hereinabove with respect thereto. The cover layer 612 may provide multiple functions including physical protection, light intensity limitation and field-of-view limitation, and may have optical power.

The support substrate 606 may be mounted onto a display housing (not shown) or may be integrally formed therewith. The support substrate 606 may alternatively be mounted onto an edge 602 of interactive surface element 604. The support substrate 606 may be formed of a ceramic material, a material such as FR-4 which is commonly used for PCBs, glass, plastic or a metal such as aluminum. The support substrate may also provide mounting for and electrical connections to the detector elements 610. A processor 614 for processing the outputs of the detector elements 610 may also be mounted on the support substrate 606.

It is a particular feature of this embodiment of the present disclosure that the detector assembly 600 is extremely thin, preferably under 1 mm overall.

Accordingly, the support substrate 606 is preferably 50-200 microns in thickness and the linear arrangement 608 of detector elements 610 is preferably 100-400 microns in thickness and the cover layer 612 is preferably 100-500 microns in thickness.

The input devices shown in FIG. 9A-9D may also include a source of light which is preferably external to the input device, for example, as shown in FIG. 19. In a preferred embodiment of the present disclosure, the external light source is an external IR light emitting stylus, such as stylus 322 of FIG. 2B. Suitable external light sources include sunlight, artificial room lighting and IR radiation emitted from a human body or other heat source.

In alternative preferred embodiments, the source of light may comprise an illumination subassembly 616 which typically includes one or more electromagnetic radiation emitting sources, here shown as multiple IR emitting LEDs 618 mounted about interactive surface element 604. As shown in FIGS. 9A-9D, interactive surface element 604 is preferably associated with a display element 619, such as an LCD display. Display element 619 is preferably smaller in area than the interactive surface element 604.

The illumination subassembly 616 may be associated with interactive surface element 604, as described above, or may be associated with another part of the interactive device, such as display element 619. Examples of various suitable configurations of illumination subassembly 616 associated with an interactive surface are described herein below in FIGS. 18A-18F, it being appreciated that such configurations may alternatively or additionally be associated with a display surface or any other suitable part of the device. Optionally, the light emitted by LEDs 618 may be modulated by modulating circuitry (not shown).

It is a particular feature of the embodiments of FIGS. 9A-9D that interactive surface element 604 has a first region, overlying display element 619, having first user sensible functionality and a second region, extending beyond display element 619, having second functionality, different from the first user sensible functionality.

It is a further particular feature of the embodiments of FIGS. 9A-9D that both the first and second functionalities employ a common detector assembly, such as detector assembly 600 and may employ a common source of light, such as illumination subassembly 616.

It is appreciated that output circuitry in the input devices shown in FIGS. 9A-9D may preferably utilize the calculated X, Y coordinate data to determine which region of which interactive element is being selected and thus actuate the user-desired function accordingly.

It is appreciated that an interactive device, such as the devices described hereinabove with reference to FIGS. 1A-3B, may include one or more multi-region interactive surface elements, examples of which are illustrated in FIGS. 9A-9D, and other examples of which are described hereinabove and herein below with reference to any one or more of FIGS. 4-8D and 10A-17C.

Figure 9A:
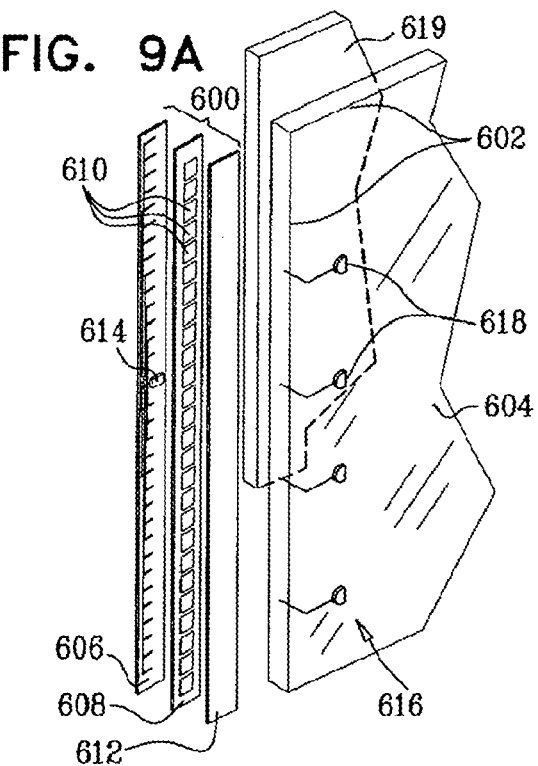
FIGS. 9A, 9B, 9C and 9D are simplified illustrations of four alternative embodiments of a portion of an input device constructed and operative in accordance with yet another preferred embodiment of the present disclosure, employing forward-facing detectors arranged about edges of a display element.

In the embodiment of FIG. 9A, cover layer 612 is formed of glass or any other suitable light transparent material.

Figure 9B:
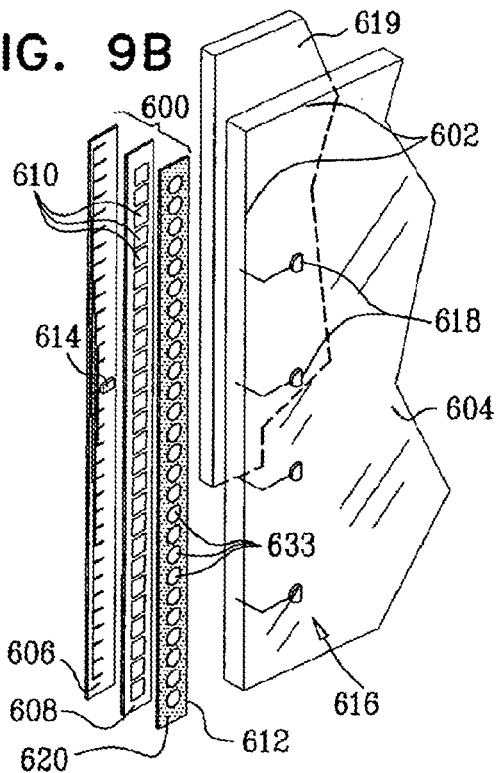

Reference is now made to FIG. 9B, in which it is seen that cover layer 612 includes a field-of-view defining mask 620 having apertures 633 formed therein in sizes and arrangements which provide desired fields-of-view for the various corresponding detector elements 610. Each detector element 610 may have associated therewith a single aperture 633, as shown, or a plurality of smaller apertures.

Field-of-view limiting functionality may be desirable in this context because it enhances resolution by limiting overlap between the fields-of-view of adjacent detector elements 610. Extent of field-of-view limiting may be controlled by the size, pitch and arrangement of apertures 633 and their locations with respect to and distances from detector elements 610. In accordance with a preferred embodiment, the field-of-view limiting functionality limits the field-of-view of at least one of detector elements 610 to a solid angle of less than or equal to 15 degrees. In accordance with another preferred embodiment, the field-of-view limiting functionality limits the field-of-view of at least one of detector elements 610 to a solid angle of less than or equal to 7 degrees.

Figure 9C:
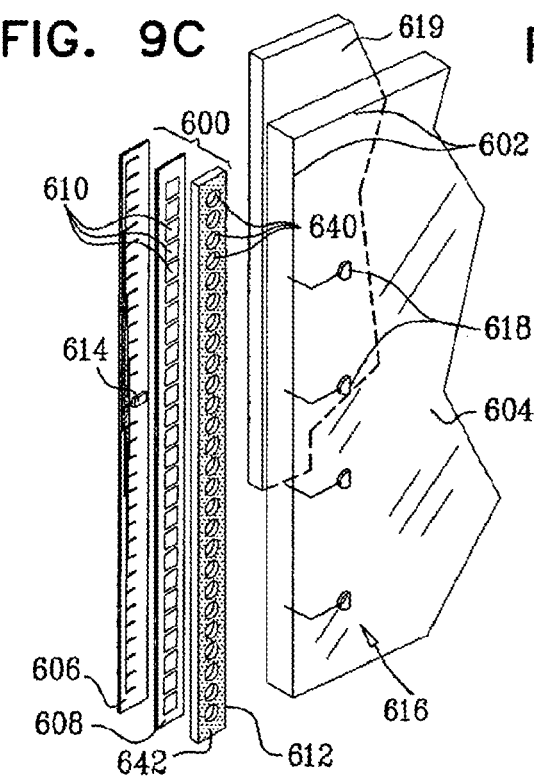

Reference is now made to FIG. 9C, which differs from that of FIG. 9B in that apertures 633 in mask 620 are replaced by light collimating tunnel-defining apertures 640 in a mask 642.

Each detector element 610 may have associated therewith a single tunnel-defining aperture 640, as shown, or a plurality of smaller tunnel-defining apertures.

Field-of-view limiting functionality may be desirable in this context because it enhances resolution by limiting overlap between the fields-of-view of adjacent detector elements 610. Extent of field-of-view limiting may be controlled by the size, pitch and arrangement of apertures 640 and their locations with respect to and distances from detector elements 610. In accordance with a preferred embodiment, the field-of-view limiting functionality limits the field-of-view of at least one of detector elements 610 to a solid angle of less than or equal to 15 degrees, in accordance with another preferred embodiment, the field-of-view limiting functionality limits the field-of-view of at least one of detector elements 610 to a solid angle of less than or equal to 7 degrees.

Figure 9D:
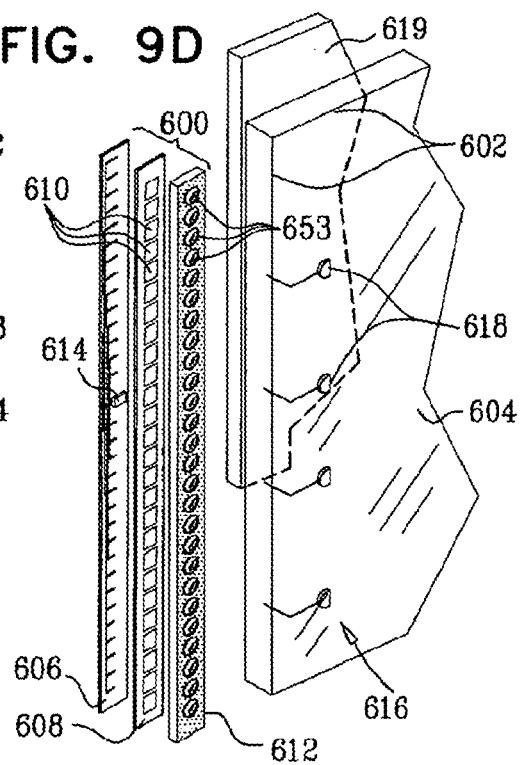

Reference is now made to FIG. 9D, which differs from that of FIGS. 9B and 9C in that the apertures in FIGS. 9B and 9C are replaced by lenses 653. Lenses 653 may be integrally formed with cover layer 612 or may be discrete elements fitted within suitably sized and positioned apertures in cover layer 612. Lenses 653 may be associated with tunnel-defining apertures or may comprise an array of microlenses aligned with one or more of detector elements 610.

Field-of-view limiting functionality may be desirable in this context because it enhances resolution by limiting overlap between the fields-of-view of adjacent detector elements 610. Extent of field-of-view limiting may be controlled by the size, pitch and arrangement of lenses 653 and their locations with respect to and distances from detector elements 610. In accordance with a preferred embodiment, the field-of-view limiting functionality limits the field-of-view of at least one of detector elements 610 to a solid angle of less than or equal to 15 degrees, in accordance with another preferred embodiment, the field-of-view limiting functionality limits the field-of-view of at least one of detector elements 610 to a solid angle of less than or equal to 7 degrees.

Reference is now made to FIGS. 10A, 10B, 10C and 10D, which are simplified illustrations of four alternative embodiments of a portion of an input device constructed and operative in accordance with still another preferred embodiment of the present disclosure, employing forward-facing detector elements arranged behind edges of a display element.

In the structure of FIGS. 10A-10D; at least one detector assembly 700 is arranged behind at least one edge 702 of an interactive surface element 704, coinciding with a viewing plane, to sense light impinging onto detector assembly 700 after propagating through interactive surface element 704. Interactive surface element 704 may be a single or multiple layer plate and may have one or more coating layers associated therewith. The light, preferably including light in the IR band, is emitted by a light beam emitter, such as light beam emitting stylus 180 in the embodiment of FIG. 1C or the light beam emitting remote control device 292 of FIG. 1F, or a light reflecting object, as in the embodiment of FIG. 1D. Preferably, detector assemblies 700 are provided behind at least two mutually perpendicular edges 702, though detector assemblies 700 may be provided behind all or most of edges 702. Alternatively, a single detector assembly 700 may be provided behind only one of edges 702. In accordance with a preferred embodiment of the present disclosure, the detector assembly 700 comprises a support substrate 706 onto which is mounted a linear arrangement 708 of detector elements 710. Similarly to the embodiments of FIGS. 9A-9D, there is provided a cover layer 712 and as distinct from the embodiments of FIGS. 4-7, the detector assembly 700 and the detector elements 710 are generally forward facing, in the sense illustrated generally in FIG. 1B and described hereinabove with respect thereto. The cover layer 712 may provide multiple functions including physical protection, light intensity limitation and field-of-view limitation, and may have optical power. Alternatively, cover layer 712 may be obviated.

The support substrate 706 may be mounted onto a display housing (not shown) or may be integrally formed therewith. The support substrate 706 may alternatively be mounted onto a rearward facing surface 713 of interactive surface element 704 at the edge 702 lying in front of the linear arrangement 708. The support substrate 706 may be formed of a ceramic material, a material such as FR-4 which is commonly used for PCBs, glass, plastic or a metal such as aluminum. The support substrate 706 may also provide mounting for and electrical connections to the detector elements 710. A processor 714 for processing the outputs of the detector elements 710 may also be mounted on the support substrate 706.

It is a particular feature of the embodiments of FIGS. 10A-10D of the present disclosure that the detector assembly 700 is extremely thin, preferably under 1 mm overall. Accordingly, the support substrate 706 is preferably 50-200 microns in thickness and the linear arrangement 708 of detector elements 710 is preferably 100-400 microns in thickness and the cover layer 712 is preferably 100-500 microns in thickness.

The input devices shown in FIG. 10A-10D may also include a source of light which is preferably external to the input device, for example, as shown in FIG. 19 in a preferred embodiment of the present disclosure, the external light source is an external IR light emitting stylus, such as stylus 322 of FIG. 2B. Suitable external light sources include sunlight, artificial room lighting and IR radiation emitted from a human body or other heat source. hi alternative preferred embodiments, the source of light may comprise an illumination subassembly 716 which typically includes one or more electromagnetic radiation emitting sources, here shown as multiple IR emitting LEDs 718 mounted about interactive surface element 704. As shown in FIGS. 10A-10D, interactive surface element 704 is preferably associated with a display element 719, such as an LCD display. Display element 719 is preferably smaller in area than the interactive surface element 704. The illumination subassembly 716 may be associated with interactive surface element 704, as described above, or may be associated with another part of the interactive device, such as display element 719. Examples of various suitable configurations of illumination subassembly 716 associated with an interactive surface are described herein below in FIGS. 18A-18F, it being appreciated that such configurations may alternatively or additionally be associated with a display surface or any other suitable part of the device. Optionally, the light emitted by LEDs 718 may be modulated by modulating circuitry (not shown).

It is a particular feature of the embodiments of FIGS. 10A-10D that interactive surface element 704 has a first region, overlying display element 719, having first user sensible functionality, and a second region, extending beyond display element 719, having second functionality, different from the first user sensible functionality.

It is a further particular feature of the embodiments of FIGS. 10A-10D that both the first and second functionalities employ a common detector assembly, such as detector assembly 700 and may employ a common source of light, such as illumination subassembly 716. It is appreciated that output circuitry in the input devices shown in FIGS. 10A-10D may preferably utilize the calculated X, Y coordinate data to determine which region of which interactive element is being selected and thus actuate the user-desired function accordingly.

It is appreciated that an interactive device, such as the devices described hereinabove with reference to FIGS. 1A-3B, may include one or more multi-region interactive surface elements, examples of which are illustrated in FIGS. 10A-10D, and other examples of which are described hereinabove and herein below with reference to any one or more of FIGS. 4-9D and 11A-17C.

Figure 10A:
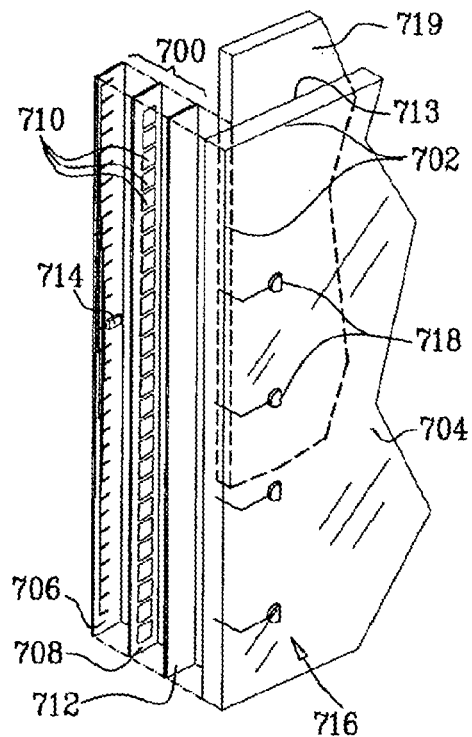
FIGS. 10A, 10B, 10C and 10D are simplified illustrations of four alternative embodiments of a portion of an input device constructed and operative in accordance with still another preferred embodiment of the present disclosure, employing forward-facing detectors arranged behind edges of a display element.

In the embodiment of FIG. 10A, cover layer 712 is formed of glass or any other suitable light transparent material.

Figure 10B:
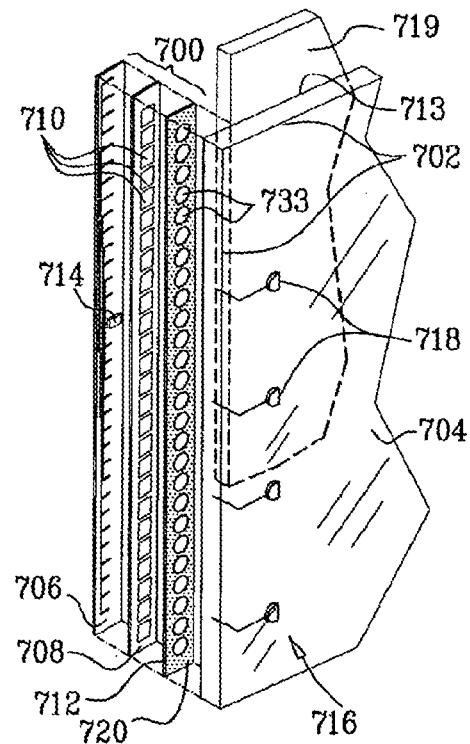

Reference is now made to FIG. 10B, in which it is seen that cover layer 712 includes a field-of-view defining mask 720 having apertures 733 formed therein in sizes and arrangements which provide desired fields-of-view for the various corresponding detector elements 710. Each detector element 710 may have associated therewith a single aperture 733, as shown, or a plurality of smaller apertures.

Field-of-view limiting functionality may be desirable in this context because it enhances resolution by limiting overlap between the fields-of-view of adjacent detector elements 710. Extent of field-of-view limiting may be controlled by the size, pitch and arrangement of apertures 733 and their locations with respect to and distances from detector elements 710. In accordance with a preferred embodiment, the field-of-view limiting functionality limits the field-of-view of at least one of detector elements 710 to a solid angle of less than or equal to 15 degrees. In accordance with another preferred embodiment, the field-of-view limiting functionality limits the field-of-view of at least one of detector elements 710 to a solid angle of less than or equal to 7 degrees.

Figure 10C:
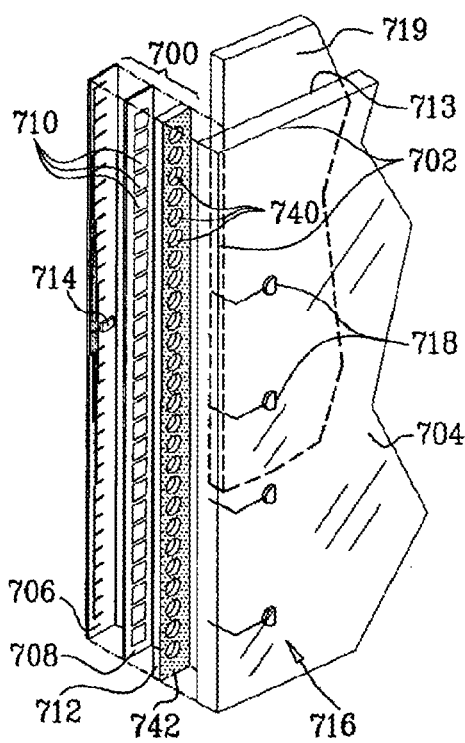

Reference is now made to FIG. 10C, which differs from that of FIG. 10B in that apertures 733 in mask 720 are replaced by light collimating tunnel-defining apertures 740 in a mask 742.

Each detector element 710 may have associated therewith a single tunnel-defining aperture 740, as shown, or a plurality of smaller tunnel-defining apertures.

Field-of-view limiting functionality may be desirable in this context because it enhances resolution by limiting overlap between the fields-of-view of adjacent detector elements 710. Extent of field-of-view limiting may be controlled by the size, pitch and arrangement of apertures 740 and their locations with respect to and distances from detector elements 710. In accordance with a preferred embodiment, the field-of-view limiting functionality limits the field-of-view of at least one of detector elements 710 to a solid angle of less than or equal to 15 degrees. In accordance with another preferred embodiment, the field-of-view limiting functionality limits the field-of-view of at least one of detector elements 710 to a solid angle of less than or equal to 7 degrees.

Figure 10D:
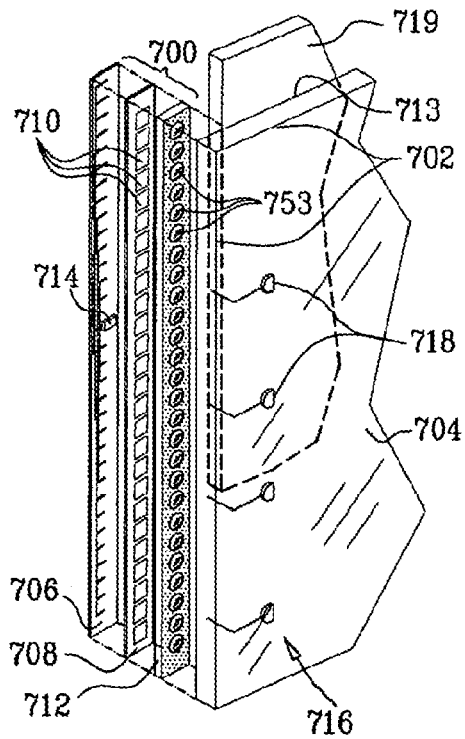

Reference is now made to FIG. 10D, which differs from that of FIGS. 10B and 10C in that the apertures in FIGS. 10B and 10C are replaced by lenses 753. Lenses 753 may be integrally formed with cover layer 712 or may be discrete elements fitted within suitably sized and positioned apertures in cover layer 712. Lenses 753 may be associated with tunnel-defining apertures or may comprise an array of microlenses aligned with one or more of detector elements 710.

Field-of-view limiting functionality may be desirable in this context because it enhances resolution by limiting overlap between the fields-of-view of adjacent detector elements 710. Extent of field-of-view limiting may be controlled by the size, pitch and arrangement of lenses 753 and their locations with respect to and distances from detector elements 710. In accordance with a preferred embodiment, the field-of-view limiting functionality limits the field-of-view of at least one of detector elements 710 to a solid angle of less than or equal to 15 degrees. In accordance with another preferred embodiment, the field-of-view limiting functionality limits the field-of-view of at least one of detector elements 710 to a solid angle of less than or equal to 7 degrees.

Reference is now made to FIGS. 11A, 11B, 11C and 11D, which are simplified illustrations of four alternative embodiments of a portion of an input device constructed and operative in accordance with a further preferred embodiment of the present disclosure, employing forward-facing detector elements arranged behind edges of a display element. hi the structure of FIGS. 11A-11D, at least one detector assembly 800 is arranged behind at least one edge 802 of an interactive surface element 804, coinciding with a viewing plane, to sense light impinging onto detector assembly 800 after propagating through interactive surface element 804. Interactive surface element 804 may be a single or multiple layer plate and may have one or more coating layers associated therewith. The light, preferably including light in the IR band, is emitted by a light beam emitter, such as light beam emitting stylus 180 in the embodiment of FIG. 1C or the light beam emitting remote control device 292 of FIG. 1F, or a light reflecting object, as in the embodiment of FIG. 1D. Preferably, detector assemblies 800 are provided behind at least two mutually perpendicular edges 802, though detector assemblies 800 may be provided behind all or most of edges 802. Alternatively, a single detector assembly 800 may be provided behind interactive surface element 804 at only one edge thereof.

In accordance with a preferred embodiment of the present disclosure, the detector assembly 800 comprises a support substrate 806 onto which is mounted a linear arrangement 808 of detector elements 810. As distinct from the embodiments of FIGS. 4-7, in the embodiments of FIGS. 11A-11D, the detector assembly 800 and the detector elements 810 are generally forward facing, in the sense illustrated generally in FIG. 1B and described hereinabove with respect thereto. Also, as distinct from the embodiments of FIGS. 10A-10D, the cover layer is obviated and its functionality is provided by suitable conditioning of a rearward facing surface 811 of interactive surface element 804 at the edge 802 lying in front of the linear arrangement 808. This functionality may provide multiple functions including physical protection, light intensity limitation and field-of-view limitation, and may have optical power. The support substrate 806 may be mounted onto a display housing (not shown) or may be integrally formed therewith. The support substrate 806 may alternatively be mounted onto the rearward facing surface 811 of interactive surface element 804 at the edge 802. The support substrate 806 may be formed of a ceramic material, a material such as FR-4 which is commonly used for PCBs, glass, plastic or a metal such as aluminum. The support substrate may also provide mounting for and electrical connections to the detector elements 810. A processor 814 for processing the outputs of the detector elements 810 may also be mounted on the support substrate 806.

It is a particular feature of the embodiments of FIGS. 11A-11D of the present disclosure that the detector assembly 800 is extremely thin, preferably under 1 mm overall. Accordingly, the support substrate 806 is preferably 50-200 microns in thickness and the linear arrangement 808 of detector elements 810 is preferably 100-400 microns in thickness.

The input devices shown in FIG. 11A-11D may also include a source of light which is preferably external to the input device, for example, as shown in FIG. 19. In a preferred embodiment of the present disclosure, the external light source is an external IR light emitting stylus, such as stylus 322 of FIG. 2B. Suitable external light sources include sunlight, artificial room lighting and IR radiation emitted from a human body or other heat source.

In alternative preferred embodiments, the source of light may comprise an illumination subassembly 816 which typically includes one or more electromagnetic radiation emitting sources, here shown as multiple IR emitting LEDs 818 mounted about interactive surface element 804. As shown in FIGS. 11A-11D, interactive surface element 804 is preferably associated with a display element 819, such as an LCD display. Display element 819 is preferably smaller in area than the interactive surface element 804.

The illumination subassembly 816 may be associated with the interactive surface element 804, as described above, or may be associated with another part of the interactive device, such as display element 819. Examples of various suitable configurations of illumination subassembly 816 associated with an interactive surface are described herein below in FIGS. 18A-18F, it being appreciated that such configurations may alternatively or additionally be associated with a display surface or any other suitable part of the device. Optionally, the light emitted by LEDs 818 may be modulated by modulating circuitry (not shown).

It is a particular feature of the embodiments of FIGS. 11A-11D that interactive surface element 804 has a first region, overlying display element 819, having first user sensible functionality and a second region, extending beyond display element 819, having second functionality, different from the first user sensible functionality. It is a further particular feature of the embodiments of FIGS. 11A-11D that both the first and second functionalities employ a common detector assembly, such as detector assembly 800 and may employ a common source of light, such as illumination subassembly 816.

It is appreciated that output circuitry in the input devices shown in FIGS. 11A-11D may preferably utilize the calculated X, Y coordinate data to determine which region of which interactive element is being selected and thus actuate the user-desired function accordingly.

It is appreciated that an interactive device, such as the devices described hereinabove with reference to FIGS. 1A-3B, may include one or more multi-region interactive surface elements, examples of which are illustrated in FIGS. 11A-11D, and other examples of which are described hereinabove and herein below with reference to any one or more of FIGS. 4-10D and 12A-17C.

Figure 11A:
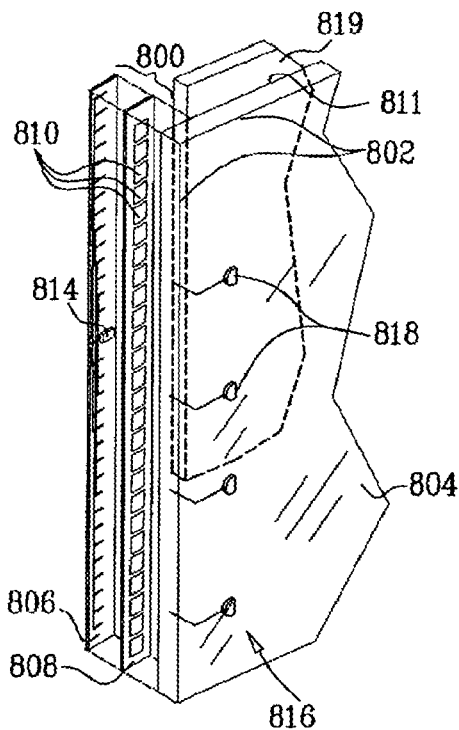
FIGS. 11A, 11B, 11C and 11D are simplified illustrations of four alternative embodiments of a portion of an input device constructed and operative in accordance with a further preferred embodiment of the present disclosure, employing forward-facing detectors arranged behind edges of a display element.

In the embodiment of FIG. 11A, the rearward facing surface 811 of interactive surface element 804 at the edge 802 lying in front of the linear arrangement 808 is uniformly polished for unimpeded light transmission therethrough to linear arrangement 808 of detector elements 810.

Figure 11B:
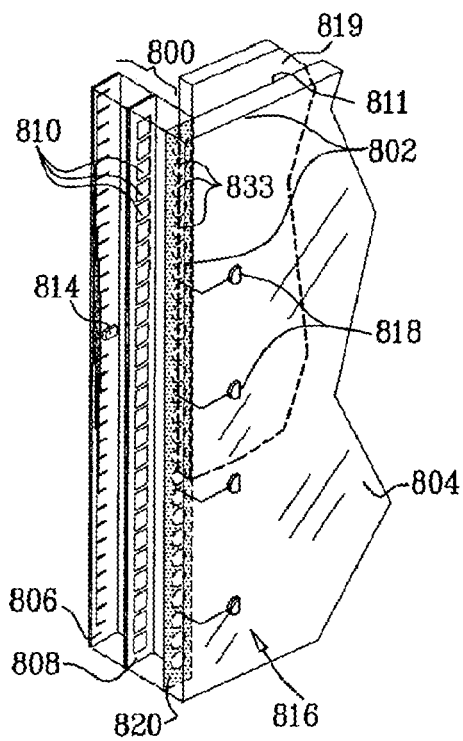

Reference is now made to FIG. 11B, in which it is seen that the rearward facing surface 811 of interactive surface element 804 at the edge 802 lying in front of the linear arrangement 808 is conditioned to define a field-of-view defining mask 820 having apertures 833 formed therein in sizes and arrangements which provide desired fields-of-view for the various corresponding detector elements 810. Each detector element 810 may have associated therewith a single aperture 833, as shown, or a plurality of smaller apertures.

Field-of-view limiting functionality may be desirable in this context because it enhances resolution by limiting overlap between the fields-of-view of adjacent detector elements 810. Extent of field-of-view limiting may be controlled by the size, pitch and arrangement of apertures 833 and their locations with respect to and distances from detector elements 810. In accordance with a preferred embodiment, the field-of-view limiting functionality limits the field-of-view of at least one of detector elements 810 to a solid angle of less than or equal to 15 degrees. In accordance with another preferred embodiment, the fieldof-view limiting functionality limits the field-of-view of at least one of detector elements 810 to a solid angle of less than or equal to 7 degrees.

Figure 11C:
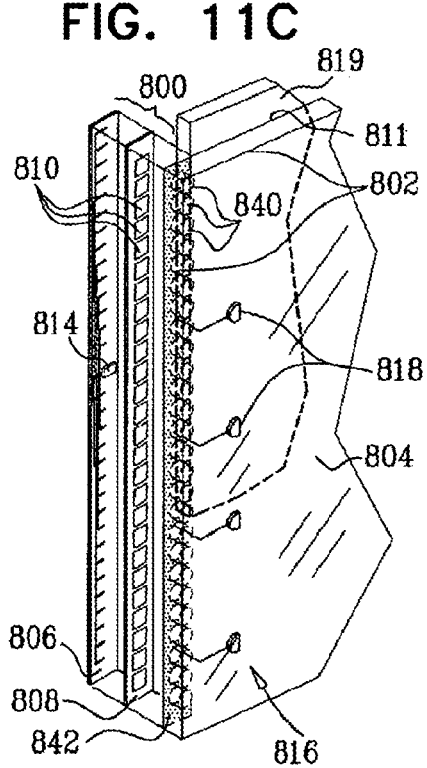

Reference is now made to FIG. 11C, which differs from that of FIG. 11B in that apertures 833 in mask 820 are replaced by light collimating tunnel-defining apertures 840 in a mask 842. Each detector element 810 may have associated therewith a single tunnel-defining aperture 840, as shown, or a plurality of smaller tunnel-defining apertures.

Field-of-view limiting functionality may be desirable in this context because it enhances resolution by limiting overlap between the fields-of-view of adjacent detector elements 810. Extent of field-of-view limiting may be controlled by the size, pitch and arrangement of apertures 840 and their locations with respect to and distances from detector elements 810. In accordance with a preferred embodiment, the field-of-view limiting functionality limits the field-of-view of at least one of detector elements 810 to a solid angle of less than or equal to 15 degrees. In accordance with another preferred embodiment, the field-of-view limiting functionality limits the field-of-view of at least one of detector elements 810 to a solid angle of less than or equal to 7 degrees.

Figure 11D:
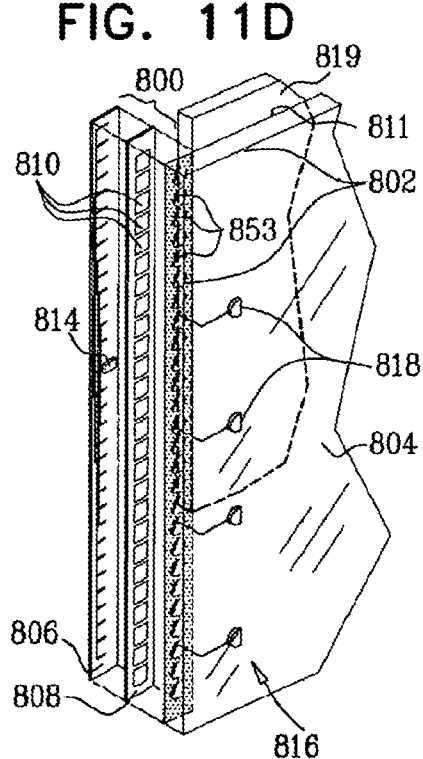

Reference is now made to FIG. 11D, which differs from that of FIGS. 11B and 11C in that the apertures in FIGS. 11B and 11C are replaced by lenses 853. Lenses 853 may be integrally formed at edges 802 or may be discrete elements fitted within suitably sized and positioned apertures in interactive surface element 804. Lenses 853 may be associated with tunnel-defining apertures or may comprise an array of microlenses aligned with one or more of detector elements 810.

Field-of-view limiting functionality may be desirable in this context because it enhances resolution by limiting overlap between the fields-of-view of adjacent detector elements 810. Extent of field-of-view limiting may be controlled by the size, pitch and arrangement of lenses 853 and their locations with respect to and distances from detector elements 810. In accordance with a preferred embodiment, the field-of-view limiting functionality limits the field-of-view of at least one of detector elements 810 to a solid angle of less than or equal to 15 degrees. In accordance with another preferred embodiment, the field-of-view limiting functionality limits the field-of-view of at least one of detector elements 810 to a solid angle of less than or equal to 7 degrees.

Reference is now made to FIGS. 12A, 12B, 12C and 12D, which are simplified illustrations of four alternative embodiments of a portion of an input device constructed and operative in accordance with a yet further preferred embodiment of the present disclosure, employing detector elements arranged along edges of a display element.

In the structure of FIGS. 12A-12D, at least one detector assembly 900 is arranged along at least one edge 902 of an interactive surface element 904, coinciding with a viewing plane, to sense light impinging on interactive surface element 904 and propagating within the interactive surface element to the edges 902 thereof. Interactive surface element 904 may be a single or multiple layer plate and may have one or more coating layers associated therewith. Preferably, detector assemblies 900 are provided along at least two mutually perpendicular edges 902, though detector assemblies 900 may be provided along all or most of edges 902. Alternatively, a single detector assembly 900 may be provided along only one edge 902 of interactive surface element 904.

The detector assembly 900 includes a linear arrangement 908 of detector elements 910. As distinct from the embodiments of FIGS. 8A-8D, the detector assembly 900 does not comprise a support substrate onto which is mounted a linear arrangement of detector elements. In the embodiments of FIGS. 12A-12D, the support substrate of FIGS. 8A-8D is replaced by a portion of a peripheral housing 912. Similarly to the embodiments of FIGS. 4-7 there is provided a cover layer 914 which provides multiple functions including physical protection, light intensity limitation and field-of-view limitation, and may have optical power. Alternatively, cover layer 914 may be obviated.

The peripheral housing 912 may be formed of any suitable material including, for example, ceramic material, a material such as FR-4 which is commonly used for PCBs, glass, plastic or a metal such as aluminum. The peripheral housing 912 may also provide mounting for and electrical connections to the detector elements 910.

A processor 916 for processing the outputs of the detector elements 910 may also be mounted on the peripheral housing 912.

It is a particular feature of this embodiment of the present disclosure that the detector assembly 900 is extremely thin, preferably under 1 mm overall. Accordingly, the linear arrangement 908 of detector elements 910 is preferably 100-400 microns in thickness.

The input devices shown in FIG. 12A-12D may also include a source of light which is preferably external to the input device, for example, as shown in FIG. 19.

In a preferred embodiment of the present disclosure, the external light source is an external IR light emitting stylus, such as stylus 322 of FIG. 2B. Suitable external light sources include sunlight, artificial room lighting and IR radiation emitted from a human body or other heat source.

In an alternate preferred embodiment, the source of light may comprise an illumination subassembly 917 which typically includes one or more electromagnetic radiation emitting sources, here shown as multiple IR emitting LEDs 918 mounted about an interactive surface element 904. As shown in FIGS. 12A-12D, interactive surface element 904 is preferably associated with a display element 919, such as an LCD display. Display element 919 is preferably smaller in area than the interactive surface element 904. The illumination subassembly 917 may be associated with interactive surface element 904, as described above, or may be associated with another part of the interactive device, such as display element 919. Examples of various suitable configurations of illumination subassembly 917 associated with an interactive surface are described herein below in FIGS. 18A-18F, it being appreciated that such configurations may alternatively or additionally be associated with a display surface or any other suitable part of the device. Optionally, the light emitted by LEDs 918 may be modulated by modulating circuitry (not shown).

It is a particular feature of the embodiment of FIGS. 12A-12D that interactive surface element 904 has a first region, overlying display element 919, having first user sensible functionality and a second region, extending beyond display element 919, having second functionality, different from the first user sensible functionality.

It is a further particular feature of the embodiments of FIGS. 12A-12D that both the first and second functionalities employ a common detector assembly, such as detector assembly 900, and may employ a common source of light, such as illumination subassembly 917. It is appreciated that output circuitry in the input devices shown in FIGS. 12A-12D may preferably utilize the calculated X, Y coordinate data to determine which region of which interactive element is being selected and thus actuate the user-desired function accordingly.

It is appreciated that an interactive device, such as the devices described hereinabove with reference to FIGS. 1A-3B, may include one or more multi-region interactive surface elements, examples of which are illustrated in FIGS. 12A-12D, and other examples of which are described hereinabove and herein below with reference to any one or more of FIGS. 4-11D and 13A-17C.

Figure 12A:
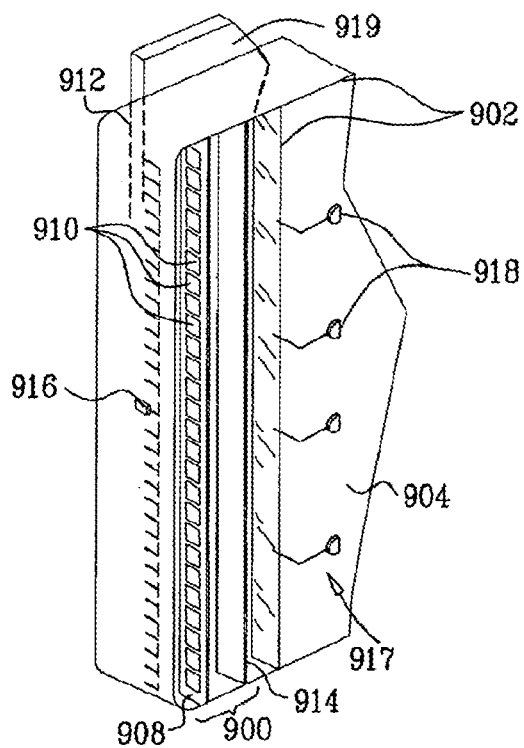
FIGS. 12A, 12B, 12C and 12D are simplified illustrations of four alternative embodiments of a portion of an input device constructed and operative in accordance with a yet further preferred embodiment of the present disclosure, employing detectors arranged along edges of a display element.

In the embodiment of FIG. 12A, cover layer 914 provides generally unimpeded light transmission therethrough to linear arrangement 908 of detector elements 910.

Figure 12B:
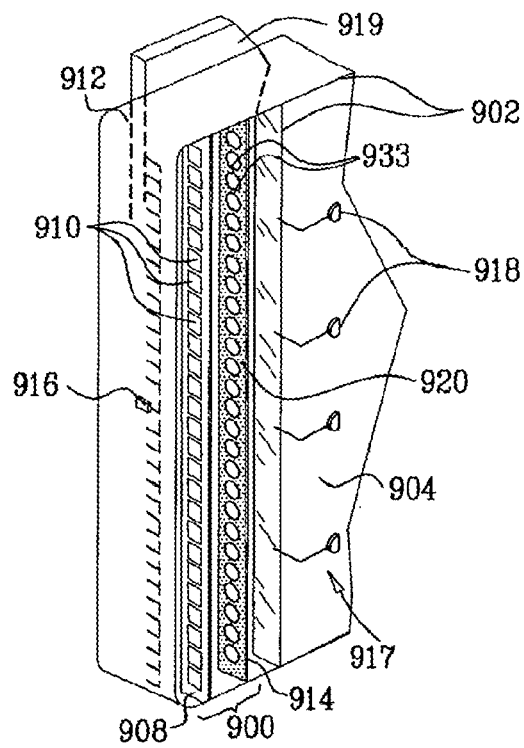

Reference is now made to FIG. 12B, in which it is seen that cover layer 914 defines a field-of-view defining mask 920 having apertures 933 formed therein in sizes and arrangements which provide desired fields-of-view for the various corresponding detector elements 910. Each detector element 910 may have associated therewith a single aperture 933, as shown, or a plurality of smaller apertures.

Field-of-view limiting functionality may be desirable in this context because it enhances resolution by limiting overlap between the fields-of-view of adjacent detector elements 910. Extent of field-of-view limiting may be controlled by the size, pitch and arrangement of apertures 933 and their locations with respect to and distances from detector elements 910. In accordance with a preferred embodiment, the field-of-view limiting functionality limits the field-of-view of at least one of detector elements 910 to a solid angle of less than or equal to 15 degrees. In accordance with another preferred embodiment, the field-of-view limiting functionality limits the field-of-view of at least one of detector elements 910 to a solid angle of less than or equal to 7 degrees.

Figure 12C:
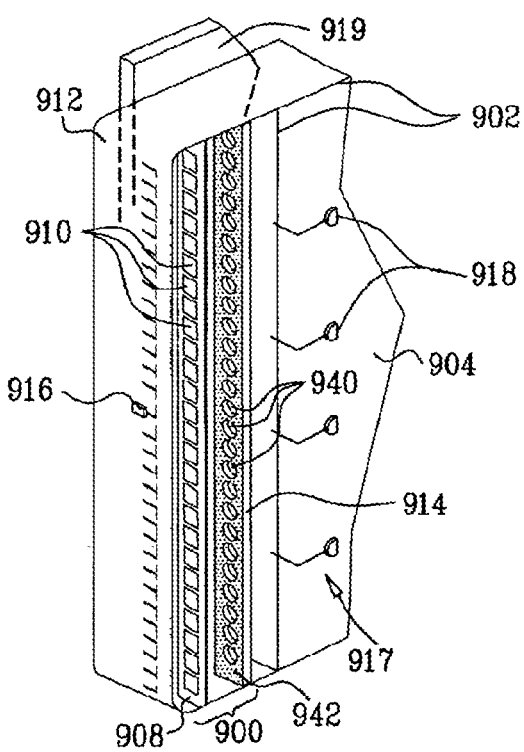

Reference is now made to FIG. 12C, which differs from that of FIG. 12B in that apertures 933 in mask 920 are replaced by light collimating tunnel-defining apertures 940 in a mask 942.

Each detector element 910 may have associated therewith a single tunnel-defining aperture 940, as shown, or a plurality of smaller tunnel-defining apertures.

Field-of-view limiting functionality may be desirable in this context because it enhances resolution by limiting overlap between the fields-of-view of adjacent detector elements 910. Extent of field-of-view limiting may be controlled by the size, pitch and arrangement of apertures 940 and their locations with respect to and distances from detector elements 910. In accordance with a preferred embodiment, the field-of-view limiting functionality limits the field-of-view of at least one of detector elements 910 to a solid angle of less than or equal to 15 degrees, in accordance with another preferred embodiment, the field-of-view limiting functionality limits the field-of-view of at least one of detector elements 910 to a solid angle of less than or equal to 7 degrees.

Figure 12D:
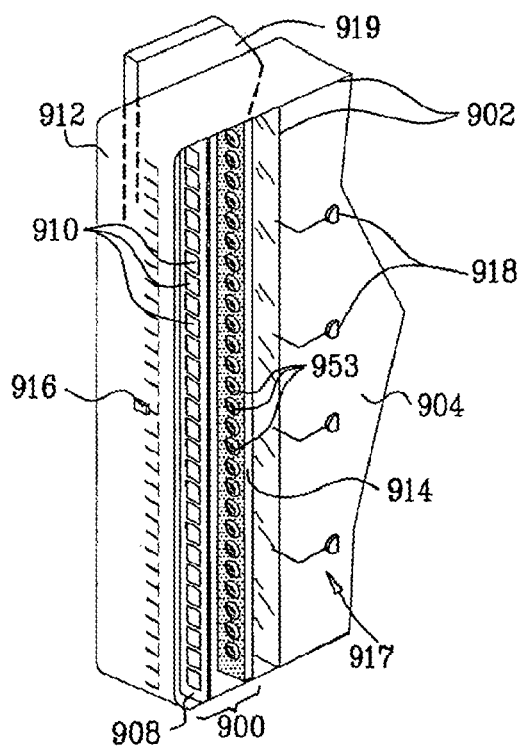

Reference is now made to FIG. 12D, which differs from that of FIGS. 12B and 12C in that the apertures in FIGS. 12B and 12C are replaced by lenses 953. Lenses 953 may be integrally formed at edges 902 or may be discrete elements fitted within suitably sized and positioned apertures in interactive surface element 904. Lenses 953 may be associated with tunnel-defining apertures or may comprise an array of microlenses aligned with one or more of detector elements 910.

Field-of-view limiting functionality may be desirable in this context because it enhances resolution by limiting overlap between the fields-of-view of adjacent detector elements 910. Extent of field-of-view limiting may be controlled by the size, pitch and arrangement of lenses 953 and their locations with respect to and distances from detector elements 910. In accordance with a preferred embodiment, the field-of-view limiting functionality limits the field-of-view of at least one of detector elements 910 to a solid angle of less than or equal to 15 degrees, in accordance with another preferred embodiment, the field-of-view limiting functionality limits the field-of-view of at least one of detector elements 910 to a solid angle of less than or equal to 7 degrees.

Reference is now made to FIGS. 13A, 13B, 13C and 13D, which are simplified illustrations of four alternative embodiments of a portion of an input device constructed and operative in accordance with a still further preferred embodiment of the present disclosure, employing detector elements arranged along edges of a display element.

In the structure of FIGS. 13A-13D, at least one detector assembly 960 is arranged along at least one edge 962 of an interactive surface element 964, coinciding with a viewing plane, to sense light impinging on interactive surface element 964 and propagating within interactive surface element 964 to the edges 962 thereof. Interactive surface element 964 may be a single or multiple layer plate and may have one or more coating layers associated therewith. Preferably, detector assemblies 960 are provided along at least two mutually perpendicular edges 962, though detector assemblies 960 may be provided along all or most of edges 962. Alternatively, a single detector assembly 960 may be provided along only one edge 962 of interactive surface element 964.

The detector assembly 960 includes a linear arrangement 968 of detector elements 970. As distinct from the embodiments of FIGS. 12A-12D, in the embodiments of FIGS. 13A-13D, the cover layer is obviated and its functionality is provided by suitable conditioning of edge 962 of interactive surface element 964. This functionality may provide multiple functions including physical protection, light intensity limitation and field-of-view limitation, and may have optical power.

As in the embodiments of FIGS. 12A-12D, detector assembly 960 does not comprise a support substrate onto which is mounted a linear arrangement of detector elements. In the embodiments of FIGS. 13A-13D, the support substrate of FIGS. 8A-8D is replaced by a portion of a peripheral housing 972.

The peripheral housing 972 may be formed of any suitable material including, for example, ceramic material, a material such as FR-4 which is commonly used for PCBs, glass, plastic or a metal such as aluminum. The peripheral housing 972 may also provide mounting for and electrical connections to the detector elements 970. —A processor 976 for processing the outputs of the detector elements 970 may also be mounted on the peripheral housing 972.

It is a particular feature of this embodiment of the present disclosure that the detector assembly 960 is extremely thin, preferably under 1 mm overall. Accordingly, the linear arrangement 968 of detector elements 970 is preferably 100-400 microns in thickness. The input devices shown in FIG. 13A-13D may also include a source of light which is preferably external to the input device, for example, as shown in FIG. 19. In a preferred embodiment of the present disclosure, the external light source is an external IR light emitting stylus, such as stylus 322 of FIG. 2B. Suitable external light sources include sunlight, artificial room lighting and IR radiation emitted from a human body or other heat source.

In an alternate preferred embodiment, the source of light may comprise an illumination subassembly 977 which typically includes one or more electromagnetic radiation emitting sources, here shown as multiple IR emitting LEDs 978 mounted about interactive surface element 964. As shown in FIGS. 13A-13D, interactive surface element 964 is preferably associated with a display element 979, such as an LCD display. Display element 979 is preferably smaller in area than the interactive surface element 964.

The illumination subassembly 977 may be associated with interactive surface element 964, as described above, or may be associated with another part of the interactive device, such as display element 979. Examples of various suitable configurations of illumination subassembly 977 associated with an interactive surface are described herein below in FIGS. 18A-18F, it being appreciated that such configurations may alternatively or additionally be associated with a display surface or any other suitable part of the device. Optionally, the light emitted by LEDs 978 may be modulated by modulating circuitry (not shown).

It is a particular feature of the embodiment of FIGS. 13A-13D that interactive surface element 964 has a first region, overlying display element 979, having first user sensible functionality and a second region, extending beyond display element 979, having second functionality, different from the first user sensible functionality. It is a further particular feature of the embodiments of FIGS. 13A-13D that both the first and second functionalities employ a common detector assembly, such as detector assembly 960 and may employ a common source of light, such as illumination subassembly 977.

It is appreciated that output circuitry in the input devices shown in FIGS. 13A-13D may preferably utilize the calculated X, Y coordinate data to determine which region of which interactive element is being selected and thus actuate the user-desired function accordingly.

Figure 13A:
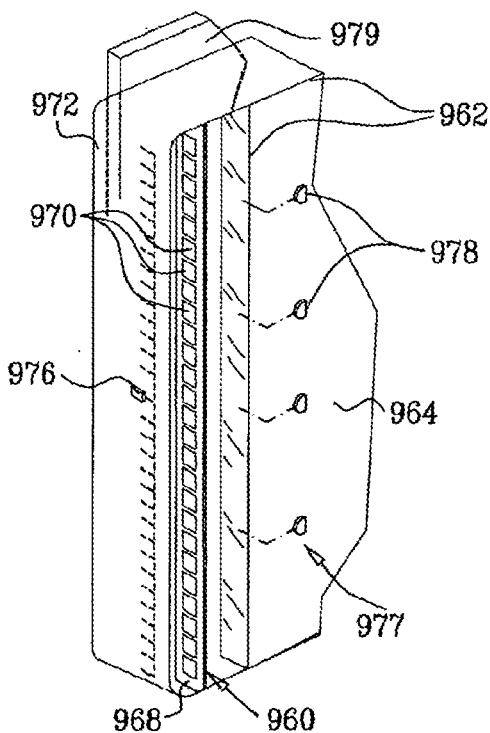
FIGS. 13A, 13B, 13C and 13D are simplified illustrations of four alternative embodiments of a portion of an input device constructed and operative in accordance with a still further preferred embodiment of the present disclosure, employing detectors arranged along edges of a display element.
Figure 13B:
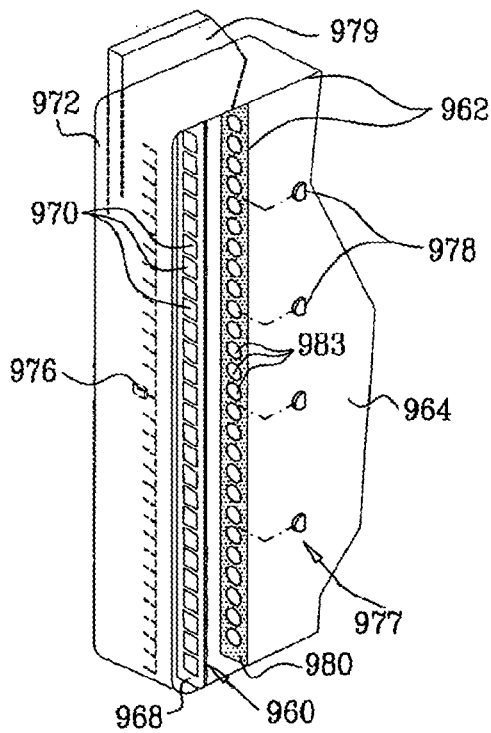
Figure 13C:
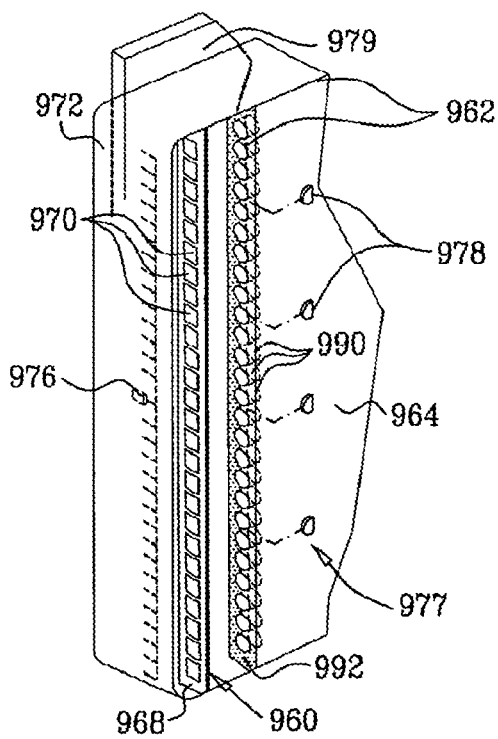

It is appreciated that an interactive device, such as the devices described hereinabove with reference to FIGS. 1A-3B, may include one or more multi-region interactive surface elements, examples of which are illustrated in FIGS. 13A-13D, and other examples of which are described hereinabove and herein below with reference to any one or more of FIGS. 4-12D and 14A-17C. In the embodiment of FIG. 13A, edge 962 is uniformly polished for unimpeded light transmission therethrough to linear arrangement 968 of detector elements 970. Reference is now made to FIG. 13B, in which it is seen that edge 962 is conditioned to define a field-of-view defining mask 980 having apertures 983 formed therein in sizes and arrangements which provide desired fields-of-view for the various corresponding detector elements 970. Each detector element 970 may have associated therewith a single aperture 983, as shown, or a plurality of smaller apertures. Field-of-view limiting functionality may be desirable in this context because it enhances resolution by limiting overlap between the fields-of-view of adjacent detector elements 970. Extent of field-of-view limiting may be controlled by the size, pitch and arrangement of apertures 983 and their locations with respect to and distances from detector elements 970. In accordance with a preferred embodiment, the field-of-view limiting functionality limits the field-of-view of at least one of detector elements 970 to a solid angle of less than or equal to 15 degrees. In accordance with another preferred embodiment, the field-of-view limiting functionality limits the field-of-view of at least one of detector elements 970 to a solid angle of less than or equal to 7 degrees. Reference is now made to FIG. 13C, which differs from that of FIG. 13B in that apertures 983 in mask 980 are replaced by light collimating tunnel-defining apertures 990 in a mask 992.

Each detector element 970 may have associated therewith a single tunnel-defining aperture 990, as shown, or a plurality of smaller tunnel-defining apertures.

Field-of-view limiting functionality may be desirable in this context because it enhances resolution by limiting overlap between the fields-of-view of adjacent detector elements 970. Extent of field-of-view limiting may be controlled by the size, pitch and arrangement of apertures 990 and their locations with respect to and distances from detector elements 970. In accordance with a preferred embodiment, the field-of-view limiting functionality limits the field-of-view of at least one of detector elements 970 to a solid angle of less than or equal to 15 degrees. In accordance with another preferred embodiment, the field-of-view limiting functionality limits the field-of-view of at least one of detector elements 970 to a solid angle of less than or equal to 7 degrees.

Figure 13D:
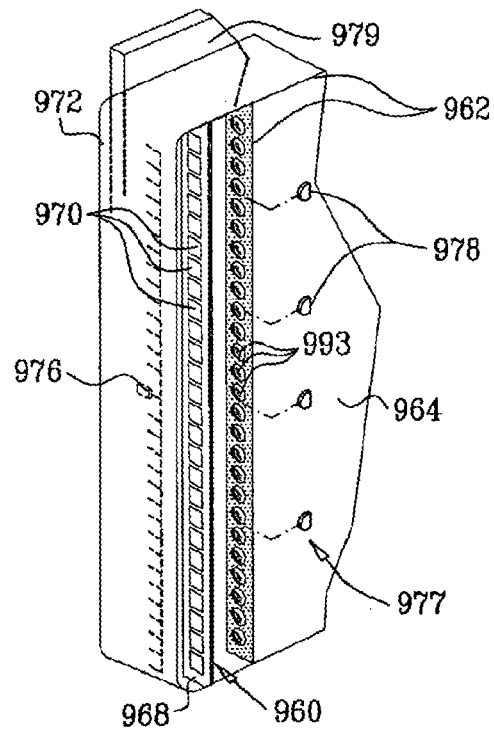

Reference is now made to FIG. 13D, which differs from FIGS. 13B and 13C in that the apertures in FIGS. 13B and 13C are replaced by lenses 993. Lenses 993 may be integrally formed at edges 962 or may be discrete elements fitted within suitably sized and positioned apertures in interactive surface element 964. Lenses 993 may be associated with tunnel-defining apertures or may comprise an array of microlenses aligned with one or more of detector elements 970.

Field-of-view limiting functionality may be desirable in this context because it enhances resolution by limiting overlap between the fields-of-view of adjacent detector elements 970. Extent of field-of-view limiting may be controlled by the size, pitch and arrangement of lenses 993 and their locations with respect to and distances from detector elements 970. In accordance with a preferred embodiment, the field-of-view limiting functionality limits the field-of-view of at least one of detector elements 970 to a solid angle of less than or equal to 15 degrees. In accordance with another preferred embodiment, the field-of-view limiting functionality limits the field-of-view of at least one of detector elements 970 to a solid angle of less than or equal to 7 degrees.

Reference is now made to FIGS. 14A, 14B, 14C and 14D, which are simplified illustrations of four alternative embodiments of a portion of an input device constructed and operative in accordance with an additional preferred embodiment of the present disclosure, employing forward-facing detector elements arranged about edges of a display element.

In the structure of FIGS. 14A-14D, at least one detector assembly 1000 is arranged about at least one edge 1002 of an interactive surface element 1004, coinciding with a viewing plane, to sense light impinging directly onto detector assembly 1000. Interactive surface element 1004 may be a single or multiple layer plate and may have one or more coating layers associated therewith. The light, preferably including light in the IR band, is emitted by a light beam emitter, such as light beam emitting remote control device 180 in the embodiment of FIG. 1C or the light beam emitting remote control device 292 of FIG. 1F, or a light reflecting object, as in the embodiment of FIG. 1D. Preferably, detector assemblies 1000 are provided along at least two mutually perpendicular edges 1002, though detector assemblies 1000 may be provided along all or most of edges 1002. Alternatively, a single detector assembly 1000 may be provided along only one edge 1002 of interactive surface element 1004. The detector assembly 1000 includes a linear arrangement 1008 of detector elements 1010. As distinct from the embodiments of FIGS. 9A-9D, the detector assembly 1000 does not comprise a support substrate onto which is mounted a linear arrangement of detector elements. In the embodiments of FIGS. 14A-14D, the support substrate of FIGS. 9A-9D is replaced by a portion of a peripheral housing 1012. Similarly to the embodiments of FIGS. 9A-9D there is provided a cover layer 1014 which provides multiple functions including physical protection, light intensity limitation and field-of-view limitation, and may have optical power. Alternatively, cover layer 1014 may be obviated.

The peripheral housing 1012 may be formed of any suitable material including, for example, ceramic material, a material such as FR-4 which is commonly used for PCBs, glass, plastic or a metal such as aluminum. The peripheral housing 1012 may also provide mounting for and electrical connections to the detector elements 1010. A processor 1016 for processing the outputs of the detector elements 1010 may also be mounted on the peripheral housing 1012. It is a particular feature of this embodiment of the present disclosure that the detector assembly 1000 is extremely thin, preferably under 1 mm overall. Accordingly, the linear arrangement 1008 of detector elements 1010 is preferably 100-400 microns in thickness and the cover layer 1014 is preferably 100-500 microns in thickness.

The input devices shown in FIG. 14A-14D may also include a source of light which is preferably external to the input device, for example, as shown in FIG. 19. In a preferred embodiment of the present disclosure, the external light source is an external IR light emitting stylus, such as stylus 322 of FIG. 2B. Suitable external light sources include sunlight, artificial room lighting and IR radiation emitted from a human body or other heat source.

In an alternate preferred embodiment, the source of light may comprise an illumination subassembly 1017 which typically includes one or more electromagnetic radiation emitting sources, here shown as multiple IR emitting LEDs 1018 mounted about interactive surface element 1004. As shown in FIGS. 14A-14D, interactive surface element is preferably associated with a display element 1019, such as an LCD display. Display element 1019 is preferably smaller in area than the interactive surface element 1004.

The illumination subassembly 1017 may be associated with interactive surface element 1004, as described above, or may be associated with another part of the interactive device, such as display element 1019. Examples of various suitable configurations of illumination subassembly 1017 associated with an interactive surface are described herein below in FIGS. 18A-18F, it being appreciated that such configurations may alternatively or additionally be associated with a display surface or any other suitable part of the device. Optionally, the light emitted by LEDs 1018 may be modulated by modulating circuitry (not shown).

It is a particular feature of the embodiment of FIGS. 14A-14D that interactive surface element 1004 has a first region, overlying display element 1019, having first user sensible functionality and a second region, extending beyond display element 1019, having second functionality, different from the first user sensible functionality.

It is a further particular feature of the embodiments of FIGS. 14A-14D that both the first and second functionalities employ a common detector assembly, such as detector assembly 1000, and may employ a common source of light, such as illumination subassembly 1017.

It is appreciated that output circuitry in the input devices shown in FIGS. 14A-14D may preferably utilize the calculated X, Y coordinate data to determine which region of which interactive element is being selected and thus actuate the user-desired function accordingly. It is appreciated that an interactive device, such as the devices described hereinabove with reference to FIGS. 1A-3B, may include one or more multi-region interactive surface elements, examples of which are illustrated in FIGS. 14A-14D, and other examples of which are described hereinabove and herein below with reference to any one or more of FIGS. 4-13D and 15A-17C. In the embodiment of FIG. 14A, cover layer 1014 is formed of glass or any other suitable light transparent material.

Reference is now made to FIG. 14B, in which it is seen that cover layer 1014 includes a field-of-view defining mask 1020 having apertures 1033 formed therein in sizes and arrangements which provide desired fields-of-view for the various corresponding detector elements 1010. Each detector element 1010 may have associated therewith a single aperture 1033, as shown, or a plurality of smaller apertures.

Field-of-view limiting functionality may be desirable in this context because it enhances resolution by limiting overlap between the fields-of-view of adjacent detector elements 1010. Extent of field-of-view limiting may be controlled by the size, pitch and arrangement of apertures 1033 and their locations with respect to and distances from detector elements 1010. In accordance with a preferred embodiment, the field-of-view limiting functionality limits the field-of-view of at least one of detector elements 1010 to a solid angle of less than or equal to 15 degrees. In accordance with another preferred embodiment, the field-of-view limiting functionality limits the field-of-view of at least one of detector elements 1010 to a solid angle of less than or equal to 7 degrees.

Reference is now made to FIG. 14C, which differs from that of FIG. 14B in that apertures 1033 in mask 1020 are replaced by light collimating tunnel-defining apertures 1040 in a mask 1042. Each detector element 1010 may have associated therewith a single tunnel-defining aperture 1040, as shown, or a plurality of smaller tunnel-defining apertures.

Field-of-view limiting functionality may be desirable in this context because it enhances resolution by limiting overlap between the fields-of-view of adjacent detector elements 1010. Extent of field-of-view limiting may be controlled by the size, pitch and arrangement of apertures 1040 and their locations with respect to and distances from detector elements 1010. In accordance with a preferred embodiment, the field-of-view limiting functionality limits the field-of-view of at least one of detector elements 1010 to a solid angle of less than or equal to 15 degrees. In accordance with another preferred embodiment, the field-of-view limiting functionality limits the field-of-view of at least one of detector elements 1010 to a solid angle of less than or equal to 7 degrees.

Reference is now made to FIG. 14D, which differs from that of FIGS. 14B and 14C in that the apertures in FIGS. 14B and 14C are replaced by lenses 1053. Lenses 1053 may be integrally formed with cover layer 1014 or may be discrete elements fitted within suitably sized and positioned apertures in cover layer 1014. Lenses 1053 may be associated with tunnel-defining apertures or may comprise an array of microlenses aligned with one or more of detector elements 1010.

Field-of-view limiting functionality may be desirable in this context because it enhances resolution by limiting overlap between the fields-of-view of adjacent detector elements 1010. Extent of field-of-view limiting may be controlled by the size, pitch and arrangement of lenses 1053 and their locations with respect to and distances from detector elements 1010. In accordance with a preferred embodiment, the field-of-view limiting functionality limits the field-of-view of at least one of detector elements 1010 to a solid angle of less than or equal to 15 degrees. In accordance with another preferred embodiment, the field-of-view limiting functionality limits the field-of-view of at least one of detector elements 1010 to a solid angle of less than or equal to 7 degrees.

Reference is now made to FIGS. 15A, 15B, 15C and 15D, which are simplified illustrations of four alternative embodiments of a portion of an input device constructed and operative in accordance with another preferred embodiment of the present disclosure, employing forward-facing detector elements arranged behind edges of a display element.

In the structure of FIGS. 15A-15D, at least one detector assembly 1060 is arranged behind at least one edge 1062 of an interactive surface element 1064, coinciding with a viewing plane, to sense light impinging onto detector assembly 1060 after propagating through interactive surface element 1064. Interactive surface element 1064 may be a single or multiple layer plate and may have one or more coating layers associated therewith. The light, preferably including light in the IR band, is emitted by a light beam emitter, such as light beam emitting stylus 180 in the embodiment of FIG. 1C or the light beam emitting remote control device 292 of FIG. 1F, or a light reflecting object, as in the embodiment of FIG. 1D. Preferably, detector assemblies 1060 are provided behind at least two mutually perpendicular edges 1062, though detector assemblies 1060 may be provided behind all or most of edges 1062. Alternatively, a single detector assembly 1060 may be provided behind only one of edges 1062.

The detector assembly 1060 includes a linear arrangement 1068 of detector elements 1070. As distinct from the embodiments of FIGS. 10A-10D, the detector assembly 1060 does not comprise a support substrate onto which is mounted a linear arrangement of detector elements. In the embodiments of FIGS. 15A-15D, the support substrate of FIGS. 10A-10D is replaced by a portion of a peripheral housing 1072. Similarly to the embodiments of FIGS. 10A-10D there is provided a cover layer 1074 which provides multiple functions including physical protection, light intensity limitation and field-of-view limitation, and may have optical power. Alternatively, cover layer 1074 may be obviated.

The peripheral housing 1072 may be formed of any suitable material including, for example, ceramic material, a material such as FR-4 which is commonly used for PCBs, glass, plastic or a metal such as aluminum. The peripheral housing 1072 may also provide mounting for and electrical connections to the detector elements 1070. A processor 1076 for processing the outputs of the detector elements 1070 may also be mounted on the peripheral housing 1072.

It is a particular feature of this embodiment of the present disclosure that the detector assembly 1060 is extremely thin, preferably under 1 mm overall. Accordingly, the linear arrangement 1068 of detector elements 1070 is preferably 100-400 microns in thickness and the cover layer 1074 is preferably 100-500 microns in thickness.

The input devices shown in FIG. 15A-15D may also include a source of light which is preferably external to the input device, for example, as shown in FIG. 19. In a preferred embodiment of the present disclosure, the external light source is an external IR light emitting stylus, such as stylus 322 of FIG. 2B. Suitable external light sources include sunlight, artificial room lighting and IR radiation emitted from a human body or other heat source.

In an alternate preferred embodiment, the source of light may comprise an illumination subassembly 1077 which typically includes one or more electromagnetic radiation emitting sources, here shown as multiple IR emitting LEDs 1078 mounted about interactive surface element 1064. As shown in FIGS. 15A-15D, interactive surface element 1064 is preferably associated with a display element 1079, such as an LCD display. Display element 1079 is preferably smaller in area than the interactive surface element 1064.

The illumination subassembly 1077 may be associated with interactive surface element 1064, as described above, or may be associated with another part of the interactive device, such as display element 1079. Examples of various suitable configurations of illumination subassembly 1077 associated with an interactive surface are described herein below in FIGS. 18A-18F, it being appreciated that such configurations may alternatively or additionally be associated with a display surface or any other suitable part of the device. Optionally, the light emitted by LEDs 1078 may be modulated by modulating circuitry (not shown).

It is a particular feature of the embodiments of FIGS. 15A-15D that interactive surface element 1064 has a first region, overlying display element 1079, having first user sensible functionality and a second region, extending beyond display element 1079, having second functionality, different from the first user sensible functionality.

It is a further particular feature of the embodiments of FIGS. 15A-15D that both the first and second functionalities employ a common detector assembly, such as detector assembly 1060, and may employ a common source of light, such as illumination subassembly 1077.

It is appreciated that output circuitry in the input devices shown in FIGS. 15A-15D may preferably utilize the calculated X, Y coordinate data to determine which region of which interactive element is being selected and thus actuate the user-desired function accordingly.

It is appreciated that an interactive device, such as the devices described hereinabove with reference to FIGS. 1A-3B, may include one or more multi-region interactive surface elements, examples of which are illustrated in FIGS. 15A-15D, and other examples of which are described hereinabove and herein below with reference to any one or more of FIGS. 4-14D and 16A-17C.

Figure 15A:
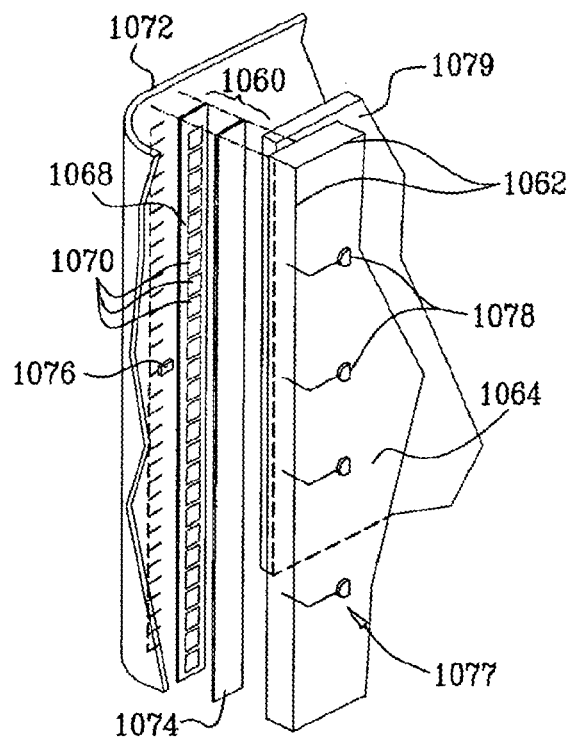
FIGS. 15A, 15B, 15C and 15D are simplified illustrations of four alternative embodiments of a portion of an input device constructed and operative in accordance with another preferred embodiment of the present disclosure, employing forward-facing detectors arranged behind edges of a display element.
Figure 15B:
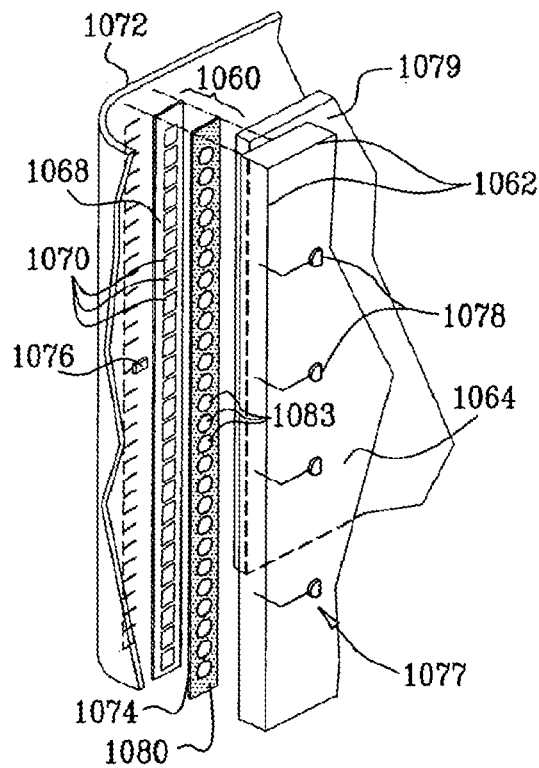
Figure 15C:
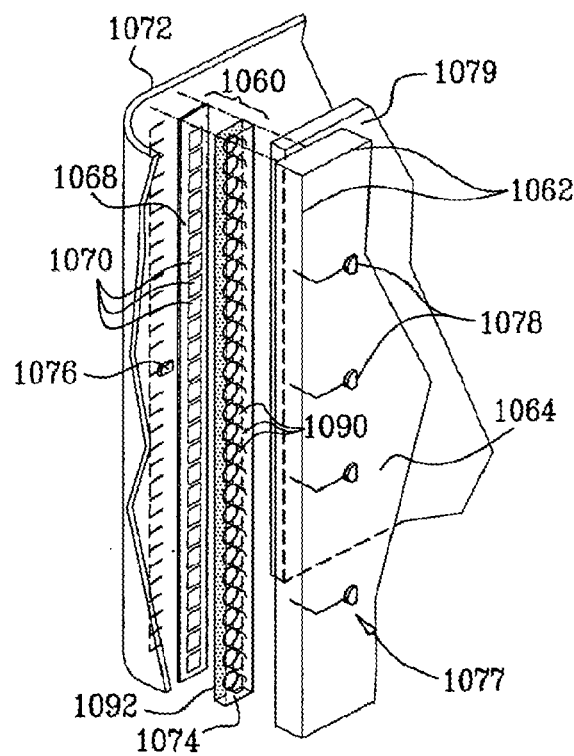

In the embodiment of FIG. 15A, cover layer 1074 is formed of glass or any other suitable light transparent material. Reference is now made to FIG. 15B, in which it is seen that cover layer 1074 includes a field-of-view defining mask 1080 having apertures 1083 formed therein in sizes and arrangements which provide desired fields-of-view for the various corresponding detector elements 1070. Each detector element 1070 may have associated therewith a single aperture 1083, as shown, or a plurality of smaller apertures. Field-of-view limiting functionality may be desirable in this context because it enhances resolution by limiting overlap between the fields-of-view of adjacent detector elements 1070. Extent of field-of-view limiting may be controlled by the size, pitch and arrangement of apertures 1083 and their locations with respect to and distances from detector elements 1070. In accordance with a preferred embodiment, the field-of-view limiting functionality limits the field-of-view of at least one of detector elements 1070 to a solid angle of less than or equal to 15 degrees. In accordance with another preferred embodiment, the field-of-view limiting functionality limits the field-of-view of at least one of detector elements 1070 to a solid angle of less than or equal to 7 degrees. Reference is now made to FIG. 15C, which differs from that of FIG. 15B in that apertures 1083 in mask 1080 are replaced by light collimating tunnel-defining apertures 1090 in a mask 1092.

Each detector element 1070 may have associated therewith a single tunnel-defining aperture 1090, as shown, or a plurality of smaller tunnel-defining apertures.

Field-of-view limiting functionality may be desirable in this context because it enhances resolution by limiting overlap between the fields-of-view of adjacent detector elements 1070. Extent of field-of-view limiting may be controlled by the size, pitch and arrangement of apertures 1090 and their locations with respect to and distances from detector elements 1070. In accordance with a preferred embodiment, the field-of-view limiting functionality limits the field-of-view of at least one of detector elements 1070 to a solid angle of less than or equal to 15 degrees. In accordance with another preferred embodiment, the field-of-view limiting functionality limits the field-of-view of at least one of detector elements 1070 to a solid angle of less than or equal to 7 degrees.

Figure 15D:
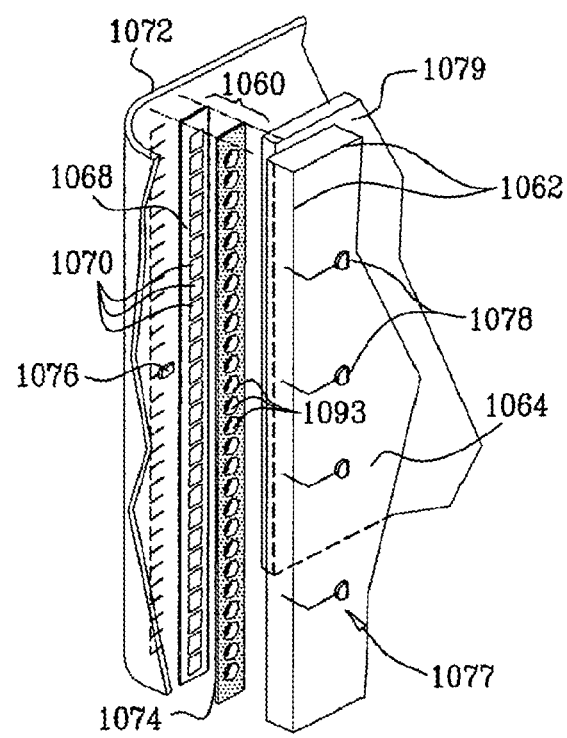

Reference is now made to FIG. 15D, which differs from that of FIGS. 15B and 15C in that the apertures in FIGS. 15B and 15C are replaced by lenses 1093. Lenses 1093 may be integrally formed with cover layer 1074 or may be discrete elements fitted within suitably sized and positioned apertures in cover layer 1074. Lenses 1093 may be associated with tunnel-defining apertures or may comprise an array of microlenses aligned with one or more of detector elements 1070. Field-of-view limiting functionality may be desirable in this context because it enhances resolution by limiting overlap between the fields-of-view of adjacent detector elements 1070. Extent of field-of-view limiting may be controlled by the size, pitch and arrangement of lenses 1093 and their locations with respect to and distances from detector elements 1070. In accordance with a preferred embodiment, the field-of-view limiting functionality limits the field-of-view of at least one of detector elements 1070 to a solid angle of less than or equal to 15 degrees. In accordance with another preferred embodiment, the field-of-view limiting functionality limits the field-of-view of at least one of detector elements 1070 to a solid angle of less than or equal to 7 degrees. Reference is now made to FIGS. 16A, 16B, 16C and 16D, which are simplified illustrations of four alternative embodiments of a portion of an input device constructed and operative in accordance with yet another preferred embodiment of the present disclosure, employing forward-facing detector elements arranged behind edges of a display element. In the structure of FIGS. 16A-16D, at least one detector assembly 1100 is arranged behind at least one edge 1102 of an interactive surface element 1104, coinciding with a viewing plane, to sense light impinging on interactive surface element 1104 and propagating within interactive surface element 1104 to the edges 1102 thereof. Interactive surface element 1104 may be a single or multiple layer interactive surface element and may have one or more coating layers associated therewith. Preferably, detector assemblies 1100 are provided behind at least two mutually perpendicular edges 1102, though detector assemblies 1100 may be provided behind all or most of edges 1102. Alternatively, a single detector assembly 1100 may be provided behind interactive surface element 1104 at only one edge thereof.

The detector assembly 1100 includes a linear arrangement 1108 of detector elements 1110. As distinct from the embodiments of FIGS. 15A-15D, in the embodiments of FIGS. 16A-16D, the cover layer is obviated and its functionality is provided by suitable conditioning of edge 1102 of interactive surface element 1104. This functionality may provide multiple functions including physical protection, light intensity limitation and field-of-view limitation, and may have optical power.

As in the embodiment of FIGS. 15A-15D, detector assembly 1100 does not comprise a support substrate onto which is mounted a linear arrangement of detector elements. In the embodiments of FIGS. 16A-16D, the support substrate of FIGS. 11A-11D is replaced by a portion of a peripheral housing 1112.

The peripheral housing 1112 may be formed of any suitable material including, for example, ceramic material, a material such as FR-4 which is commonly used for PCBs, glass, plastic or a metal such as aluminum. The peripheral housing 1112 may also provide mounting for and electrical connections to the detector elements 1110. A processor 1116 for processing the outputs of the detector elements 1110 may also be mounted on the peripheral housing 1112.

It is a particular feature of this embodiment of the present disclosure that the detector assembly 1100 is extremely thin, preferably under 1 mm overall. Accordingly, the linear arrangement 1108 of detector elements 1110 is preferably 100-400 microns in thickness.

The input devices shown in FIG. 16A-16D may also include a source of light which is preferably external to the input device, for example, as shown in FIG. 19. In a preferred embodiment of the present disclosure, the external light source is an external IR light emitting stylus, such as stylus 322 of FIG. 2B. Suitable external light sources include sunlight, artificial room lighting and IR radiation emitted from a human body or other heat source.

In an alternate preferred embodiment, the source of light may comprise an illumination subassembly 1117 which typically includes one or more electromagnetic radiation emitting sources, here shown as multiple IR emitting LEDs 1118 mounted about interactive surface element 1104. As shown in FIGS. 16A-16D, interactive surface element 1104 is preferably associated with a display element 1119, such as an LCD display. Display element 1119 is preferably smaller in area than the interactive surface element 1104. The illumination subassembly 1117 may be associated with the interactive surface element 1104, as described above, or may be associated with another part of the interactive device, such as display element 1119. Examples of various suitable configurations of illumination subassembly 1117 associated with an interactive surface are described herein below in FIGS. 18A-18F, it being appreciated that such configurations may alternatively or additionally be associated with a display surface or any other suitable part of the device. Optionally, the light emitted by LEDs 1118 may be modulated by modulating circuitry (not shown).

It is a particular feature of the embodiment of FIGS. 16A-16D that interactive surface element 1104 has a first region, overlying display element 1119, having first user sensible functionality and a second region, extending beyond display element 1119, having second functionality, different from the first user sensible functionality.

It is a further particular feature of the embodiments of FIGS. 16A-16D that both the first and second functionalities employ a common detector assembly, such as detector assembly 1100, and may employ a common source of light, such as illumination subassembly 1117.

It is appreciated that output circuitry in the input devices shown in FIGS. 16A-16D may preferably utilize the calculated X, Y coordinate data to determine which region of which interactive element is being selected and thus actuate the user-desired function accordingly.

It is appreciated that an interactive device, such as the devices described hereinabove with reference to FIGS. 1A-3B, may include one or more multi-region interactive surface elements, examples of which are illustrated in FIGS. 16A-16D, and other examples of which are described hereinabove and herein below with reference to any one or more of FIGS. 4-15D and 17A-17C.

Figure 16A:
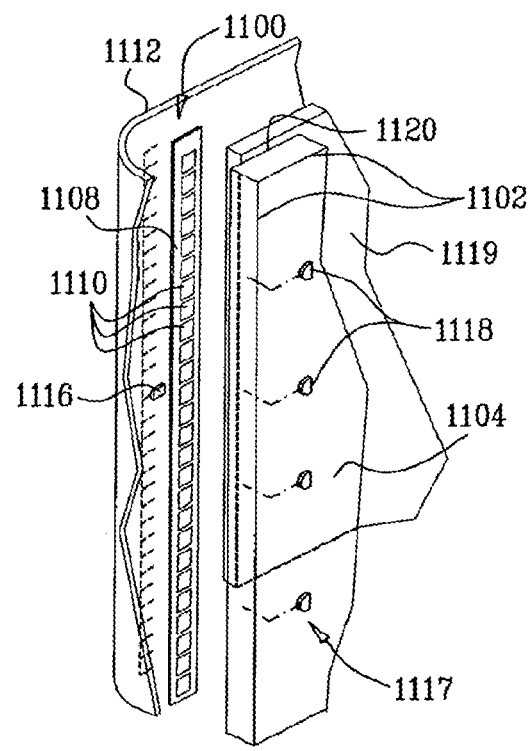
FIGS. 16A, 16B, 16C and 16D are simplified illustrations of four alternative embodiments of a portion of an input device constructed and operative in accordance with yet another preferred embodiment of the present disclosure, employing forward-facing detectors arranged behind edges of a display element.

In the embodiment of FIG. 16A, a rearward facing surface 1120 of interactive surface element 1104 at the edge 1102 lying in front of the linear arrangement 1108 is uniformly polished for unimpeded light transmission therethrough to linear arrangement 1108 of detector elements 1110.

Figure 16B:
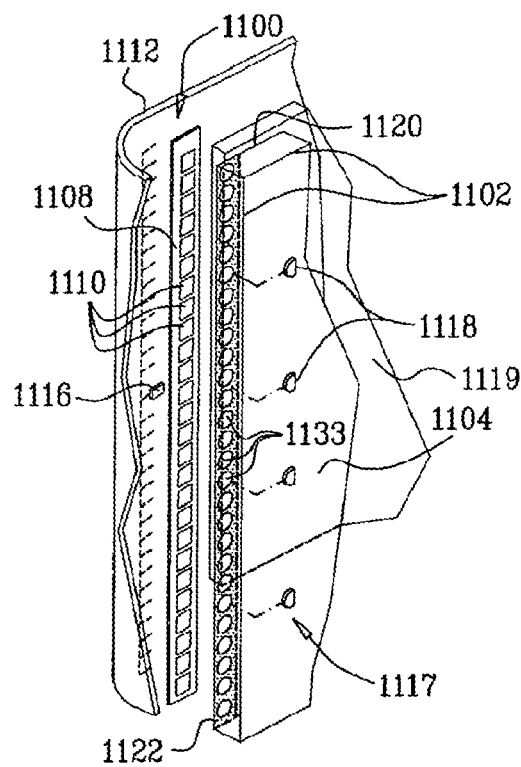
Figure 16C:
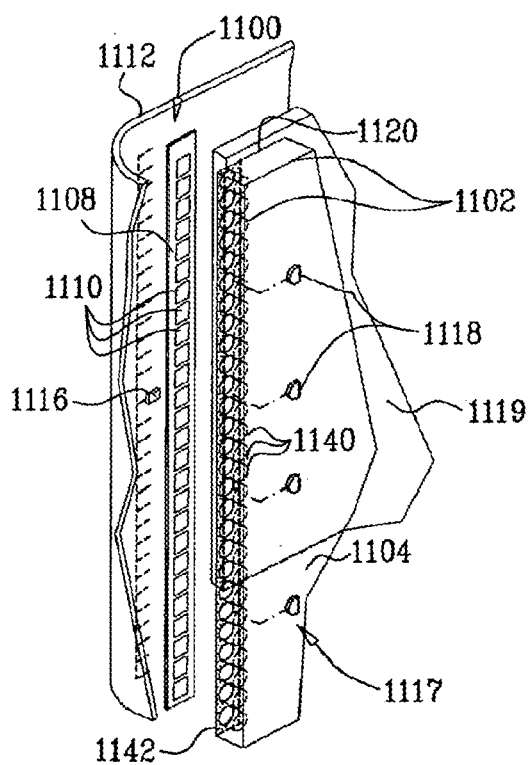

Reference is now made to FIG. 16B, in which it is seen that the rearward facing surface 1120 of interactive surface element 1104 at the edge 1102 lying in front of the linear arrangement 1108 is conditioned to define a field-of-view defining mask 1122 having apertures 1133 formed therein in sizes and arrangements which provide desired fields-of-view for the various corresponding detector elements 1110. Each detector element 1110 may have associated therewith a single aperture 1133, as shown, or a plurality of smaller apertures. Field-of-view limiting functionality may be desirable in this context because it enhances resolution by limiting overlap between the fields-of-view of adjacent detector elements 1110. Extent of field-of-view limiting may be controlled by the size, pitch and arrangement of apertures 1133 and their locations with respect to and distances from detector elements 1110. In accordance with a preferred embodiment, the field-of-view limiting functionality limits the field-of-view of at least one of detector elements 1110 to a solid angle of less than or equal to 15 degrees, in accordance with another preferred embodiment, the field-of-view limiting functionality limits the field-of-view of at least one of detector elements 1110 to a solid angle of less than or equal to 7 degrees. Reference is now made to FIG. 16C, which differs from that of FIG. 16B in that apertures 1133 in mask 1122 are replaced by light collimating tunnel-defining apertures 1140 in a mask 1142.

Each detector element 1110 may have associated therewith a single tunnel-defining aperture 1140, as shown, or a plurality of smaller tunnel-defining apertures.

Field-of-view limiting functionality may be desirable in this context because it enhances resolution by limiting overlap between the fields-of-view of adjacent detector elements 1110. Extent of field-of-view limiting may be controlled by the size, pitch and arrangement of apertures 1140 and their locations with respect to and distances from detector elements 1110. In accordance with a preferred embodiment, the field-of-view limiting functionality limits the field-of-view of at least one of detector elements 1110 to a solid angle of less than or equal to 15 degrees. In accordance with another preferred embodiment, the field-of-view limiting functionality limits the field-of-view of at least one of detector elements 1110 to a solid angle of less than or equal to 7 degrees.

Figure 16D:
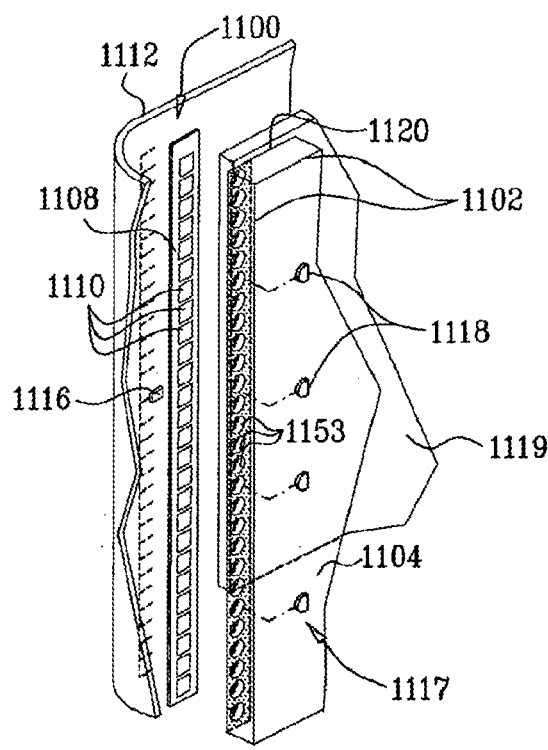
Figure 17A:
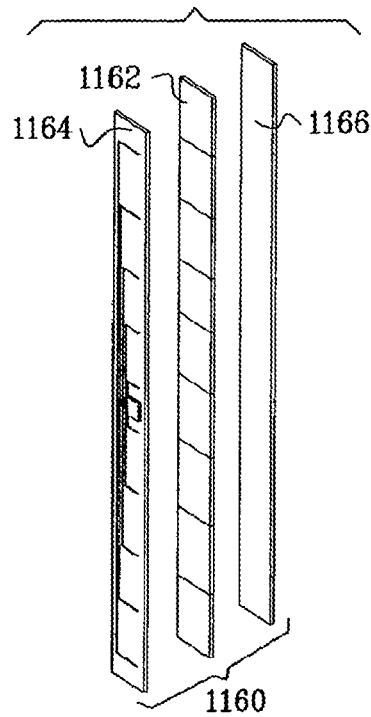
FIGS. 17A, 17B and 17C are simplified illustrations of three alternative embodiments of a detector assembly forming part of an interactive assembly constructed and operative in accordance with a preferred embodiment of the present disclosure.
Figure 17B:
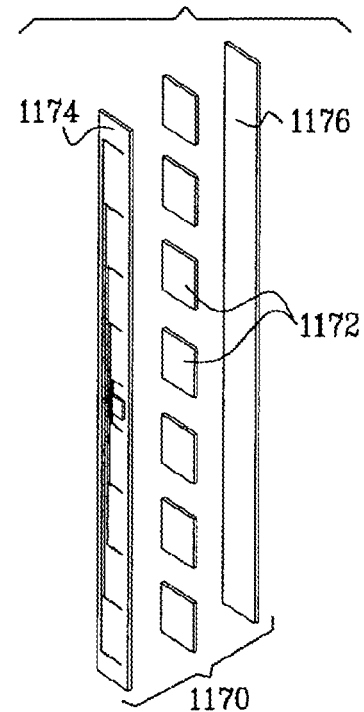
Figure 17C:
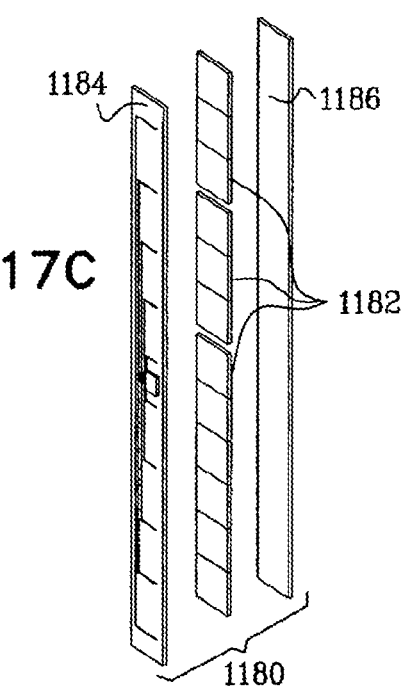

Reference is now made to FIG. 16D, which differs from that of FIGS. 16B and 16C in that the apertures in FIGS. 16B and 16C are replaced by lenses 1153. Lenses 1153 may be integrally formed at edges 1102 or may be discrete elements fitted within suitably sized and positioned apertures in interactive surface element 1104. Lenses 1153 may be associated with tunnel-defining apertures or may comprise an array of microlenses aligned with one or more of detector elements 1110. Field-of-view limiting functionality may be desirable in this context because it enhances resolution by limiting overlap between the fields-of-view of adjacent detector elements 1110. Extent of field-of-view limiting may be controlled by the size, pitch and arrangement of lenses 1153 and their locations with respect to and distances from detector elements 1110. In accordance with a preferred embodiment, the field-of-view limiting functionality limits the field-of-view of at least one of detector elements 1110 to a solid angle of less than or equal to 15 degrees. In accordance with another preferred embodiment, the field-of-view limiting functionality limits the field-of-view of at least one of detector elements 1110 to a solid angle of less than or equal to 7 degrees. Reference is now made to FIGS. 17A, 17B and 17C, which are simplified illustration of three alternative embodiments of a detector assembly forming part of an interactive assembly constructed and operative in accordance with a preferred embodiment of the present disclosure.

In the structure of FIGS. 17A-17C, at least one detector assembly is arranged about at least one edge (not shown) of an interactive surface element coinciding with a viewing plane (not shown). The detector assemblies of FIGS. 17A-17C may be employed in any of the embodiments of the present disclosure described hereinabove and illustrated in FIGS. 1A-16D. Preferably, detector assemblies are provided along at least two mutually perpendicular edges of the plate, though detector assemblies may be provided along all or most of the edges. Alternatively, a single detector assembly may be provided along only one edge of the plate. In accordance with a preferred embodiment of the present disclosure, the detector assembly comprises a support substrate onto which is mounted a linear arrangement of detector elements. Preferably, a cover layer is placed over the arrangement of detector elements and may provide multiple functions including physical protection, light intensity limitation and field-of-view limitation, and may have optical power. Alternatively, the cover layer may be obviated.

The support substrate may be mounted onto a display housing (not shown) or may be integrally formed therewith. The support substrate may alternatively be mounted onto an edge of the plate. The support substrate may be formed of a ceramic material, a material such as FR-4 which is commonly used for PCBs, glass, plastic or a metal such as aluminum. The support substrate may also provide mounting for and electrical connections to the detector elements. A processor for processing the outputs of the detector elements may also be mounted on the support substrate.

It is a particular feature of this embodiment of the present disclosure that the detector assembly is extremely thin, preferably under 1 mm overall. Accordingly, the support substrate is preferably 50-200 microns in thickness and the linear arrangement of detector elements is preferably 100-400 microns in thickness and the cover layer is preferably 100-500 microns in thickness.

In the embodiment of FIG. 17A, the detector assembly, here designated by reference numeral 1160, includes an integrally formed multi-element detector array 1162. The detector array 1162 is preferably mounted onto a support substrate 1164 and overlaid with a cover layer 1166.

In the embodiment of FIG. 17B, the detector assembly, here designated by reference numeral 1170, includes a plurality of discrete single-element detector elements 1172, such as Solderable Silicon Photodiodes commercially available from Advanced Photonix Incorporated of Camarillo, CA, USA under catalog designator PDB-C601-1. The discrete detector elements 1172 are preferably mounted onto a support substrate 1174 and overlaid with a cover layer 1176. In the embodiment of FIG. 17C, the detector assembly, here designated by reference numeral 1180, includes a plurality of discrete multi-element detector elements 1182. The discrete multi-element detector elements 1182 need not be all of the same size and are preferably all mounted onto a support substrate 1184 and overlaid with a cover layer 1186.

Reference is now made to FIGS. 18A, 18B, 18C, 18D, 18E and 18F, which are simplified illustrations of six alternative embodiments of an illumination subassembly forming part of an interactive assembly constructed and operative in accordance with preferred embodiments of the present disclosure. Alternatively or additionally, a touch responsive input functionality and/or a propinquity responsive input functionality and/or a distance responsive functionality may preferably be operative to detect the position of a stylus (not shown) or any other suitable reflective object.

FIGS. 18A-18F show an interactive assembly having touch responsive input functionality, which is useful for application selection and operation, such as email communication and Internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

FIGS. 18A-18F illustrate object detection functionality of the type described hereinabove with reference to FIGS. 1A to 1F. As shown, a position of a user's finger is detected by means of a touch responsive input functionality operative in accordance with preferred embodiments of the present disclosure. Turning specifically to FIG. 18A, it is seen that arrays 1202 of light detector elements 1204 are arranged at least two mutually perpendicular edges 1206 of an interactive surface element 1208, preferably associated with a display element 1209, such as an LCD display. Interactive surface element 1208 may wholly or partially coincide with a viewing plane which overlies display element 1209. Display element 1209 is preferably smaller in area than the interactive surface element 1208.

Alternatively, detector arrays 1202 may be provided along all or most of the edges 1206. As a further alternative, a single detector array 1202 may be provided along only one edge 1206 of the interactive surface element 1208. Interactive surface element 1208 may be a single or multiple layer plate and may have one or more coating layers associated therewith.

It is appreciated that the phrase "at edges" is to be interpreted broadly as including structures which are located behind edges, as in the embodiments shown in FIGS. 10A-10D, 11A-11D, 15A-15D and 16A-16D, about edges as in the embodiments shown in FIGS. 9A-9D and 14A-14D, and along edges as in the embodiments shown in FIGS. 4-7, 8A-8D, 12A-12D and 13A-13D.

Suitable detector elements are, for example, Solderable Silicon Photodiodes commercially available from Advanced Photonix Incorporated of Camarillo, CA, USA under catalog designator PDB-C601-1.

The interactive assembly shown in FIG. 18A preferably includes an illumination subassembly 1212 which typically includes one or more electromagnetic radiation emitting sources. The illumination subassembly 1212 may provide a baseline illumination level which is typically detected by detector elements 1204. The structure and location of the illumination subassembly are preferably selected to provide a desired baseline illumination level or to minimize the baseline illumination level.

In accordance with a preferred embodiment of the present disclosure, shown in FIG. 18A, a single IR emitting LED 1216 is provided at or generally adjacent to an intersection of the mutually perpendicular edges 1206 along which detector elements 1204 are arranged. The LED 1216 is arranged such that light emitted therefrom is projected generally across the surface of interactive surface element 1208. It is appreciated that the light emitted by LED 1216 may be directed entirely or partially above or through the surface of interactive surface element 1208. The light emitted by LED 1216 may be directed generally parallel to the surface of interactive surface element 1208 or may be angled with respect thereto by up to typically 45 degrees. A suitable IR emitting LED is, for example, an IR-emitting SMD-LED commercially available from OSA Opto Light GmbH of Berlin, Germany under catalog designator OIS-210-X-T. It is appreciated that selection of a specific shape and size and orientation of LED 1216 may be affected by the specific placement of LED 1216 relative to detector arrays 1202 and the interaction between a light beam emitted from the LED 1216 and the various components of the interactive device, including the interactive surface element 1208, the detector elements 1204 and other layers of the interactive device. Optionally, the light emitted by LED 1216 may be modulated by modulating circuitry (not shown).

The illumination subassembly 1212 may be associated with the interactive surface element 1208 or may be associated with another part of the interactive device, such as display element 1209.

It is a particular feature of the embodiment of FIG. 18A that interactive surface element 1208 has a first region, overlying display element 1209, having first user sensible functionality and a second region, extending beyond display element 1209, having second functionality, different from the first user sensible functionality.

It is a further particular feature of the embodiment of FIG. 18A that both the first and second functionalities employ a common detector assembly and may employ a common source of light, such as illumination subassembly 1212.

Light, preferably including light in the IR band emitted by illumination subassembly 1212, is reflected from a user's finger, a stylus (not shown) or any other suitable reflective object, touching or located in propinquity to interactive surface element 1208. The reflected light is propagated within interactive surface element 1208 as by scattering and is detected by one or more of detector elements 1204. Alternatively or additionally, the reflected light is propagated above the surface of interactive surface element 1208 and is detected by one or more of detector elements 1204, which may extend slightly above edges 1206. Furthermore, additionally or alternatively, the reflected light may propagate or be transmitted through interactive surface element 1208 directly to one or more of detector elements 1204 without appreciable scattering and detected thereby. When the user's finger touches or is located in propinquity to interactive surface element 1208, the light reflected from the finger is detected by one or more of detector elements 1204, as described hereinabove, in addition to the baseline level of light detected by the detector elements 1204. Detector analyzing processing circuitry (not shown) preferably receives outputs of the detector elements 1204 on detector arrays 1202, digitally processes these outputs and determines whether the absolute amount of light detected by each of the detector elements 1204 or the change in the amount of light detected by each of the detector elements 1204 exceeds a predetermined threshold.

The amount of light detected by the individual detector elements 1204 on a given detector array 1202, as determined by the detector analyzing processing circuitry, is further processed to provide an array detection output which incorporates the outputs of individual detector elements of a given detector array 1202. The array detection output represents the relationship between intensity and position along a given dimension along which the array extends.

The array detection output includes information corresponding to the location of an impingement point of the user's finger relative to the given detector array 1202. Typically, the location of at least one detector element 1204, in which the amount of light measured or the change in the amount of light measured exceeds a predetermined threshold, corresponds to the location of the user's finger along an axis parallel to the given detector array 1202.

In the configuration shown in FIG. 18A, three-dimensional location determining circuitry (not shown) preferably calculates the two-dimensional position of the impingement point of the user's finger on or above interactive surface element 1208 by combining the array detection outputs of at least two detector arrays, typically arranged along at least two mutually perpendicular edges 1206 of interactive surface element 1208. Additionally, the three-dimensional location determining circuitry calculates the extent of proximity of the user's finger to the interactive surface element 1208. FIG. 18A shows the finger separated by a distance H from the surface of the interactive surface element 1208, in a hover state. Three-dimensional location determining circuitry is operative to distinguish between a finger touching the surface of interactive surface element 1208, a finger hovering thereover, as shown in FIG. 18A, and a situation wherein there is no detection of a finger in propinquity to the interactive surface element. This may be achieved, for example, by noting a clear difference in overall signal intensity produced by touch as opposed to hover. Another example is by noting a clear difference in the shape of the array detection output resulting from touch as opposed to hover, which difference is generally independent of the intensity level. A further example is by noting a clear difference in the width of the array detection output resulting from touch as opposed to hover, which difference is generally independent of the intensity level.

Reference is now made to FIG. 18B, which shows arrays 1222 of light detector elements 1224 arranged at least two mutually perpendicular edges 1226 of an interactive surface element 1228, preferably associated with a display element 1229, such as an LCD display. Interactive surface element 1228 may wholly or partially coincide with a viewing plane which overlies display element 1229. Display element 1229 is preferably smaller in area than the interactive surface element 1228.

Alternatively, detector arrays 1222 may be provided along all or most of the edges 1226. As a further alternative, a single detector array 1222 may be provided along only one edge 1226 of the interactive surface element 1228. Interactive surface element 1228 may be a single or multiple layer plate and may have one or more coating layers associated therewith.

It is appreciated that the phrase "at edges" is to be interpreted broadly as including structures which are located behind edges, as in the embodiments shown in FIGS. 10A-10D, 11A-11D, 15A-15D and 16A-16D, about edges as in the embodiments shown in FIGS. 9A-9D and 14A-14D, and along edges as in the embodiments shown in FIGS. 4-7, 8A-8D, 12A-12D and 13A-13D.

Suitable detector elements are, for example, Solderable Silicon Photodiodes commercially available from Advanced Photonix Incorporated of Camarillo, CA, USA under catalog designator PDB-C601-1. The interactive assembly shown in FIG. 18B preferably includes an illumination subassembly 1232 which typically includes one or more electromagnetic radiation emitting sources. The illumination subassembly 1232 may provide a baseline illumination level which is typically detected by detector elements 1224. The structure and location of the illumination subassembly are preferably selected to provide a desired baseline illumination level or to minimize the baseline illumination level.

In accordance with a preferred embodiment of the present disclosure, shown in FIG. 18B, a single IR emitting LED 1236 is provided at or generally adjacent to an intersection of mutually perpendicular edges 1226 along which detector elements 1224 are not arranged. The LED 1236 is arranged such that light emitted therefrom is projected generally across the surface of interactive surface element 1228. It is appreciated that the light emitted by LED 1236 may be directed entirely or partially above or through the surface of interactive surface element 1228. The light emitted by LED 1236 may be directed generally parallel to the surface of interactive surface element 1228 or may be angled with respect thereto by up to typically 45 degrees. A suitable IR emitting LED is, for example, an IR-emitting SMD-LED commercially available from OSA Opto Light GmbH of Berlin, Germany under catalog designator OIS-210-X-T. It is appreciated that selection of a specific shape and size of LED 1236 may be affected by the specific placement of LED 1236 relative to detector arrays 1222 and the interaction between a light beam emitted from the LED 1236 and the various components of the interactive device, including the interactive surface element 1228, the detector elements 1224 and other layers of the interactive device. Optionally, the light emitted by LED 1236 may be modulated by modulating circuitry (not shown).

Light, preferably including light in the IR band emitted by illumination subassembly 1232, may be propagated generally across the surface of interactive surface element 1228 and a reflected portion thereof may be detected by one or more of detector elements 1224. Alternatively or additionally, the light may be propagated above the surface of interactive surface element 1228 and a reflected portion thereof may be detected by one or more of detector elements 1224, which may optionally extend slightly above edges 1226. Furthermore, additionally or alternatively, the reflected light may propagate or be transmitted through interactive surface element 1228 directly to one or more of detector elements 1224 and detected thereby. The light is reflected by a user's finger, a stylus (not shown) or any other suitable object, touching or located in propinquity to interactive surface element 1228. When the user's finger touches or is located in propinquity to interactive surface element 1228, the amount of light detected by one or more of detector elements 1224 is typically changed relative to the baseline level of light detected by the detector elements 1224. Detector analyzing processing circuitry (not shown) preferably receives outputs of the detector elements 1224 on detector arrays 1222, digitally processes these outputs and determines whether the absolute amount of light detected by each of the detector elements 1224 is below a predetermined threshold, or whether the change in the amount of light detected by each of the detector elements 1224 exceeds a predetermined threshold.

The amount of light detected by the individual detector elements 1224 on a given detector array 1222, as determined by the detector analyzing processing circuitry, is further processed to provide an array detection output. The array detection output includes information corresponding to the location of an impingement point of the user's finger relative to the given detector array 1222. Typically, the location of at least one detector element 1224, in which the amount of light measured is below a predetermined threshold or the change in the amount of light measured exceeds a predetermined threshold, corresponds to the location of the user's finger along an axis parallel to the given detector array 1222.

In the configuration shown in FIG. 18B, two-dimensional location determining circuitry (not shown) preferably calculates the two-dimensional position of the impingement point of the user's finger on or above interactive surface element 1228 by combining the array detection outputs of at least two detector arrays, typically arranged along at least two mutually perpendicular edges 1226 of interactive surface element 1228.

The illumination subassembly 1232 may be associated with the interactive surface element 1228 or may be associated with another part of the interactive device, such as display element 1229.

It is a particular feature of the embodiment of FIG. 18B that interactive surface element 1228 has a first region, overlying display element 1229, having first user sensible functionality and a second region, extending beyond display element 1229, having second functionality, different from the first user sensible functionality.

It is a further particular feature of the embodiment of FIG. 18B that both the first and second functionalities employ a common detector assembly and may employ a common source of light, such as illumination subassembly 1232.

Reference is now made to FIG. 18C, which shows an array 1242 of detector elements 1244 arranged in a plane, parallel to a viewing plane 1246. As seen in FIG. 18C, in one example of a display and input device structure, detector array 1242 is arranged at least partially behind an IR transmissive display panel 1248, such as a panel including LCD or OLED elements, underlying an interactive surface element 1250. It is appreciated that the interactive surface element 1250 may extend beyond the extent of the display panel 1248. In accordance with a preferred embodiment of the present disclosure, the array 1242 is formed of a plurality of discrete detector elements 1244 placed on a plane integrally formed therewith so as to preferably sense light impinging at regions of interactive surface element 1250 both overlying and not overlying the display panel 1248. Alternatively, the array 1242 may be formed of one or more CCD or CMOS arrays, or may be created by photolithography.

Interactive surface element 1250 may be a single or multiple layer plate and may have one or more coating layers associated therewith. In one example of an integrated display and input system employing an LCD, there are provided one or more light diffusing layers 1252 overlying a reflector 1254. One or more collimating layers 1256 are typically interposed between reflector 1254 and IR transmissive display panel 1248. The interactive assembly shown in FIG. 18C preferably includes an illumination subassembly 1262 which typically includes one or more electromagnetic radiation emitting sources. The illumination subassembly 1262 preferably provides a baseline illumination level which is typically detected by detector elements 1244.

In accordance with a preferred embodiment of the present disclosure, shown in FIG. 18C, illumination subassembly 1262 includes a generally linear arrangement of multiple IR emitting LEDs 1266, in parallel with one or more of edges 1268 of the interactive device. The LEDs 1266 are arranged such that light emitted therefrom is projected generally across the surface of interactive surface element 1208. Suitable IR emitting LEDs are, for example, IR-emitting SMD-LEDs commercially available from OSA Opto Light GmbH of Berlin, Germany under catalog designator OIS-210-X-T. It is appreciated that selection of a specific shapes and sizes of LEDs 1266 may be affected by the specific placement of the LEDs 1266 relative to array 1242 and the interaction between light beams emitted from the LEDs 1266 and the various components of the interactive device, including the interactive surface element 1250, the detector elements 1244, the diffusing layers 1252, collimating layers 1256, reflecting layers 1254 and other layers of the interactive device. Optionally, the light emitted by LEDs 1266 may be modulated by modulating circuitry (not shown).

It is a particular feature of the embodiment of FIG. 18C that interactive surface element 1250 has a first region, overlying display element 1248, having first user sensible functionality and a second region, extending beyond display element 1248, having second functionality, different from the first user sensible functionality.

It is a further particular feature of the embodiment of FIG. 18C that both the first and second functionalities may employ a common detector assembly and may employ a common source of light, such as illumination subassembly 1262. Alternatively different detector assemblies may be provided for the first and second regions. Light, preferably including light in the IR band emitted by illumination subassembly 1262, is reflected from a user's finger, a stylus (not shown) or any other suitable reflective object, touching or located in propinquity to interactive surface element 1250. The reflected light is propagated through interactive surface element 1250 and is detected by one or more of detector elements 1244. When the user's finger touches or is located in propinquity to interactive surface element 1250, the light reflected from the finger is detected by one or more of detector elements 1244, as described hereinabove, in addition to the baseline level of light detected by the detector elements 1244. Detector analyzing processing circuitry (not shown) preferably receives outputs of the detector elements 1244 on detector array 1242, digitally processes these outputs and determines whether the absolute amount of light detected by each of the detector elements 1244 or the change in the amount of light detected by each of the detector elements 1244 exceeds a predetermined threshold.

The amount of light detected by the individual detector elements 1244 as determined by the detector analyzing processing circuitry, is further processed to provide an array detection output. The array detection output includes information corresponding to the location of an impingement point of the user's finger relative to array 1242. Typically, the location of at least one detector element 1244, in which the amount of light measured or the change in the amount of light measured exceeds a predetermined threshold, corresponds to the two-dimensional location of the user's finger in a plane parallel to array 1242. In the configuration shown in FIG. 18C, optional three-dimensional location determining circuitry (not shown) may be provided to calculate the three-dimensional (X, Y, Z and/or angular orientation) position of the impingement point of the user's finger on or above interactive surface element 1250 by processing the detector element outputs of at least two detector elements to define the shape and size of an impingement area, as described in assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

Reference is now made FIG. 18D, which shows arrays 1272 of light detector elements 1274 arranged at least two mutually perpendicular edges 1276 of an interactive surface element 1278. Alternatively, detector arrays 1272 may be provided along all or most of the edges 1276. As a further alternative, a single detector array 1272 may be provided along only one edge 1276 of the interactive surface element 1278. Interactive surface element 1278 may be a single or multiple layer plate and may have one or more coating layers associated therewith. Optionally, one or more of detector arrays 1272 may be arranged such that the detector elements 1274 thereof extend slightly above the surface of interactive surface element 1278.

It is appreciated that the phrase "at edges" is to be interpreted broadly as including structures which are located behind edges, as in the embodiments shown in FIGS. 10A-10D, 11A-11D, 15A-15D and 16A-16D, about edges as in the embodiments shown in FIGS. 9A-9D and 14A-14D, and along edges as in the embodiments shown in FIGS. 4-7, 8A-8D, 12A-12D and 13A-13D.

Suitable detector elements are, for example, Solderable Silicon Photodiodes commercially available from Advanced Photonix Incorporated of Camarillo, CA, USA under catalog designator PDB-C601-1. The interactive assembly shown in FIG. 18D preferably includes an illumination subassembly 1282 which typically includes one or more electromagnetic radiation emitting sources. The illumination subassembly 1282 preferably provides a baseline illumination level which is typically detected by detector elements 1274.

In accordance with a preferred embodiment of the present disclosure, shown in FIG. 18D, illumination subassembly 1282 includes one or more ER emitting LEDs 1286, generally adjacent to, or interspersed among, a linear arrangement of display backlight LEDs (not shown), typically provided underlying and aligned with edges of a plane of an IR transmissive display panel 1288, such as an LCD or OLED, which partially underlies and is generally parallel to interactive surface element 1278. A suitable ER emitting LED is, for example, an SMD type ER GaAs LED commercially available from Marubeni America Corporation of Santa Clara, CA, USA under catalog designator SMC940. It is appreciated that selection of a specific shapes and sizes of LEDs 1286 may be affected by the specific placement of LEDs 1286 relative to detector arrays 1272 and the interaction between light beams emitted from the LEDs 1286, light beams emitted from other backlight LEDs, and the various components of the interactive device, including backlight LEDs, the interactive surface element 1278, the detector elements 1274 and other layers of the interactive device. Optionally, the light emitted by LED 1286 may be modulated by modulating circuitry (not shown).

It is a particular feature of the embodiment of FIG. 18D that interactive surface element 1278 has a first region, overlying display panel 1288, having first user sensible functionality and a second region, extending beyond display panel 1288, having second functionality, different from the first user sensible functionality.

It is a further particular feature of the embodiment of FIG. 18D that both the first and second functionalities may employ a common detector assembly and may employ a common source of light, such as illumination subassembly 1282. Alternatively, different detector assemblies may be provided for the first and second regions.

In one preferred embodiment of the present disclosure, the detector elements 1274 are operative to detect visible wavelengths of light emitted from visible light-emitting backlight LEDs. In another preferred embodiment of the present disclosure, backlight LEDs are selected to provide both IR and visible light wavelength emissions. In a further alternative embodiment of the present disclosure, two different sets of LEDs may be provided for different wavelengths.

The IR emitting LEDs 1286 are arranged such that light emitted therefrom is projected generally through one or more diffusing and/or collimating layers 1290 typically underlying the IR transmissive display panel 1288. The IR emitting LEDs 1286 may additionally or alternatively be arranged such that light emitted therefrom is reflected by one or more reflecting layers 1292, underlying and generally parallel to the plane of the IR transmissive display panel 1288. Typically, both diffusing layers 1290 and reflecting layers 1292 are provided, to aid in propagating the backlight and IR light through the transmissive display panel 1288.

Light, preferably including light in the IR band emitted by illumination subassembly 1282, is reflected from a user's finger, a stylus (not shown) or any other suitable reflective object, touching or located in propinquity to interactive surface element 1278. The reflected light is propagated within interactive surface element 1278 and is detected by one or more of detector elements 1274. Alternatively or additionally, the reflected light is propagated above the surface of interactive surface element 1278 and is detected by one or more of detector elements 1274, which may extend slightly above edges 1276. Furthermore, additionally or alternatively, the reflected light may propagate or be transmitted through interactive surface element 1278 directly to one or more of detector elements 1274 and detected thereby.

When the user's finger touches or is located in propinquity to interactive surface element 1278, the light reflected from the finger is detected by one or more of detector elements 1274, as described hereinabove, in addition to the baseline level of light detected by the detector elements 1274. Detector analyzing processing circuitry (not shown) preferably receives outputs of the detector elements 1274 on detector arrays 1272, digitally processes these outputs and determines whether the absolute amount of light detected by each of the detector elements 1274 or the change in the amount of light detected by each of the detector elements 1274 exceeds a predetermined threshold.

The amount of light detected by the individual detector elements 1274 on a given detector array 1272, as determined by the detector analyzing processing circuitry, is further processed to provide an array detection output. The array detection output includes information corresponding to the location of an impingement point of the user's finger relative to the given detector array 1272. Typically, the location of at least one detector element 1274, in which the amount of light measured or the change in the amount of light measured exceeds a predetermined threshold, corresponds to the location of the user's finger along an axis parallel to detector array 1272. In the configuration shown in FIG. 18D, two-dimensional location determining circuitry (not shown) preferably calculates the two-dimensional position of the impingement point of the user's finger on or above interactive surface element 1278 by combining the array detection outputs of at least two arrays, typically arranged along at least two mutually perpendicular edges 1276 of interactive surface element 1278. Reference is now made to FIG. 18E, which shows a single array 1302 of light detector elements 1304 arranged at an edge 1306 of an interactive surface element 1308, preferably associated with a display element 1309, such as an LCD display.

Interactive surface element 1308 may wholly or partially coincide with a viewing plane which overlies display element 1309. Display element 1309 is preferably smaller in area than interactive surface element 1308. Interactive surface element 1308 may be a single or multiple layer interactive surface element and may have one or more coating layers associated therewith.

It is appreciated that the phrase "at an edge" is to be interpreted broadly as including structures which are located behind an edge, as in the embodiments shown in FIGS. 10A-10D, 11A-11D, 15A-15D and 16A-16D, about an edge as in the embodiments shown in FIGS. 9A-9D and 14A-14D, and along an edge as in the embodiments shown in FIGS. 4-7, 8A-8D, 12A-12D and 13A-13D.

Suitable detector elements are, for example, Solderable Silicon Photodiodes commercially available from Advanced Photonix Incorporated of Camarillo, CA, USA under catalog designator PDB-C601-1.

The interactive assembly shown in FIG. 18E preferably includes an illumination subassembly 1312 which typically includes one or more electromagnetic radiation emitting sources. The illumination subassembly 1312 preferably provides a baseline illumination level which is typically detected by detector elements 1304.

In accordance with a preferred embodiment of the present disclosure, shown in FIG. 18E, illumination subassembly 1312 includes a generally linear arrangement of multiple IR emitting LEDs 1316. The LEDs 1316 are arranged such that light emitted therefrom is projected generally across the surface of interactive surface element 1308. Illumination subassembly 1312 may be arranged in parallel to detector array 1302, at an edge perpendicular to detector array 1302, or may be arranged at an edge opposite or otherwise not adjacent or perpendicular to detector array 1302. Suitable IR emitting LEDs are, for example, the IR-emitting SMD-LEDs commercially available from OSA Opto Light GmbH of Berlin, Germany under catalog designator OIS-210-X-T. It is appreciated that selection of a specific shapes and sizes of LEDs 1316 may be affected by the specific placement of the illumination subassembly 1312 relative to detector array 1302 and the interaction between light beams emitted from the LEDs 1316 and the various components of the interactive device, including the interactive surface element 1308, the detector elements 1304 and other layers of the interactive device. Optionally, the light emitted by LEDs 1316 may be modulated by modulating circuitry (not shown).

Light, preferably including light in the IR band emitted by illumination subassembly 1312, is reflected from a user's finger, a stylus (not shown) or any other suitable reflective object, touching or located in propinquity to interactive surface element 1308. The reflected light is propagated within interactive surface element 1308 and is detected by one or more of detector elements 1304. Alternatively or additionally, the reflected light is propagated above the surface of interactive surface element 1308 and is detected by one or more of detector elements 1304, which may extend slightly above edge 1306. Furthermore, additionally or alternatively, the reflected light may propagate or be transmitted through interactive surface element 1308 directly to one or more of detector elements 1304 and detected thereby.

When the user's finger touches or is located in propinquity to interactive surface element 1308, the light reflected from the finger is detected by one or more of detector elements 1304, as described hereinabove, in addition to the baseline level of light detected by the detector elements 1304. Detector analyzing processing circuitry (not shown) preferably receives outputs of the detector elements 1304 on detector array 1302, digitally processes these outputs and determines whether the absolute amount of light detected by each of the detector elements 1304 or the change in the amount of light detected by each of the detector elements 1304 exceeds a predetermined threshold.

The amount of light detected by the individual detector elements 1304 on array 1302, as determined by the detector analyzing processing circuitry, is further processed to provide an array detection output. The array detection output includes information corresponding to the location of an impingement point of the user's finger relative to detector array 1302. Typically, the location of at least one detector element 1304, in which the amount of light measured or the change in the amount of light measured exceeds a predetermined threshold, corresponds to the location of the user's finger along an axis parallel to array 1302.

In the configuration shown in FIG. 18E, three-dimensional location determining circuitry (not shown) preferably calculates the two-dimensional position of the impingement point of the user's finger on or above interactive surface element 1308 by further utilizing the array detection output and the information corresponding to the location of the impingement point of the user's finger relative to the array included therein, as described herein below.

Whereas the location of at least one detector element 1304 on array 1302, in which the amount of light measured or the change in the amount of light measured exceeds a predetermined threshold, corresponds to the location of the user's finger along an axis parallel to array 1302, the strength of the signal output of that detector element 1304 decreases as the distance, designated by X in FIG. 18E, of the impingement point of the user's finger from array 1302 along an axis generally perpendicular to the axis of the array 1302 increases. Conversely, the strength of the signal output of the detector element 1304 increases as the distance of the impingement point of the user's finger from array 1302 along an axis generally perpendicular to the axis of the array 1302 decreases. These characteristics of the various components of the interactive assembly are employed by the two-dimensional location determining circuitry to calculate the two-dimensional position of the impingement point of the user's finger on the interactive surface element 1308 or above it.

Reference is now made to FIG. 18F, which shows an integrated display and input device having touch responsive input functionality. As seen in FIG. 18F, a multiplicity of light detector elements 1322 are interspersed among light emitters 1324 arranged in a plane 1326 underlying an interactive surface element 1328 coinciding with a viewing plane. Examples of such a structure are described in U.S. Pat. No. 7,034,866 and U.S. Patent Application Publication Nos. 2006/0132463A1, 2006/0007222A1 and 2004/00012565A1, the disclosures of which are hereby incorporated by reference.

Interactive surface element 1328 may be a single or multiple layer plate and may have one or more coating layers associated therewith. In one example of an integrated display and input system employing light detector elements interspersed among light emitting elements, there are provided one or more light diffusing layers 1330 overlying a reflector 1332. One or more collimating layers 1334 may be interposed between reflector 1332 and the plane 1326 which includes the light detector and light emitting elements.

The interactive assembly shown in FIG. 18F preferably includes an illumination subassembly 1342 which typically includes one or more electromagnetic radiation emitting sources. The illumination subassembly 1342 typically provides a baseline illumination level which is typically detected by detector elements 1322.

In accordance with a preferred embodiment of the present disclosure, shown in FIG. 18F, illumination subassembly 1324 includes a generally linear arrangement of multiple IR emitting LEDs 1346, generally in parallel with one or more of edges 1348 of interactive surface element 1328. The LEDs 1346 are arranged such that light emitted therefrom is projected generally across the surface of interactive surface element 1328. Suitable IR emitting LEDs are, for example, IR-emitting SMD-LEDs commercially available from OSA Opto Light GmbH of Berlin, Germany under catalog designator OIS-210-X-T. It is appreciated that selection of a specific shapes and sizes of LEDs 1346 may be affected by the specific placement of the LEDs 1346 relative to plane 1326 and the interaction between one or more light beams emitted from LEDs 1346 and the various components of the interactive assembly including the interactive surface element 1328, the detector elements 1322, diffusing layers 1330, collimating layers 1334, reflecting layers 1332 and other layers of the interactive device. Optionally, the light emitted by LEDs 1346 may be modulated by modulating circuitry (not shown).

It is a particular feature of the embodiment of FIG. 18F that interactive surface element 1328 has a first region, overlying plane 1326, having first user sensible functionality and a second region, extending beyond plane 1326, having second functionality, different from the first user sensible functionality.

It is a further particular feature of the embodiment of FIG. 18F that both the first and second functionalities may employ a common detector assembly and may employ a common source of light, such as illumination subassembly 1342. Alternatively, different detector assemblies may be provided for the first and second regions.

Light, preferably including light in the IR band emitted by illumination subassembly 1342, is reflected from a user's finger, a stylus (not shown) or any other suitable reflective object, touching or located in propinquity to interactive surface element 1328. The reflected light is propagated through interactive surface element 1328 and is detected by one or more of detector elements 1322.

When the user's finger touches or is located in propinquity to interactive surface element 1328, the light reflected from the finger is detected by one or more of detector elements 1322, in addition to the baseline level of light detected by the detector elements 1322. Detector analyzing processing circuitry preferably receives outputs of the detector elements 1322, digitally processes these outputs and determines whether the absolute amount of light detected by each of the detector elements 1322 or the change in the amount of light detected by each of the detector elements 1322 exceeds a predetermined threshold.

The amount of light detected by the individual detector elements 1322, as determined by the detector analyzing processing circuitry, is further processed to provide an array detection output. The array detection output includes information corresponding to the location of an impingement point of the user's finger. Typically, the location of at least one detector element 1322, in which the amount of light measured or the change in the amount of light measured exceeds a predetermined threshold, corresponds to the two-dimensional location of the user's finger on or above interactive surface element 1328 and parallel to plane 1326. In the configuration shown in FIG. 18F, optional three-dimensional location determining circuitry (not shown) may be provided to calculate the three-dimensional (X, Y, Z and/or angular orientation) position of the impingement point of the user's finger on or above interactive surface element 1328 by processing the detector element outputs of at least two detector elements to define the shape and size of an impingement area, as described in assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

It is appreciated that any of the configurations of the illumination subassemblies shown in the embodiments of FIGS. 18A-18F may be combined with any of the detector array configurations shown in FIGS. 1-17C.

Reference is now made to FIG. 19, which is a simplified illustration of an interactive assembly constructed and operative in accordance with a preferred embodiment of the present disclosure, utilizing electromagnetic radiation from a source external to the interactive device.

As seen in FIG. 19, arrays 1402 of light detector elements 1404 are arranged at least two mutually perpendicular edges 1406 of an interactive surface element 1408, preferably associated with a display element 1409, such as an LCD display. Alternatively, detector arrays 1402 may be provided along all or most of the edges 1406. As a further alternative, a single detector array 1402 may be provided along only one edge 1406 of the interactive surface element 1408.

Interactive surface element 1408 may be a single or multiple layer plate and may have one or more coating layers associated therewith.

It is a particular feature of the embodiment of FIG. 19 that interactive surface element 1408 has a first region, overlying display element 1409, having first user sensible functionality and a second region, extending beyond display element 1409, having second functionality, different from the first user sensible functionality.

It is a further particular feature of the embodiment of FIG. 19 that both the first and second functionalities may employ a common detector assembly and may employ a common source of light, such as an external or ambient light source. Alternatively, different detector assemblies may be provided for the first and second regions.

It is appreciated that the phrase "at edges" is to be interpreted broadly as including structures which are located behind edges, as in the embodiments shown in FIGS. 10A-10D, 11A-11D, 15A-15D and 16A-16D, about edges as in the embodiments shown in FIGS. 9A-9D and 14A-14D, and along edges as in the embodiments shown in FIGS. 4-7, 8A-8D, 12A-12D and 13A-13D.

Suitable detector elements are, for example, Solderable Silicon Photodiodes commercially available from Advanced Photonix Incorporated of Camarillo, CA, USA under catalog designator PDB-C601-1.

Light incident upon the viewing interactive surface element 1408, preferably including light in the IR band emitted by one or more sources of illumination external to the interactive device, is propagated within interactive surface element 1408 and is detected by one or more of detector elements 1404. Alternatively or additionally, the incident light is propagated above the surface of interactive surface element 1408 and is detected by one or more of detector elements 1404, which may extend slightly above edges 1406. Furthermore, additionally or alternatively, the incident light may propagate or be transmitted through interactive surface element 1408 directly to one or more of detector elements 1404 and detected thereby. The detection of incident light by detector elements 1404 defines a baseline illumination level therefor.

Light, preferably including light in the IR band emitted by one or more sources of illumination external to the interactive device, is reflected from a user's finger, a stylus (not shown) or any other suitable reflective object, touching or located in propinquity to interactive surface element 1408. The reflected light is propagated within interactive surface element 1408 and is detected by one or more of detector elements 1404. Alternatively or additionally, the reflected light is propagated above the surface of interactive surface element 1408 and is detected by one or more of detector elements 1404, which may extend slightly above edges 1406. Furthermore, additionally or alternatively, the reflected light may propagate or be transmitted through interactive surface element 1408 directly to one or more of detector elements 1404 and detected thereby. Suitable external light sources include sunlight, artificial room lighting and IR radiation emitted from a human body or other heat source. In an alternate preferred embodiment, the quantity or intensity of the reflected light may be augmented by the addition of an illumination subassembly (not shown) which typically includes one or more electromagnetic radiation emitting sources. Examples of various suitable configurations of an illumination subassembly are described hereinabove with reference to FIGS. 18A-18F.

When the user's finger touches or is located in propinquity to interactive surface element 1408, the light reflected from the finger is detected by one or more of detector elements 1404, as described hereinabove, in addition to the baseline level of light detected by the detector elements 1404. Detector analyzing processing circuitry (not shown) preferably receives outputs of the detector elements 1404 on arrays 1402, digitally processes these outputs and determines whether the absolute amount of light detected by each of the detector elements 1404 or the change in the amount of light detected by each of the detector elements 1404 exceeds a predetermined threshold. The amount of light detected by the individual detector elements 1404 on a given array 1402, as determined by the detector analyzing processing circuitry, is further processed to provide an array detection output. The array detection output includes information corresponding to the location of an impingement point of the user's finger relative to the given array 1402. Typically, the location of at least one detector element 1404, in which the amount of light measured or the change in the amount of light measured exceeds a predetermined threshold, corresponds to the location of the user's finger along an axis parallel to array 1402.

In the configuration shown in FIG. 19, two-dimensional location determining circuitry (not shown) preferably calculates the two-dimensional position of the impingement point of the user's finger on or above interactive surface element 1408 by combining the array detection outputs of at least two arrays, typically arranged along at least two mutually perpendicular edges 1406 of interactive surface element 1408.

Reference is now made to FIGS. 20A, 20B, 21A, 21B and 22, which are simplified illustrations of an alternative embodiment of an illumination subassembly forming part of an interactive assembly constructed and operative in accordance with another preferred embodiment of the present disclosure. Alternatively or additionally, a touch responsive input functionality and/or propinquity responsive input functionality may preferably be operative to detect the positions of one or more fingers, a stylus (not shown) or any other suitable reflective object.

FIGS. 20A-22 show an interactive assembly having touch responsive input functionality and/or propinquity responsive input functionality, which is useful for application selection and operation, such as email communication and Internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

FIGS. 20A-22 illustrate object detection functionality of the type described hereinabove with reference to FIGS. 1A to 1F. As shown, a position of a user's fingers is detected by means of a touch responsive input functionality and/or propinquity responsive input functionality operative in accordance with preferred embodiments of the present disclosure.

As seen in FIGS. 20A-22, it is seen that arrays 1502 of light detector elements 1504 are arranged at least two mutually perpendicular edges 1506 of an interactive surface element 1508, preferably associated with a display element 1509, such as an LCD display. Interactive surface element 1508 may wholly or partially coincide with a viewing plane which overlies display element 1509. Display element 1509 is preferably smaller in area than the interactive surface element 1508. Alternatively, detector arrays 1502 may be provided along all or most of the edges 1506. As a further alternative, a single detector array 1502 may be provided along only one edge 1506 of the interactive surface element 1508. Interactive surface element 1508 may be a single or multiple layer plate and may have one or more coating layers associated therewith. It is appreciated that the phrase "at edges" is to be interpreted broadly as including structures which are located behind edges, as in the embodiments shown in FIGS. 10A-10D, 11A-11D, 15A-15D and 16A-16D, about edges as in the embodiments shown in FIGS. 9A-9D and 14A-14D, and along edges as in the embodiments shown in FIGS. 4-7, 8A-8D, 12A-12D and 13A-13D. Suitable detector elements are, for example, Solderable Silicon Photodiodes commercially available from Advanced Photonix Incorporated of Camarillo, CA, USA under catalog designator PDB-C601-1.

The interactive assembly shown in FIGS. 20A-22 preferably includes an illumination subassembly 1512 which typically includes one or more electromagnetic radiation emitting sources. The illumination subassembly 1512 preferably provides a baseline illumination level which is typically detected by detector elements 1504.

In accordance with a preferred embodiment of the present disclosure, shown in FIGS. 20A-22, illumination subassembly includes a single IR emitting LED 1516 at or generally adjacent to an intersection of the mutually perpendicular edges 1506 along which detector elements 1514 are arranged. The LED 1516 is arranged such that light emitted therefrom is projected generally across the surface of interactive surface element 1508. A suitable IR emitting LED is, for example, an IR-emitting SMD-LED commercially available from OSA Opto Light GmbH of Berlin, Germany under catalog designator OIS-210-X-T. It is appreciated that selection of a specific shape and size of LED 1516 may be affected by the specific placement of LED 1516 relative to detector arrays 1502 and the interaction between a light beam emitted from the LED 1516 and the various components of the interactive device, including the interactive surface element 1508, the detector elements 1504 and other layers of the interactive device. Optionally, the light emitted by LED 1516 may be modulated by modulating circuitry (not shown).

It is a particular feature of the embodiment of FIGS. 20A-22 that interactive surface element 1508 has a first region, overlying display element 1509, having first user sensible functionality and a second region, extending beyond display element 1509, having second functionality, different from the first user sensible functionality.

It is a further particular feature of the embodiment of FIGS. 20A-22 that both the first and second functionalities may employ a common detector assembly and may employ a common source of light, such as illumination subassembly 1512. Alternatively, different detector assemblies may be provided for the first and second regions.

Light, preferably including light in the IR band emitted by illumination subassembly 1512, is reflected from a user's fingers, a stylus (not shown) or any other suitable reflective object, touching or located in propinquity to interactive surface element 1508. The reflected light is propagated within interactive surface element 1508 and is detected by one or more of detector elements 1504. Alternatively or additionally, the reflected light is propagated above the surface of interactive surface element 1508 and is detected by one or more of detector elements 1504, which may extend slightly above edges 1506. Furthermore, additionally or alternatively, the reflected light may propagate or be transmitted through interactive surface element 1508 directly to one or more of detector elements 1504 and detected thereby.

Figure 20A:
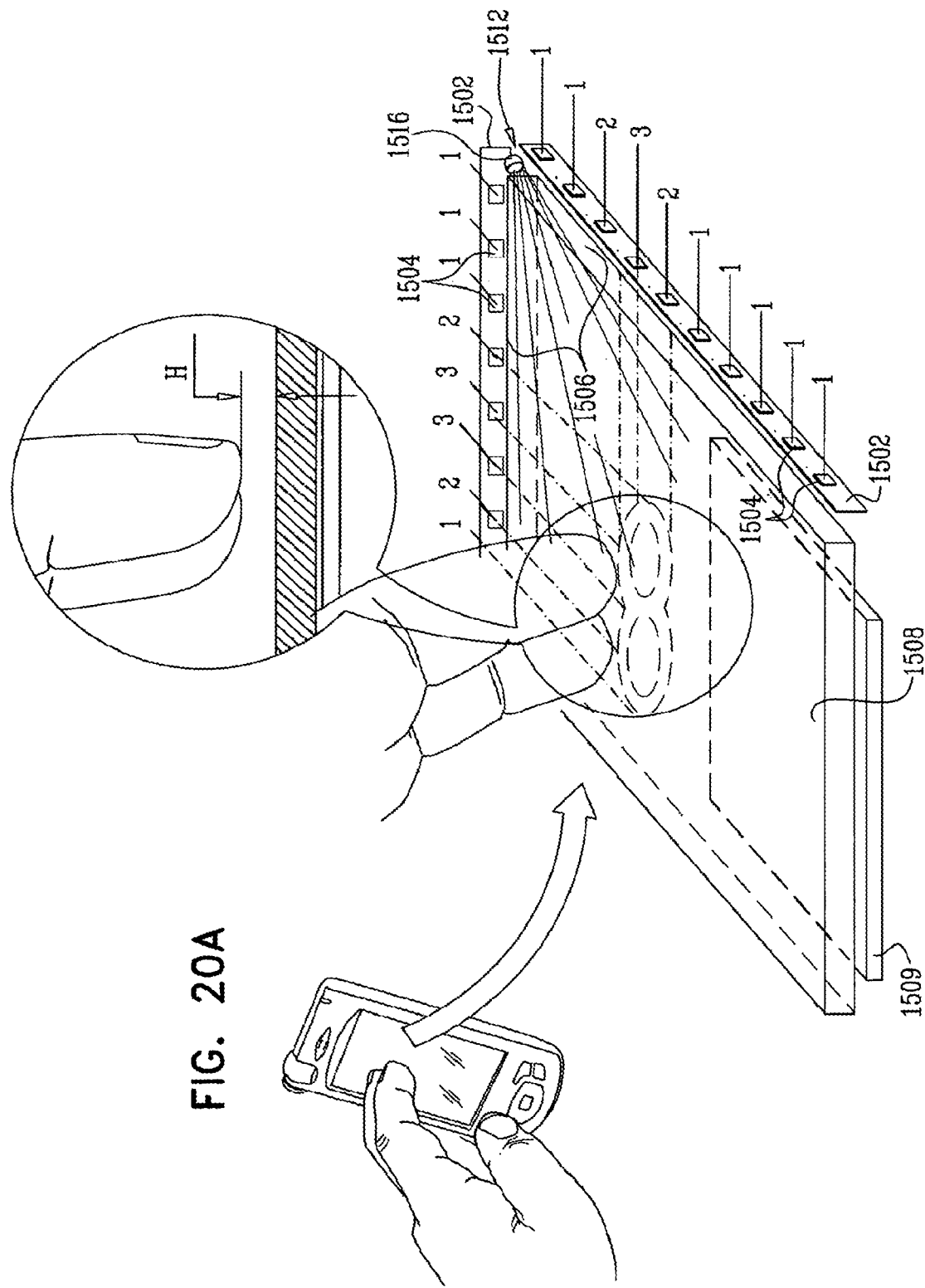

As seen in FIGS. 20A and 20B, the user's fingers are adjacent to one another. In FIG. 20A, the user's fingers are located in propinquity to interactive surface element 1508, at a height H therefrom, and in FIG. 20B, the user's fingers touch interactive surface element 1508.

When the user's fingers touch, as in FIG. 20B, or are located in propinquity to, as in FIG. 20A, interactive surface element 1508, the light reflected from the fingers is detected by one or more of detector elements 1504, as described hereinabove, in addition to the baseline level of light detected by the detector elements 1504. Detector analyzing processing circuitry (not shown) preferably receives outputs of the detector elements 1504 on detector arrays 1502, digitally processes these outputs and determines whether the absolute amount of light detected by each of the detector elements 1504 or the change in the amount of light detected by each of the detector elements 1504 exceeds a predetermined threshold. The amount of light detected by the individual detector elements 1504 on a given detector array 1502, as determined by the detector analyzing processing circuitry, is further processed to provide an array detection output. The array detection output includes information corresponding to the locations of impingement points of the user's fingers relative to the given detector array 1502. Typically, the locations of at least one detector element 1504, in which the amount of light measured or the change in the amount of light measured exceeds a predetermined threshold, correspond to the locations of the user's fingers along an axis parallel to the given detector array 1502.

In the configuration shown in FIGS. 20A and 20B, two-dimensional location determining circuitry (not shown) preferably calculates the two-dimensional position of the impingement points of the user's fingers on or above interactive surface element 1508 by combining the array detection outputs of at least two detector arrays, typically arranged along at least two mutually perpendicular edges 1506 of interactive surface element 1508.

Figure 21A:
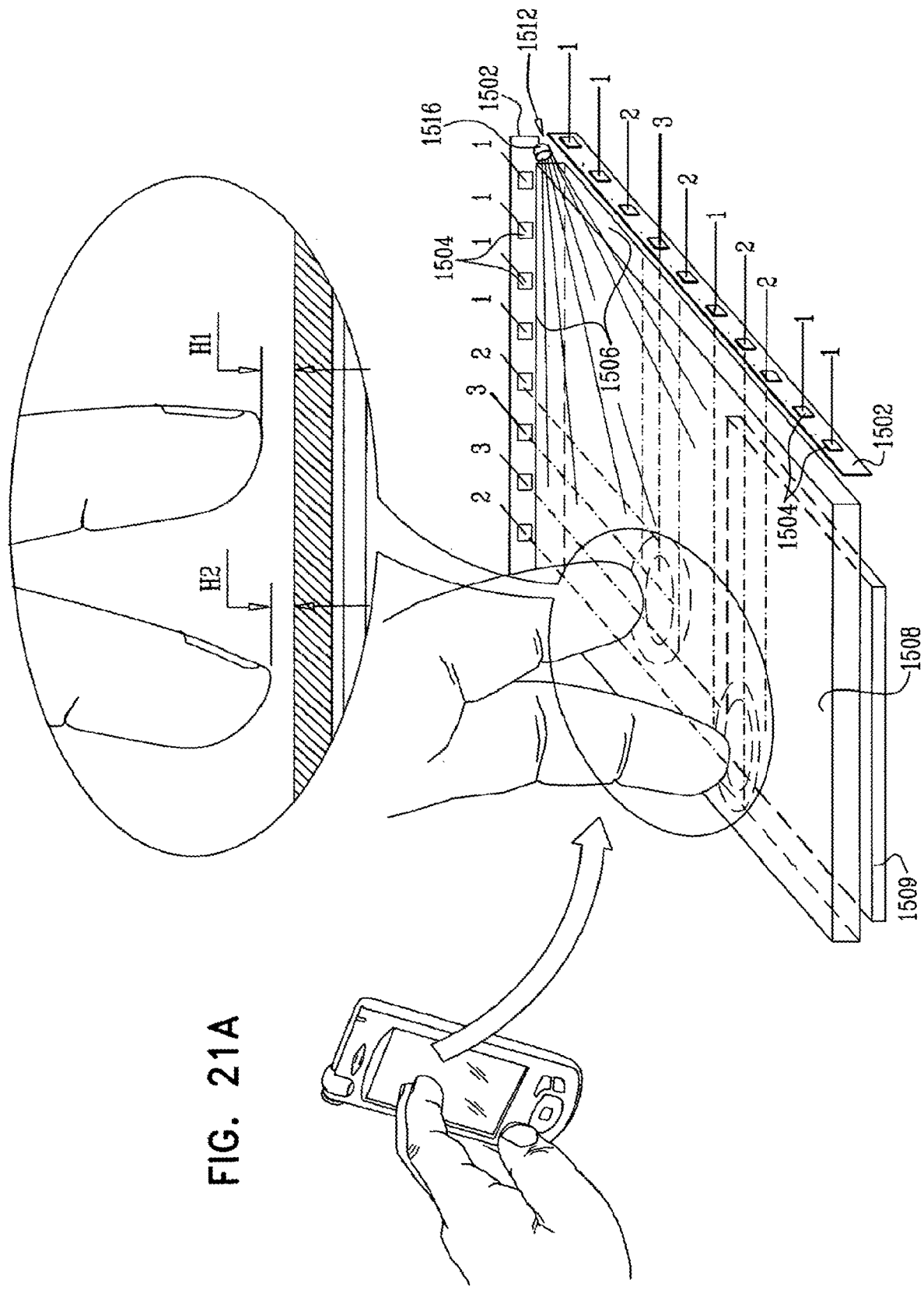
Figure 21B:
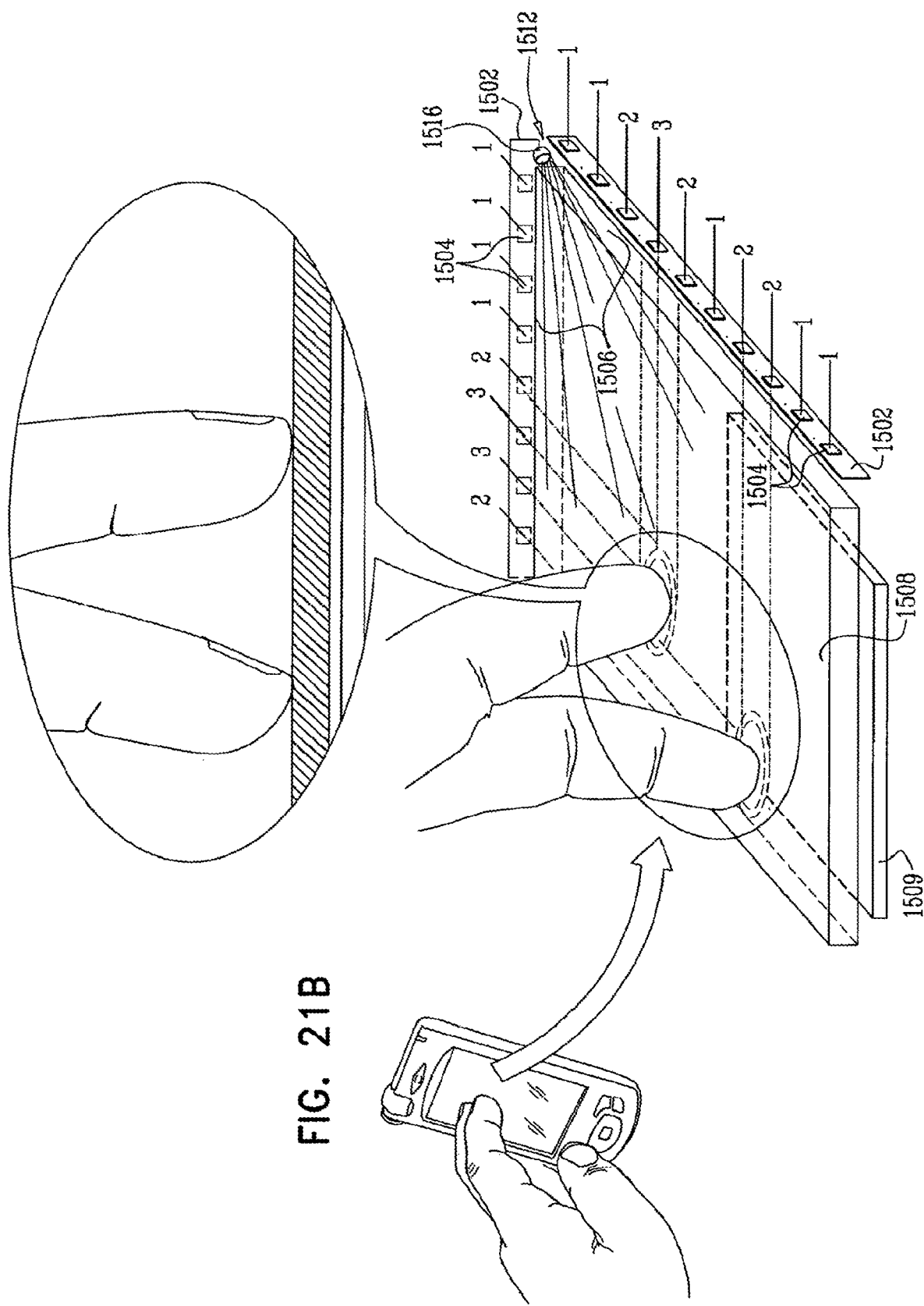

As seen in FIGS. 21A and 21B, the user's fingers are located at a distance from one another. In FIG. 21A, the user's fingers are located in propinquity to interactive surface element 1508, at respective heights H1 and H2 therefrom, and in FIG. 21B, the user's fingers touch interactive surface element 1508. It is appreciated that H1 may be less than, equal to or greater than H2.

When the user's fingers touch, as in FIG. 21B, or are located in propinquity to, as in FIG. 21A, interactive surface element 1508, the light reflected from the fingers is detected by one or more of detector elements 1504, as described hereinabove, in addition to the baseline level of light detected by the detector elements 1504. Detector analyzing processing circuitry (not shown) preferably receives outputs of the detector elements 1504 on detector arrays 1502, digitally processes these outputs and determines whether the absolute amount of light detected by each of the detector elements 1504 or the change in the amount of light detected by each of the detector elements 1504 exceeds a predetermined threshold.

The amount of light detected by the individual detector elements 1504 on a given detector array 1502, as determined by the detector analyzing processing circuitry, is further processed to provide an array detection output. The array detection output includes information corresponding to the locations of impingement points of the user's fingers relative to the given detector array 1502. Typically, the locations of at least one detector element 1504, in which the amount of light measured or the change in the amount of light measured exceeds a predetermined threshold, correspond to the locations of the user's fingers along an axis parallel to the given detector array 1502.

Figure 22:
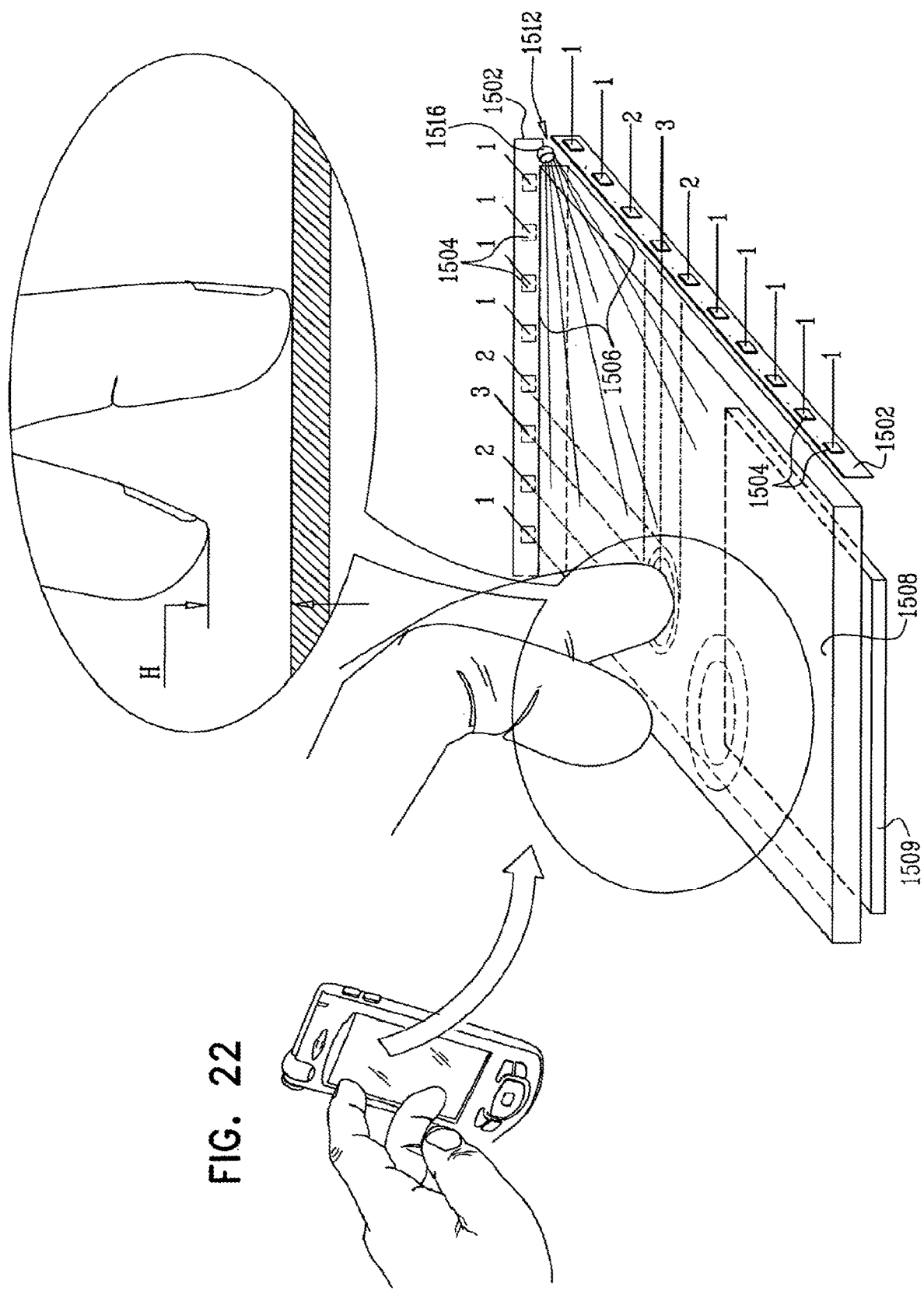

In the configuration shown in FIGS. 21A and 21B, two-dimensional location determining circuitry (not shown) preferably calculates the two-dimensional position of the impingement points of the user's fingers on or above interactive surface element 1508 by combining the array detection outputs of at least two detector arrays, typically arranged along at least two mutually perpendicular edges 1506 of interactive surface element 1508. As seen in FIG. 22, the user's fingers are located at a distance from one another. One of the user's fingers is located in propinquity to interactive surface element 1508, at a height H therefrom, and one of the user's fingers touches interactive surface element 1508.

When the user's fingers touch, or are located in propinquity to, interactive surface element 1508, the light reflected from the fingers is detected by one or more of detector elements 1504, as described hereinabove, in addition to the baseline level of light detected by the detector elements 1504. Detector analyzing processing circuitry (not shown) preferably receives outputs of the detector elements 1504 on detector arrays 1502, digitally processes these outputs and determines whether the absolute amount of light detected by each of the detector elements 1504 or the change in the amount of light detected by each of the detector elements 1504 exceeds a predetermined threshold.

The amount of light detected by the individual detector elements 1504 on a given detector array 1502, as determined by the detector analyzing processing circuitry, is further processed to provide an array detection output. The array detection output includes information corresponding to the locations of impingement points of the user's fingers relative to the given detector array 1502. Typically, the locations of at least one detector element 1504, in which the amount of light measured or the change in the amount of light measured exceeds a predetermined threshold, correspond to the locations of the user's fingers along an axis parallel to the given detector array 1502.

In the configuration shown in FIG. 22, two-dimensional location determining circuitry (not shown) preferably calculates the two-dimensional position of the impingement points of the user's fingers on or above interactive surface element 1508 by combining the array detection outputs of at least two detector arrays, typically arranged along at least two mutually perpendicular edges 1506 of interactive surface element 1508. Reference is now made to FIGS. 23A-23E, which illustrate user interface functionality of an interactive assembly constructed and operative in accordance with a preferred embodiment of the present disclosure. Preferably, the interactive assembly is a mobile computer and/or communicator 1600 constructed and operative in accordance with the teachings of one or more of the following applicants'/inventors' patent documents Published PCT Patent Applications: WO 03/104965 A2, WO 2005/094176 A3, WO 2007/029257; International Patent Application Nos. PCT/IL2007/000332 filed Mar. 14, 2007; PCT/IL2007/000433 filed Apr. 1, 2007; U.S. Provisional Patent Application No. 60/715,546, filed Sep. 8, 2005, titled OPTICAL SENSOR FOR MEASUREMENT OF LIGHT SCATTERING; U.S. Provisional Patent Application No. 60/734,027, filed Nov. 3, 2005, titled CONTROL APPARATUS; U.S. Provisional Patent Application No. 60/789,188, filed Apr. 3, 2006 and titled USER INTERFACE FUNCTIONALITIES, U.S. Provisional Patent Application No. 60/682,604, filed May 18, 2005 and titled NOVEL DISTORTION LENS; U.S. Provisional Patent Application No. 60/918,303; filed Mar. 14, 2007 and titled INFORMATION INPUT DEVICE and U.S. Patent Application Publication No. 2005/0156914A1, the disclosures of which are hereby incorporated by reference.

Preferably, the mobile device includes touch responsive input functionality and/or propinquity responsive input functionality provided by at least one interactive surface element 1601, at least a first region of the at least one interactive surface element having first user sensible functionality and at least a second region of the at least one interactive surface element having second functionality, different from the first user sensible functionality, input sensor functionality, including at least one input sensor located in propinquity to a surface of the at least one interactive surface element 1601, operative to sense impingement of an electromagnetic radiation spot on at least one of the at least one first region and the at least one second region of the at least one interactive surface element and utilization functionality for employing outputs of the input sensor functionality in respect of impingement on either or both of the at least one first region and the at least one second region.

Figure 23A:
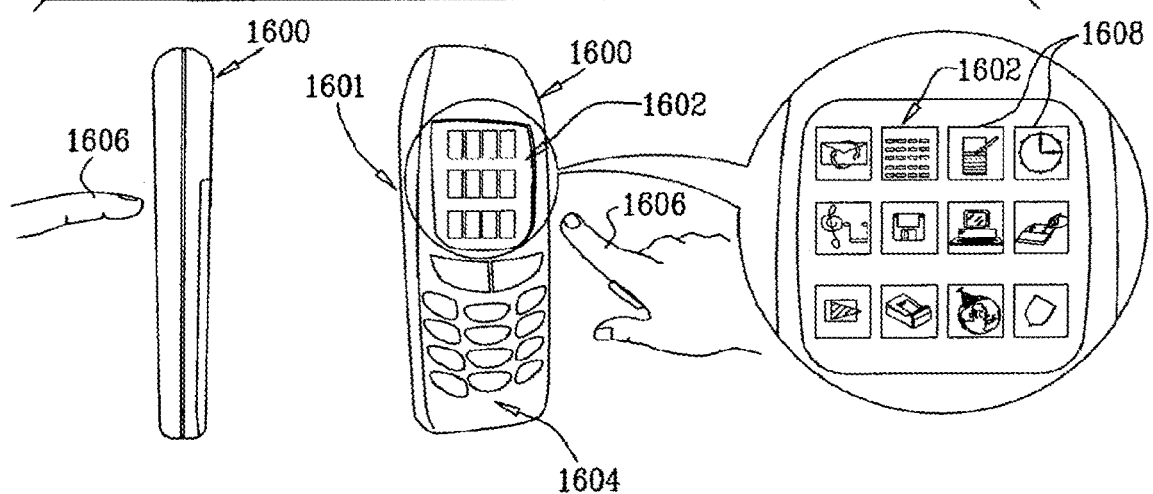
FIGS. 23A, 23B, 23C, 23D and 23E are illustrations of user interface functionality of a mobile device constructed and operative in accordance with a preferred embodiment of the present disclosure.

In the illustrated embodiment, the first region may overlie an area having display functionality, such as a display screen 1602 and the second region may overlie an area having keyboard functionality, such as keyboard 1604, either or both of which regions may have functionality as described hereinabove particularly with reference to FIGS. 20A-22, and user interface function selection functionality which is responsive to inputs received from the touch responsive input functionality and/or propinquity responsive input functionality. FIG. 23A shows a finger 1606 located adjacent the first region of the interactive surface element 1601 overlying display screen 1602 and not adjacent the second region of the interactive surface element 1601 overlying keyboard 1604. One or preferably both of the first and second regions of the interactive surface element 1601, as described above, may include touch responsive input functionality and/or propinquity responsive input functionality.

In the arrangement shown in FIG. 23A, display screen 1602 typically displays an array of application launch icons 1608.

Figure 23B:
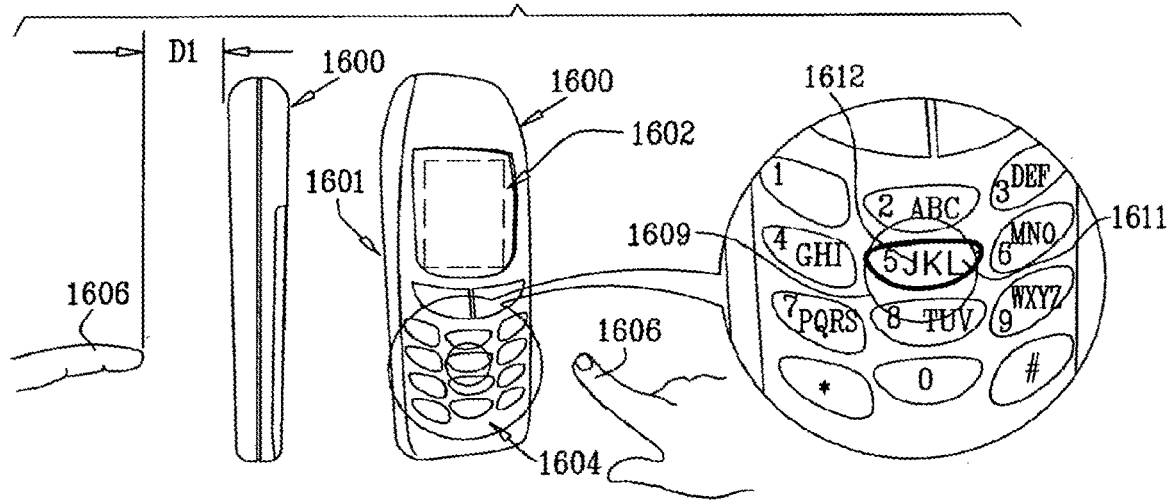

FIG. 23B shows finger 1606 located at a first distance D1 from the second region of the interactive surface element 1601 overlying keyboard 1604, such that the propinquity responsive input functionality senses finger 1606 in propinquity to keyboard 1604 and defines an impingement area 1609 that is generally centered on a first button 1611, even though it may also partially impinge on other buttons. The functionality of the mobile device 1600 causes button 1611 to appear in an illuminated or otherwise visually sensibly emphasized form, as indicated by reference numeral 1612. As seen in FIG. 23B, display screen 1602 typically displays a clear screen.

Figure 23C:
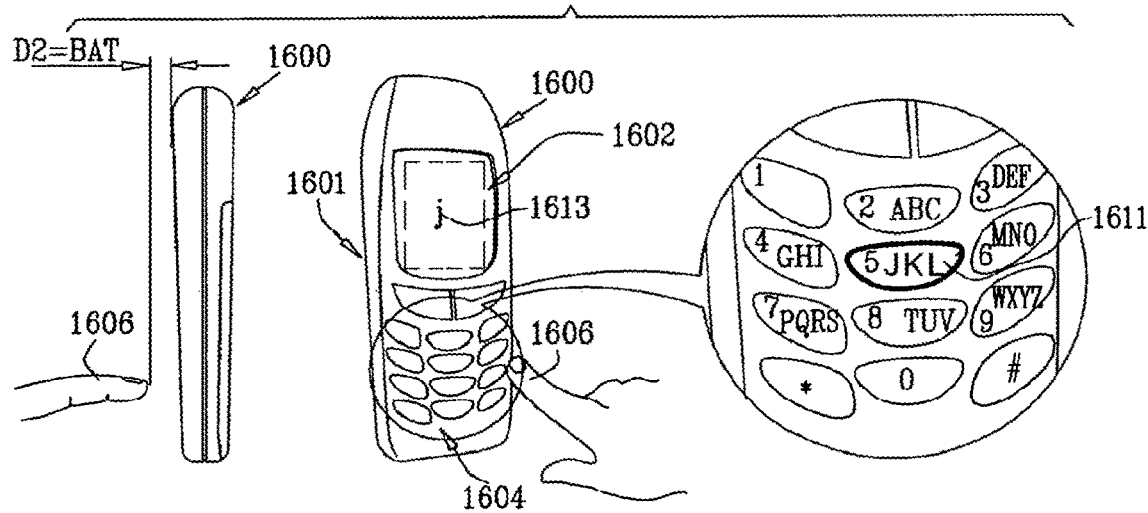

In accordance with a preferred embodiment of the present disclosure, as shown in FIG. 23C, when finger 1606 is located at a second distance D2 from the second region of the interactive surface element 1601 overlying keyboard 1604, which may be less than D1, which preferably is selected as a button actuation threshold distance BAT, the functionality of the mobile device 1600 causes a first button actuating event to occur, corresponding to a first function associated with button 1611, such as appearance of a small case letter on display screen 1602, as indicated by reference numeral 1613.

Figure 23D:
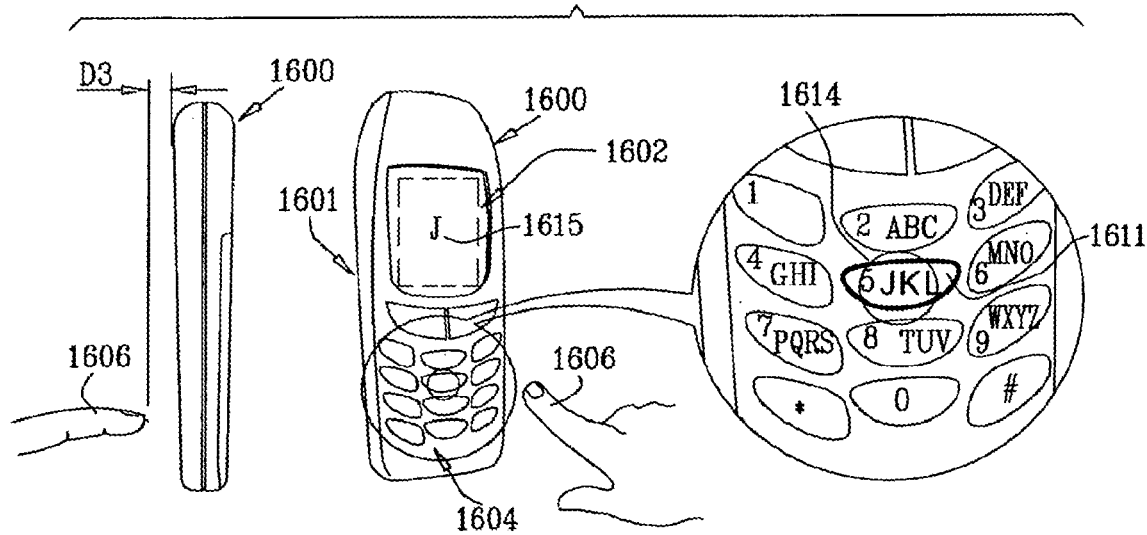

It is appreciated that various distances of the finger from the second region of the interactive surface element 1601 overlying a button on keyboard 1604 may corresponding to various operational parameters associated with the function or functions thereof. FIG. 23D shows an example wherein finger 1606 located at a third distance D3 from the second region of the interactive surface element 1601 overlying button 1611 on keyboard 1604, which distance may be greater than or less than or equal to D2, such that the impingement area 1614 of finger 1606 is generally centered on button 1611 and extends over only a relatively small part of the area of the button. The functionality of the mobile device 1600 causes a second button actuating event to occur, corresponding to a second function associated with button 1611, such as the appearance of a large case letter on display screen 1602, as indicated by reference numeral 1615.

It is appreciated that the functionalities illustrated in some but not all of FIGS. 23A, 23B, 23C and 23D may be obviated in a system which is differentially responsive to touch and propinquity, but does not distinguish between degrees of propinquity within a given threshold.

Figure 23E:
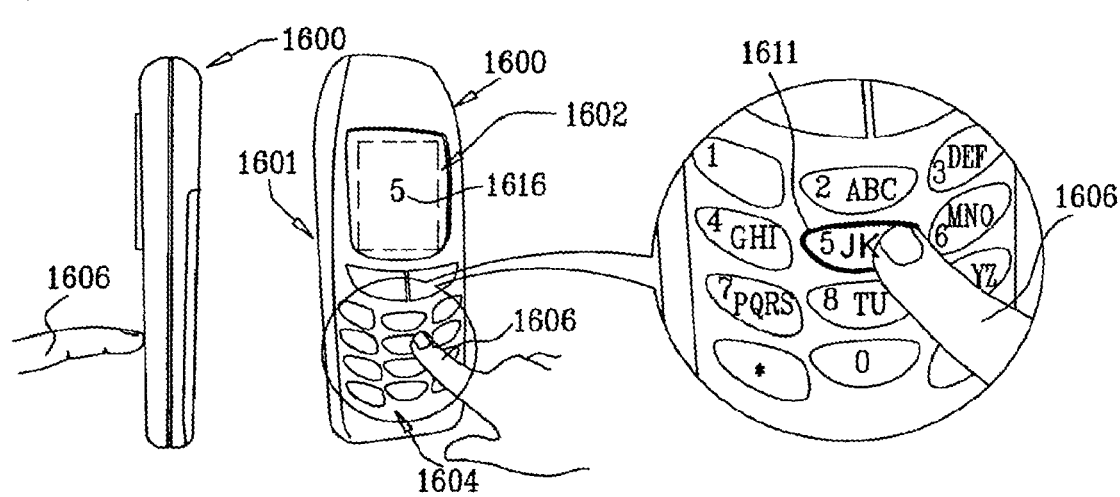

In accordance with a preferred embodiment of the present disclosure, as shown in FIG. 23E, when the finger 1606 touches the second region of the interactive surface element 1601 overlying button 1611 of keyboard 1604, a third function is actuated, such as the appearance of a number on display screen 1602, as indicated by reference numeral 1616. Actuation of any one or more of the functions is preferably may be accompanied by feedback to the user, such as visual, auditory or tactile feedback, interactive surface element.

It is appreciated that, as shown in the above example, a single finger movement from D1 to D3 can replace multiple touch engagements required by prior art devices.

It is appreciated that the functionality of FIGS. 23A-23E may be provided and/or used alone or in combination with any other suitable functionality, such as any one or more of the other functionalities described herein below with reference to FIGS. 24A-26D.

Figure 24A:
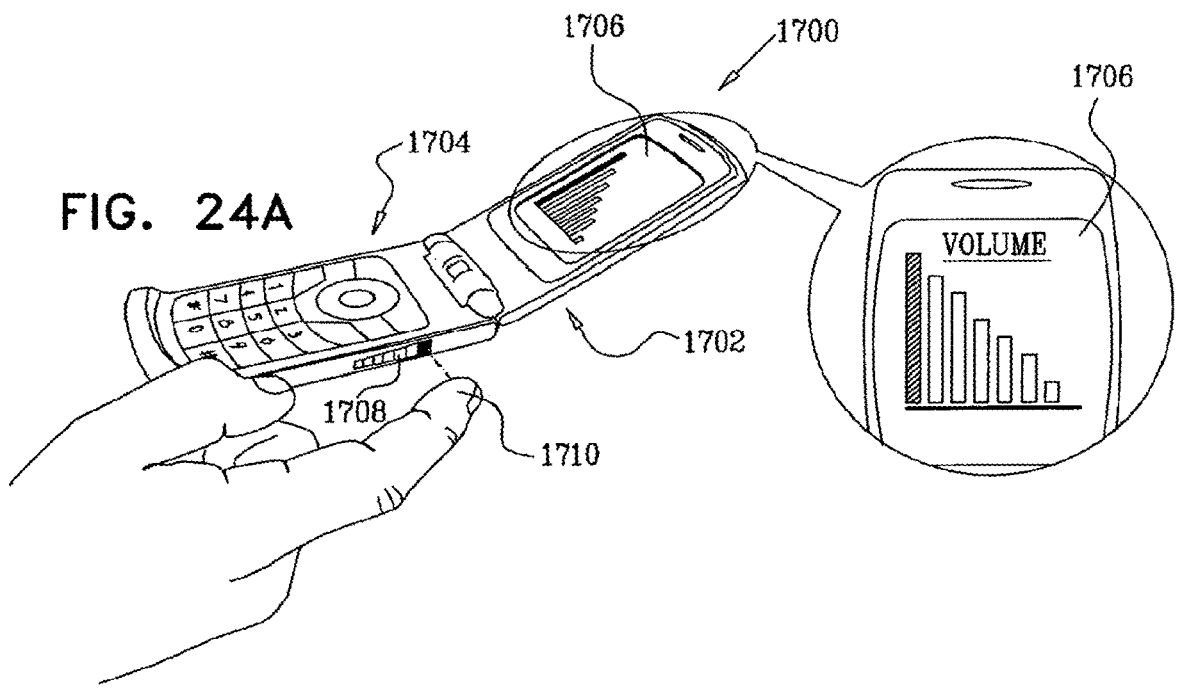
FIGS. 24A and 24B are illustrations of user interface functionality of a mobile device constructed and operative in accordance with a preferred embodiment of the present disclosure.
Figure 24B:
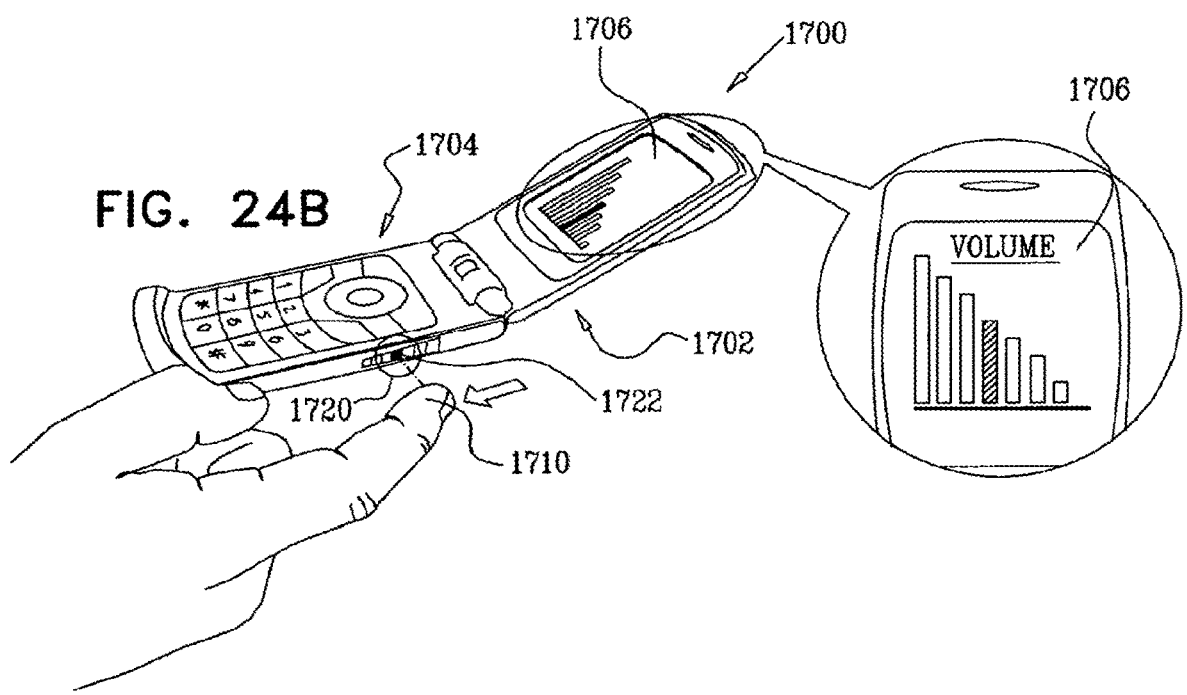

Reference is now made to FIGS. 24A and 24B, which illustrate user interface functionality of an interactive assembly constructed and operative in accordance with a preferred embodiment of the present disclosure. Preferably, the interactive assembly is a mobile computer and/or communicator 1700 constructed and operative in accordance with the teachings of one or more of the following applicants'/inventors' patent documents: Published PCT Patent Applications: WO 03/104965A2, WO 2005/094176A3, WO 2007/029257; International Patent Application Nos. PCT/IL2007/000332 filed Mar. 14, 2007; PCT/IL2007/000433 filed Apr. 1, 2007; U.S. Provisional Patent Application No. 60/715,546, filed Sep. 8, 2005, titled OPTICAL SENSOR FOR MEASUREMENT OF LIGHT SCATTERING; U.S. Provisional Patent Application No. 60/734,027, filed Nov. 3, 2005, titled CONTROL APPARATUS; U.S. Provisional Patent Application No. 60/789,188, filed Apr. 3, 2006 and titled USER INTERFACE FUNCTIONALITIES, U.S. Provisional Patent Application No. 60/682,604, filed May 18, 2005 and entitled NOVEL DISTORTION LENS; U.S. Provisional Patent Application No. 60/918,303; filed Mar. 14, 2007 and titled INFORMATION INPUT DEVICE and U.S. Patent Application Publication No. 2005/0156914A1, the disclosures of which are hereby incorporated by reference.

Preferably, the mobile device includes touch responsive input functionality and/or propinquity responsive input functionality provided by at least one interactive surface element, at least a first region of the at least one interactive surface element having first user sensible functionality and at least a second region of the at least one interactive surface element having second functionality, different from the first user sensible functionality, input sensor functionality, including at least one input sensor located in propinquity to a surface of the at least one interactive surface element, operative to sense impingement of an electromagnetic radiation spot on at least one of the at least one first region and the at least one second region of the at least one interactive surface element and utilization functionality for employing outputs of the input sensor functionality in respect of impingement on either or both of the at least one first region and the at least one second region.

In the illustrated embodiment, the at least one interactive surface element includes two interactive surface elements 1702 and 1704. The first region may overlie an area having display functionality, such as a display screen 1706, overlying interactive surface element 1702, and the second region may overlie an area having slider control functionality, such as slider 1708, overlying interactive surface element 1704, either or both of which regions may have functionality as described hereinabove particularly with reference to FIGS. 20A-22, and user interface function selection functionality which is responsive to inputs received from the touch responsive input functionality and/or propinquity responsive input functionality. FIG. 24A shows a finger 1710 located adjacent a first location in the second region of the interactive surface element 1704 overlying slider 1708 and not adjacent the first region of the interactive surface element 1702 overlying display screen 1706. One or preferably both of the first and second regions of the interactive surface elements 1702 and 1704, as described above, may include touch responsive input functionality and/or propinquity responsive input functionality.

In the arrangement shown in FIG. 24A, display screen 1706 typically displays a volume level indication.

FIG. 24B shows finger 1710 located at a second location in the second region of the interactive surface element 1704 overlying slider 1708, such that the propinquity responsive input functionality senses the location of finger 1710 in propinquity to slider 1708 and defines an impingement area 1720 that is generally centered on a location of the slider 1708, even though it may also partially impinge on other portions of the slider 1708. The functionality of the mobile device 1700 may cause various locations on the slider 1708 to appear in an illuminated or otherwise visually sensibly emphasized form, as indicated by reference numeral 1722. Alternatively, the functionality of the mobile device 1700 may provide slider actuation feedback on display screen 1706 or in any other manner, such as by providing an auditory response.

It is appreciated that various distances of the finger from the second region of the interactive surface element 1704 overlying slider 1708 may correspond to various operational parameters associated with the function or functions thereof. For example, if the finger 1710 touches the slider 1708, the slider may have a display contrast control functionality, while if the finger 1710 is within predetermined non-touching propinquity with the slider, it may have volume control functionality, as illustrated.

It is appreciated that, as shown in the above example, a single finger movement can replace multiple touch engagements required by prior art devices. It is appreciated that the functionality of FIGS. 24A and 24B may be provided and/or used alone or in combination with any other suitable functionality, such as any one or more of the other functionalities described hereinabove and herein below with reference to FIGS. 23A-23E and 25A-26D.

Figure 25A:
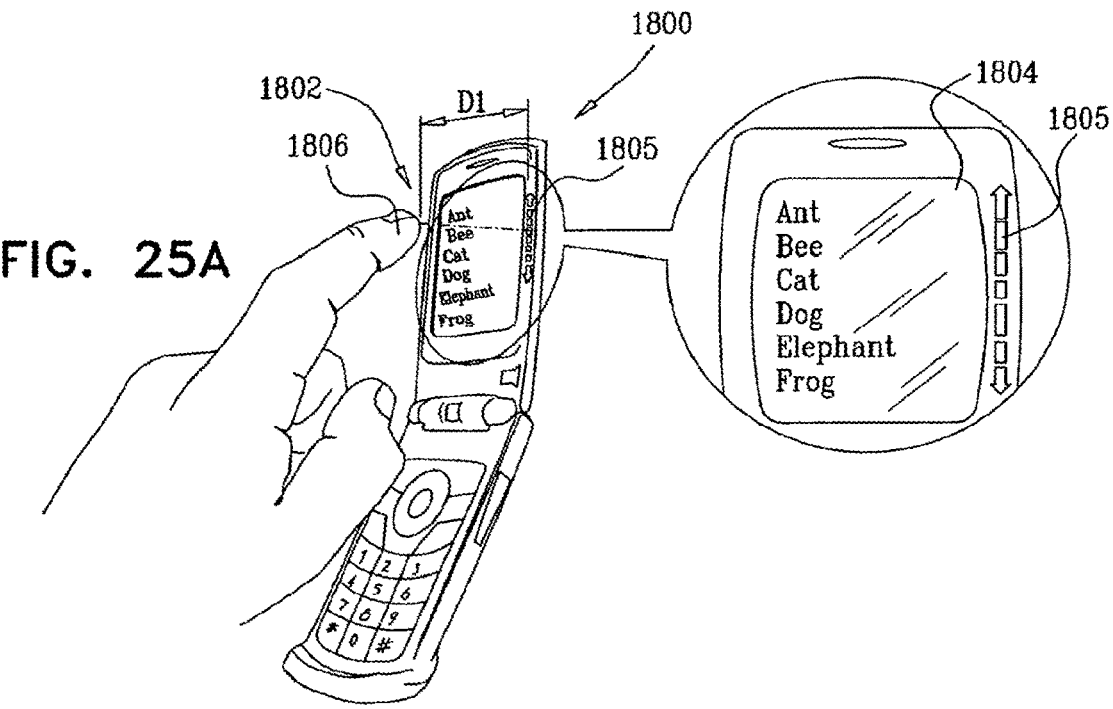
FIGS. 25A and 25B are illustrations of user interface functionality of a mobile device constructed and operative in accordance with a preferred embodiment of the present disclosure.
Figure 25B:
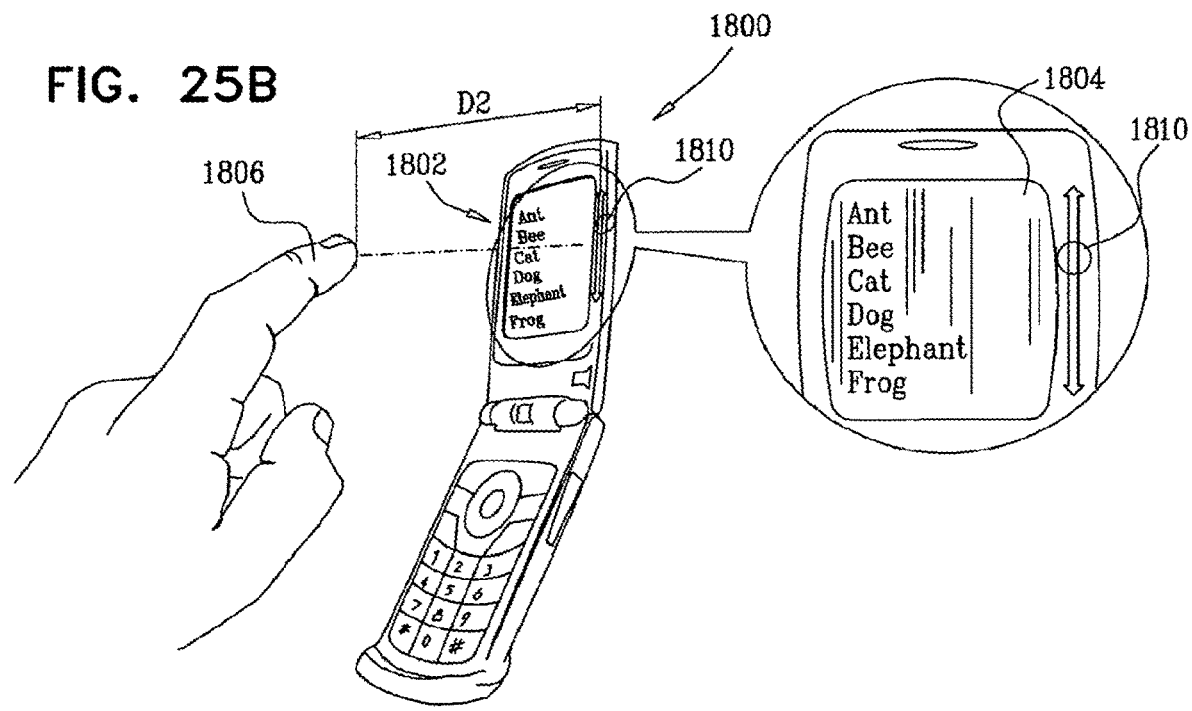

Reference is now made to FIGS. 25A and 25B, which illustrate user interface functionality of an interactive assembly constructed and operative in accordance with a preferred embodiment of the present disclosure. Preferably the interactive assembly is a mobile computer and/or communicator 1800 constructed and operative in accordance with the teachings of one or more of the following applicants'/inventors' patent documents: Published PCT Patent Applications: WO 03/104965A2, WO 2005/094176A3, WO 2007/029257; International Patent Application Nos. PCT/IL2007/000332 filed Mar. 14, 2007; PCT/IL2007/000433 filed Apr. 1, 2007; U.S. Provisional Patent Application No. 60/715,546, filed Sep. 8, 2005, titled OPTICAL SENSOR FOR MEASUREMENT OF LIGHT SCATTERING; U.S. Provisional Patent Application No. 60/734,027, filed Nov. 3, 2005, titled CONTROL APPARATUS; U.S. Provisional Patent Application No. 60/789,188, filed Apr. 3, 2006 and titled USER INTERFACE FUNCTIONALITIES, U.S. Provisional Patent Application No. 60/682,604, filed May 18, 2005 and titled NOVEL DISTORTION LENS; U.S. Provisional Patent Application No. 60/918,303; filed Mar. 14, 2007 and titled INFORMATION INPUT DEVICE and U.S. Patent Application Publication No. 2005/0156914A1, the disclosures of which are hereby incorporated by reference.

Preferably the mobile device includes touch responsive input functionality and/or propinquity responsive input functionality provided by at least one interactive surface element 1802, at least a first region of the at least one interactive surface element having first user sensible functionality and at least a second region of the at least one interactive surface element having second functionality, different from the first user sensible functionality, input sensor functionality, including at least one input sensor located in propinquity to a surface of the at least one interactive surface element 1802, operative to sense impingement of an electromagnetic radiation spot on at least one of the at least one first region and the at least one second region of the at least one interactive surface element and utilization functionality for employing outputs of the input sensor functionality in respect of impingement on either or both of the at least one first region and the at least one second region.

In the illustrated embodiment, the first region may overlie an area having display functionality, such as a display screen 1804 and the second region may overlie a margin area having slider control functionality, such as slider 1805, either or both of which regions may have functionality as described hereinabove particularly with reference to FIGS. 20A-22, and user interface function selection functionality which is responsive to inputs received from the touch responsive input functionality and/or propinquity responsive input functionality.

FIG. 25A shows a finger 1806 located adjacent to and overlying a first location in the second region of the interactive surface element 1802 at slider 1805 and spaced therefrom by a first distance D1 which may be greater than or equal to zero. One or preferably both of the first and second regions of the interactive surface element 1802, as described above, may include touch responsive input functionality and/or propinquity responsive input functionality. In the arrangement shown in FIG. 25A, display screen 1804 typically displays a scrollable list. The distance by which the finger 1806 is spaced from the slider 1805 controls the scrolling speed.

FIG. 25B shows finger 1806 located at a second location in the second region of the interactive surface element 1802 overlying slider 1805, such that the propinquity responsive input functionality senses the location of finger 1806 in propinquity to slider 1805 and defines an impingement area 1810 that is generally centered on a location of the slider 1805, even though it may also partially impinge on other portions of the slider 1805. Here the finger is located at a second distance D2, which is greater than D1, from the slider 1805, which provides a faster scrolling speed than when the finger is closer to the slider 1805, as in FIG. 25A.

It is appreciated that, as shown in the above example, a single finger movement can replace multiple touch engagements required by prior art devices.

It is appreciated that the functionality of FIGS. 25A and 25B may be provided and/or used alone or in combination with any other suitable functionality, such as any one or more of the other functionalities described hereinabove and herein below with reference to FIGS. 23A-24B and 26A-26D. Reference is now made to FIGS. 26A-26D, which illustrate user interface functionality of an interactive assembly constructed and operative in accordance with a preferred embodiment of the present disclosure. Preferably the interactive assembly is a mobile computer and/or communicator 1900 constructed and operative in accordance with the teachings of one or more of the following applicants'/inventors' patent documents: Published PCT Patent Applications: WO 03/104965A2, WO 2005/094176A3, WO 2007/029257; International Patent Application Nos. PCT/IL2007/000332 filed Mar. 14, 2007; PCT/IL2007/000433 filed Apr. 1, 2007; U.S. Provisional Patent Application No. 60/715,546, filed Sep. 8, 2005, titled OPTICAL SENSOR FOR MEASUREMENT OF LIGHT SCATTERING; U.S. Provisional Patent Application No. 60/734,027, filed Nov. 3, 2005, titled CONTROL APPARATUS; U.S. Provisional Patent Application No. 60/789,188, filed Apr. 3, 2006 and titled USER INTERFACE FUNCTIONALITIES, U.S. Provisional Patent Application No. 60/682,604, filed May 18, 2005 and titled NOVEL DISTORTION LENS; U.S. Provisional Patent Application No. 60/918,303; filed Mar. 14, 2007 and titled INFORMATION INPUT DEVICE; and U.S. Patent Application Publication No. 2005/0156914A1, the disclosures of which are hereby incorporated by reference.

Preferably the mobile device includes touch responsive input functionality and/or propinquity responsive input functionality provided by at least one interactive surface element 1901, at least a first region of the at least one interactive surface element having first user sensible functionality and at least a second region of the at least one interactive surface element having second functionality, different from the first user sensible functionality, input sensor functionality, including at least one input sensor located in propinquity to a surface of the at least one interactive surface element 1901, operative to sense impingement of an electromagnetic radiation spot on at least one of the at least one first region and the at least one second region of the at least one interactive surface element and utilization functionality for employing outputs of the input sensor functionality in respect of impingement on either or both of the at least one first region and the at least one second region.

Figure 26A:
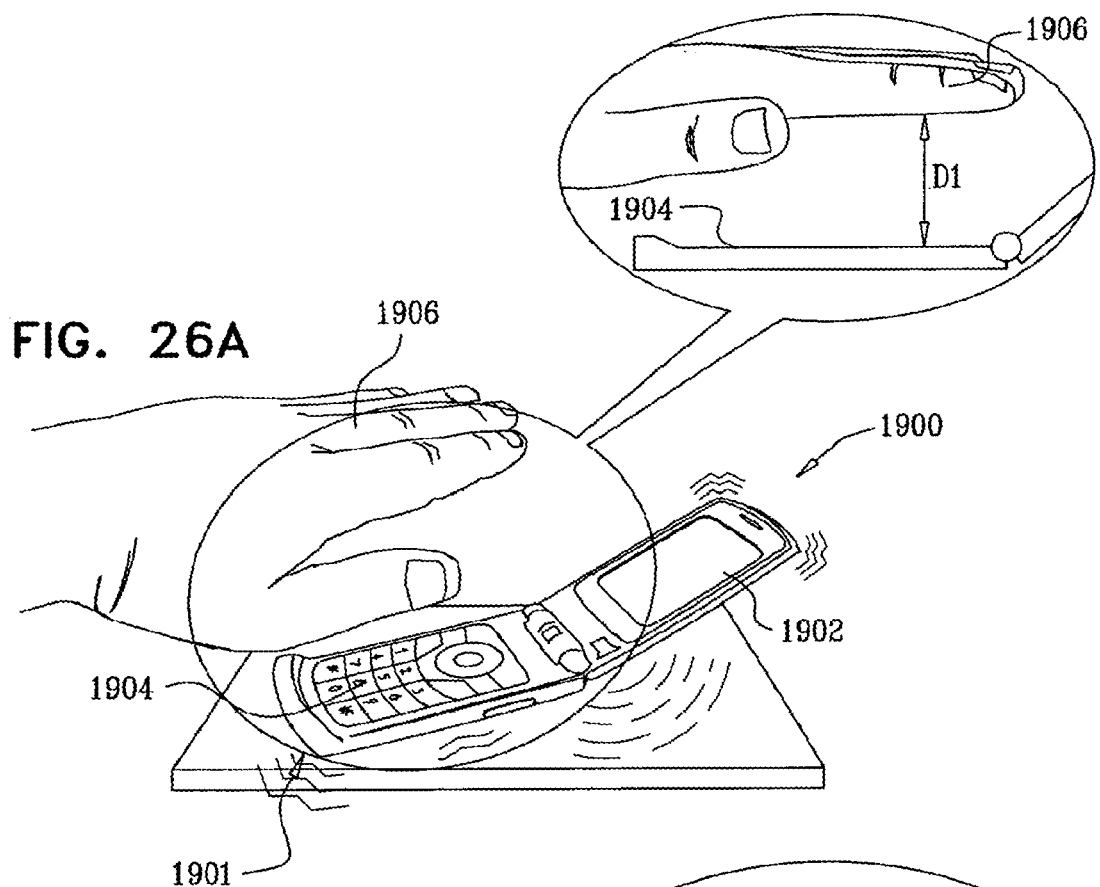
FIGS. 26A, 26B, 26C and 26D are illustrations of user interface functionality of a mobile device constructed and operative in accordance with a preferred embodiment of the present disclosure.

In the illustrated embodiment, the first region may overlie an area having display functionality, such as a display screen 1902 and the second region may overlie a keyboard area having ringer control functionality, such as keyboard zone 1904, either or both of which regions may have functionality as described hereinabove particularly with reference to FIGS. 20A-22, and user interface function selection functionality which is responsive to inputs received from the touch responsive input functionality and/or propinquity responsive input functionality. FIG. 26A shows a hand 1906 overlying the second region of the interactive surface element 1901 at keyboard zone 1904 and spaced therefrom by a first distance D1. One or preferably both of the first and second regions of the interactive surface element 1901, as described above, may include touch responsive input functionality and/or propinquity responsive input functionality. In the arrangement shown in FIG. 26A, the functionality of the second region governs the ringing volume of the communicator 1900 and the position of the hand 1906 shown in FIG. 26A and its degree of propinquity to the keyboard zone 1904 causes a reduction in the ringing volume.

Figure 26B:
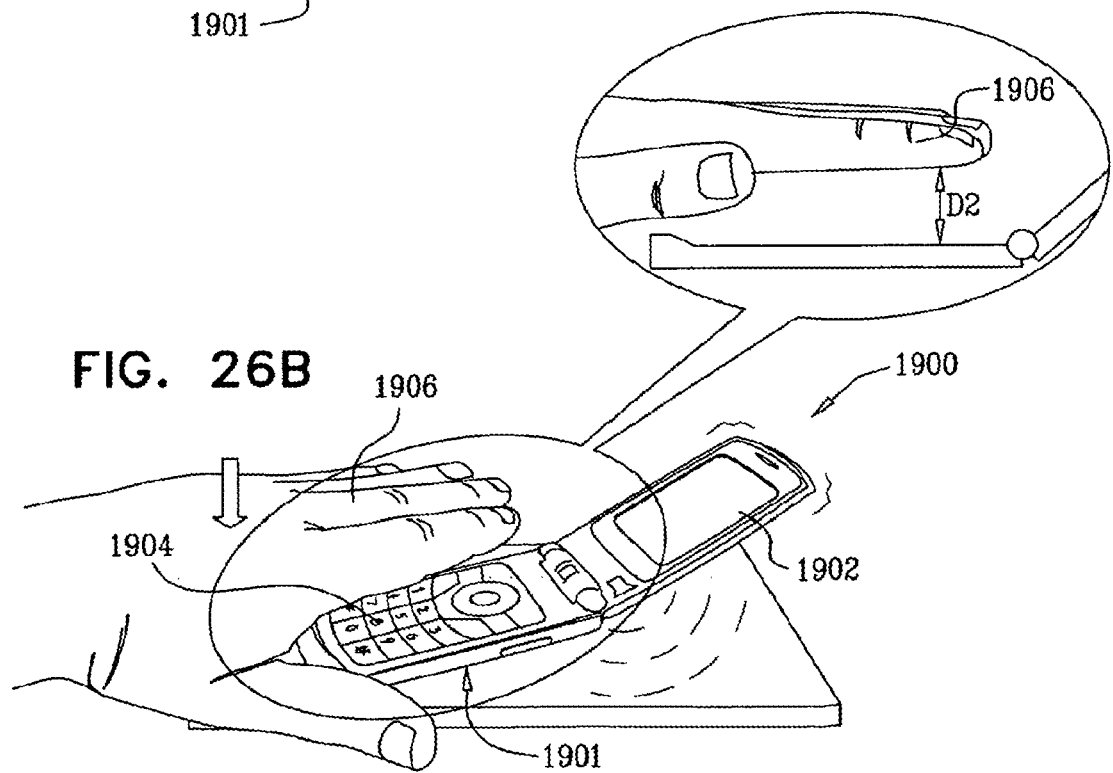

FIG. 26B shows hand 1906 located at a second distance D2, less than D1, from the keyboard zone 1904, which causes a further reduction in the ringing volume of the communicator.

Figure 26C:
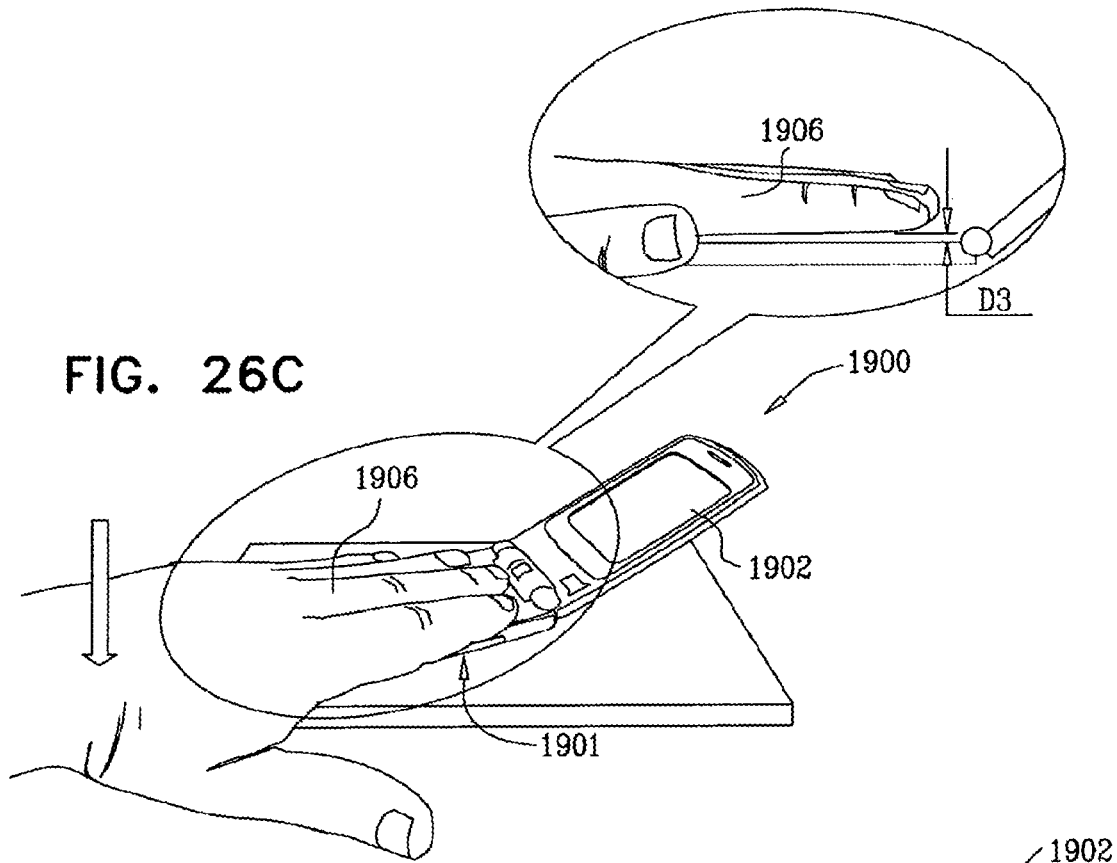
Figure 26D:
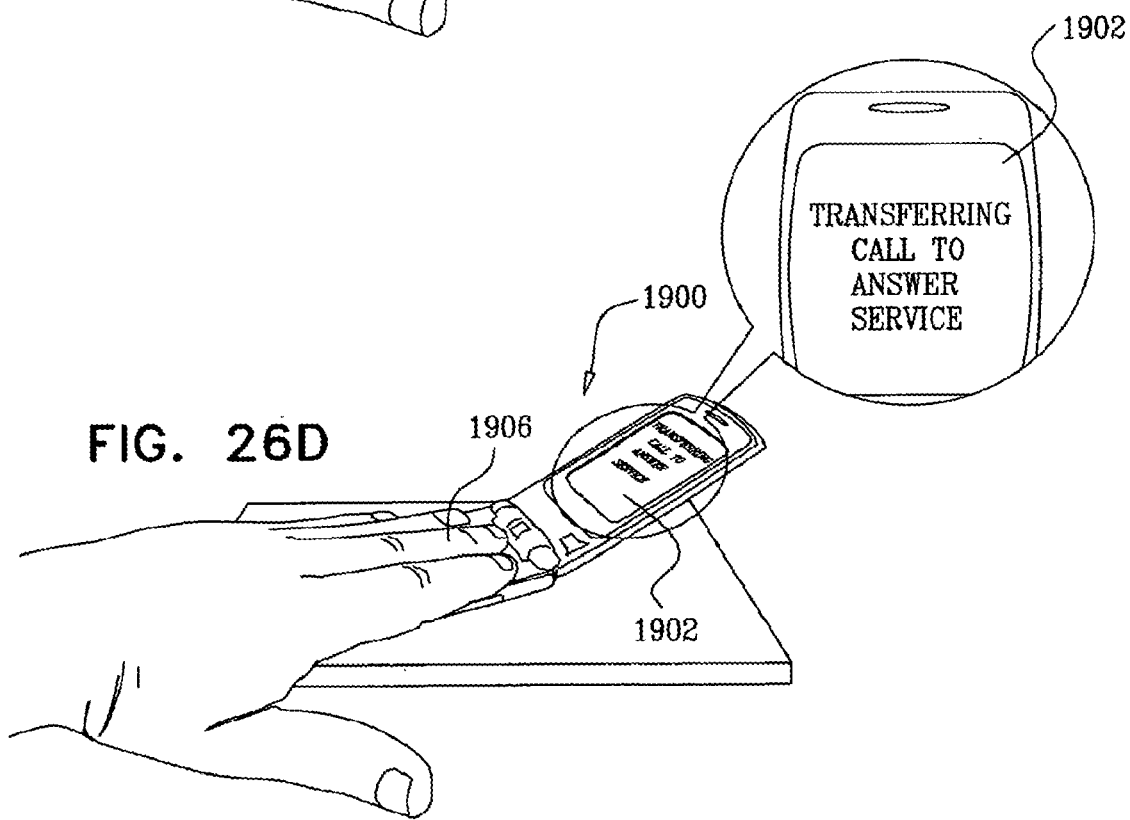

FIG. 26C shows hand 1906 located at a third distance D3, less than D2 and typically zero from the keyboard zone 1904, which causes muting of the ringing of the communicator and actuation of call divert functionality. FIG. 26D shows hand 1906 still located at third distance D3, from the keyboard zone 1904, and the provision of visual feedback in the form of a visible alert on display screen 1902 indicating muting of the ringing of the communicator and diversion of the call.

It is appreciated that, as shown in the above example, a gesture can replace multiple touch engagements required by prior art devices.

It is appreciated that the functionality of FIGS. 26A-26D may be provided and/or used alone or in combination with any other suitable functionality, such as any one or more of the other functionalities described herein below with reference to FIGS. 23A-25B.

The array detection output is constructed on the basis of outputs of the individual detector in the array, taking into account the relative positions of the individual detectors. One or more array detection outputs represent the shape, size, location and/or intensity of a light spot defined by the impingement of light on the interactive surface or a layer thereof.

By measuring, comparing, combining and/or contrasting data points, variables, and characteristics represented or indicated by one or more array detection outputs, meaningful and useful information about the light spot may be obtained. This information may include: x and y coordinates of the center of the light spot and any one or more of size, shape, symmetry, eccentricity, intensity and/or orientation of the light spot relative to the interactive surface and detector arrays associated therewith.

Utilization functionality, preferably embodied in utilization circuitry, may utilize such light spot information. The utilization functionality may utilize data taken directly from raw data output by the detector arrays, or alternatively may further process the raw data by application thereto of one or more smoothing algorithms. As a further alternative, one or more curve-fitting algorithms may be applied to the raw data or to smoothed data. Examples of curve fitting algorithms include parabolic curve-fitting algorithms, polynomial curve-fitting algorithms, and Gaussian curve-fitting algorithms.

Examples of derivation of light spot information from raw data, smoothed data or curve-fitted data include:

1. The peak of curve-fitted data derived from a single detector array corresponds to the center of the light spot along an axis Y generally parallel to the detector array. The height of the peak of the curve-fitted data generally is a function of the distance of the center of the light spot from the closed individual detectors in the detector array along an axis X, generally perpendicular to the detector array.

It is appreciated that combining and comparing data from two or more detector arrays allows for calculation of Y and X axis positional coordinates of the center of the light spot by finding the curve peak for each detector array output, rather than solely on the basis of the height of the curve peak. This provides multiple advantages, it being appreciated that utilizing two or more detector arrays located along different edges of the interactive surface tends to provide more complete and stronger signal data than utilizing a single array.

Additionally, where the location of a curve peak derived from a second detector array output is used to find the X coordinate, data relating to the height of at least one peak derived from at least one detector array output may be utilized to supplement, correct, adjust and/or confirm data relating to the X and Y coordinates, the size of the light spot, and/or other relevant data.

2. The width of a curve fitted to the raw or smoothed data, for example, as indicated by Sigma of a Gaussian-fitted curve, correlates generally to the size of the light spot along an axis generally parallel to the corresponding detector array. The size of the light spot is a function at least of the distance S of the origin of the light spot from the interactive surface, as measured along a straight line connecting the origin on an input object and the center of the light spot on the interactive surface. It is thus appreciated that the smaller the distance S, the smaller the light spot impinging on the interactive surface and conversely, the larger the distance S, the larger the light spot.

The height of the peak of the curve generally correlates with the intensity of the light spot, which in turn correlates also with the distance S.

It is appreciated that the height of the peak of the curve also correlates with the distance of the center of the light spot from the corresponding detector array along axis X, generally perpendicular to the detector array.

3. Data related to both the width of the curve and the peak of the curve, taken in combination, provide enhanced accuracy and robustness to calculations of the distance S. The widths of curves derived from detector array outputs of two or more detector arrays can be employed to enable calculation of major and minor axes of a generally elliptical light spot formed by impingement of the light from an input object upon the interactive surface.

By comparing the widths and asymmetries of non-Gaussian curves derived from detector array outputs of two or more detector arrays, the orientation and degree of eccentricity of a light spot may be derived. The degree of eccentricity correlates with the angle of elevation of the input object, which may be defined as the angle between a line whose distance is S and the plane of the interactive surface. The orientation of the light spot correlates to the rotational orientation of the input object about a center point defined by the X, Y coordinates of the center of the light spot.

4. Orientation of the light spot with respect to one or more detector arrays may be derived as follows: The steepness of the slopes of a smoothed or fitted curve of a detector array output correlate with the dimension of the light spot along an axis generally parallel to the detector array. When the orientation of the light spot is such that either a major or minor axis of the light spot is generally aligned in parallel to the detector array, the left and right slopes (Slope L and Slope R) of the smoothed or fitted curve will be generally equal.

When, however, the major and minor axes are not aligned in parallel to the detector array, Slope L and Slope R will differ from one another. Typically, a slope corresponding to the side of the light spot oriented nearest to the detector array will be greater. The relationship of Slope L and Slope R correlates to the orientation of the light spot on the interactive surface, and hence to the rotational orientation of the input object about a center point defined by the X, Y coordinates of the center of the light spot.

5. The difference in intensity of different portions of the light spot nearer and further from at least one detector array may be employed to resolve a mirror ambiguity in the rotational orientation of the input object. The light spot will have a "brighter" or more intensely signal-generating portion, which corresponds to the portion of the light beam which is nearer the interactive surface and hence travels less far and disperses less than the other portion of the light beam, which is further from the interactive surface and thus travels further.

The extent of difference in intensity is correlated to the angle of elevation of the input object. The steepness of Slope L and Slope R of a smoothed or fitted curve of a detector array output correlate with the dimension of the light spot along an axis generally parallel to the detector array. Comparing Slope L and Slope R of a smoothed or fitted curve of a first detector array with Slope L and Slope R of a smoothed or fitted curve of a second detector array provides an alternative method for calculating eccentricity of the light spot and thus provides an alternative method for calculating the angle of elevation of the input object relative to the interactive surface.

Thus, calculating Slope L and Slope R for multiple detector arrays provides elevation data for the input object, while comparing Slope L and Slope R of a given detector array provides information about the extent of rotation of the input object about a center point defined by the X, Y coordinates of the center of the light spot. Comparing Slope L and Slope R of a given detector array also provides a method for distinguishing between the reflective symmetries of the rotation data set.

Calculating and comparing Slope L and Slope R for multiple detector arrays may be used to enhance the accuracy and robustness of angle and orientation data for an input object. It is appreciated that most or all required information about the light spot and the location of the input object relative to the interactive surface may be derived from the output of a single detector array, and that this may be advantageous in many contexts. It is further appreciated that while all such information may be derived from the output of a single detector array, it is often advantageous to utilize outputs from at least two detector arrays. The number of detector arrays implemented and utilized in a given product is determined by various considerations, for example, including: cost, size of the interactive surface, expected strength of the light source, power consumption requirements and the desired range of input distances.

It is further appreciated that the utilization and calculation methods described herein apply to an interactive input assembly which is sensing light reflected by a input object (for example, as illustrated in FIGS. 1A and 1B), to an interactive input assembly which is sensing light emitted by the input object (for example, as shown in FIG. 1C), and also to an interactive input assembly operative to sense both light reflected from an input object and light emitted from the same input object or a different input object. It is further appreciated that essentially the same methods are applicable to forward-facing or forward-angled sensors, as those shown in FIGS. 1E and 1F.

In all of these cases, the scales of values of intensity of individual detector outputs may differ, even substantially, but the essential characteristics of the light spot, such as x and y coordinates of the center of the light spot and any one or more of size, shape, symmetry, eccentricity, intensity and/or orientation of the light spot relative to the interactive surface and detector arrays associated therewith may still be derived from the raw data output by the detector arrays according to the same principles and relationships described above.

These characteristics of the light spot, and the ability to use the same physical assembly and/or same processing circuitry to process information about the location of various input objects whether they emit or reflect light, is particularly advantageous for products in which multiple input modes are to be provided, such as the assembly illustrated in FIG. 1F, where input to the mobile device and input to the large screen device may be both processed by a single processing circuitry located in the mobile device or elsewhere. Another example of utilization of multiple input modes is a mobile device such as those shown in FIG. 1A and FIG. 1C, where it may be desirable to provide both finger touch input and light-emitting stylus input for different functions, for example, finger touch input for application selection functionality, and light-emitting stylus input for gaming functionality. It is noted that when processing detector array data from an assembly, such as those illustrated in FIGS. 1C-1D and 2A-3B, where the detectors are arranged in a plane generally parallel to the plane of the interactive surface, some portion of the calculating process described above may be obviated, for example, the stages in which circuitry smoothes raw data, fits a curve to the measured output, and/or correlates a data curve with the location of the light spot.

In such a case, the utilization circuitry may preferentially interpret raw data from detector outputs as a shape and correlate that shape directly to the light spot whose edges are defined by a pre-determined output signal threshold. Additionally or alternatively, a smoothing and/or shape-fitting algorithm may be employed. The X and Y positional coordinates of the center of the light spot correlate with the intersection of axes bisecting the shape, the S distance correlates with the total area of the shape, and the elevation and rotation angles correlate with measured asymmetries of the shape. Mirror ambiguities in rotational orientation may be resolved by identifying the side of the light pattern generating the strongest signal, which correlates with the nearer portion of the emitted or reflected light beam, as described above.

It is appreciated that, if desired, a height Z, defined as the distance of the light emitting or reflecting input object from the plane of the interactive surface along a line drawn perpendicular to the interactive surface, may be easily found by geometric Pythagorean triangulation, where the plane of the interactive surface represents the base of a right triangle, and the S distance represents the hypotenuse of the triangle, which hypotenuse meets the base forming an angle equal to that defined by the angle of elevation or tilt described above.

It is further appreciated that it may be desirable to limit the S distance data coordinate outputs to three states: Off (representing no finger detected within the predetermined threshold range), Hover (representing a finger detected within the threshold range but not touching the interactive surface), and Touch (representing a state in which the finger is detected at the level of the interactive surface). For the two latter states (Hover and Touch), X and Y position coordinates relative to the interactive surface are preferably provided by the utilization circuitry as described above. Limitation of S distance data coordinate outputs to three states may be desirable for usability reasons, or where some of the parameters described hereinabove are difficult to calculate with a desirable level of accuracy, for example, because of signal strength or the specific design of the interactive input assembly and its associated device. In such a case, the calculations used to calculate such parameter or parameters may be omitted, additional arrays of detectors may be implemented, or a reduced resolution of coordinate data may be provided. It is appreciated by persons skilled in the art that the present disclosure is not limited by what has been particularly shown and described hereinabove. Rather the scope of the present disclosure includes both combinations and sub-combinations of various features described hereinabove as well as variations and modifications thereto which would occur to a person of skill in the art upon reading the above description and which are not in the prior art.

What is claimed is:
1. An interactive assembly comprising:
at least one interactive surface element defining a surface;
at least one pixel array comprising a plurality of detector elements configured to detect electromagnetic radiation-, the at least one pixel array being configured to sense a position of at least one object with respect to a surface thereof according to locations of ones of the plurality of detector elements at which at least one of an amount of radiation detected and a change in the amount of radiation detected exceeds a predetermined threshold, the at least one pixel array being configured to sense at least a position of the at least one object with respect to the at least one pixel array when the at least one object has at least a predetermined degree of propinquity to the at least one pixel array;

circuitry coupled to and receiving an output from the at least one pixel array, the circuitry being configured to provide a non-imagewise input representing the position of the at least one object relative to the at least one pixel array; and utilization circuitry that provides functionality based on the position of the at least one object relative to the at least one pixel array, wherein the at least one object includes two or more fingers and the functionality further utilizes differences in sensed relative positions of the two or more fingers.

2. The position sensing assembly according to claim 1, wherein the at least one pixel array is configured to sense light reflected from the at least one object and wherein the change in the amount of radiation detected results from ones of the plurality of detector elements detecting reflected light from the object.

3. The position sensing assembly according to claim 1, wherein the utilization circuitry is further configured to provide chording functionality.

4. The position sensing assembly according to claim 1, wherein the utilization circuitry is further configured to distinguish at least between positions of the at least one object touching or not touching the position sensing assembly.

5. The position sensing assembly according to claim 1, wherein the utilization circuitry is further configured to distinguish at least between directions of motion of the at least one object towards and away from the position sensing assembly.

6. The position sensing assembly according to claim 1, wherein the utilization circuitry is further configured to compute at least one characteristic of a trajectory of motion of the at least one object generally parallel to the at least one pixel array, wherein the at least one characteristic includes at least one of location, direction, velocity and change in direction.

7. A method of providing functionality to an interactive assembly, the method comprising:

receiving a non-imagewise input representing a position of at least one object relative to at least one pixel array based on output from detection of electromagnetic radiation by a plurality of detector elements of the at least one pixel array, the position being sensed with respect to a surface of the at least one pixel array according to locations of ones of the plurality of detector elements at which at least one of an amount of radiation detected and a change in the amount of radiation detected exceeds a predetermined threshold; and providing a functionality based on the position of the at least one object relative to the at least one pixel array, wherein the at least one object includes two or more fingers and the functionality further utilizes differences in sensed relative positions of the two or more fingers.

8. The method according to claim 7, further comprising detecting light reflected from the at least one object by the plurality of detector elements of the at least one pixel array.

9. The method according to claim 7, wherein the functionality provided further includes chording functionality.

10. The method according to claim 7, further comprising distinguishing at least between positions of the at least one object touching or not touching the position sensing assembly.

11. The method according to claim 7, further comprising distinguishing at least between directions of motion of the at least one object towards and away from the position sensing assembly.

12. The method according to claim 7, further comprising computing at least one characteristic of a trajectory of motion of the at least one object generally parallel to the at least one pixel array, wherein the at least one characteristic includes at least one of location, direction, velocity and change in direction.

* * * * *